United States Patent
Mallinson

(10) Patent No.: US 10,007,108 B2
(45) Date of Patent: Jun. 26, 2018

(54) SYSTEMS AND METHODS FOR USING MULTIPLE MEMS PROJECTORS TO DETERMINE A POSITION OF A PHOTOSENSOR OF AN HMD OR ANOTHER CONTROLLER

(71) Applicant: Sony Interactive Entertainment Inc., Tokyo (JP)

(72) Inventor: Dominic Mallinson, Redwood City, CA (US)

(73) Assignee: Sony Interactive Entertainment Inc., Tokyo (JP)

( * ) Notice: Subject to any disclaimer, the term of this patent is extended or adjusted under 35 U.S.C. 154(b) by 146 days.

(21) Appl. No.: 15/199,944

(22) Filed: Jun. 30, 2016

(65) Prior Publication Data

US 2017/0039959 A1 Feb. 9, 2017

Related U.S. Application Data

(60) Provisional application No. 62/202,766, filed on Aug. 7, 2015.

(51) Int. Cl.
*G02B 26/10* (2006.01)
*H04N 13/02* (2006.01)
(Continued)

(52) U.S. Cl.
CPC ....... *G02B 26/101* (2013.01); *G02B 26/0833* (2013.01); *G02B 26/10* (2013.01); *G02B 27/017* (2013.01); *G06F 3/011* (2013.01); *G06F 3/012* (2013.01); *G09G 3/025* (2013.01); *G09G 3/346* (2013.01); *H04N 13/0239* (2013.01); *G02B 2027/014* (2013.01);
(Continued)

(58) Field of Classification Search
CPC ........ G06F 3/012; G06F 3/011; G06F 3/0325; G06F 3/038; G02B 26/0833; G02B 26/10; G02B 27/017; G09G 3/003; G09G 3/025
USPC ............................ 250/221, 214 R, 234, 235
See application file for complete search history.

(56) References Cited

U.S. PATENT DOCUMENTS 3,375,375 A * 3/1968 Abbey ................... F41G 3/225
250/208.6
5,729,475 A 3/1998 Romanik, Jr.
(Continued)

FOREIGN PATENT DOCUMENTS

WO 2014125272 A1 8/2014

OTHER PUBLICATIONS

PCT/US2016/043141 International Search Report and Written Opinion, 20 pages.
(Continued)

*Primary Examiner* — Que T Le
(74) *Attorney, Agent, or Firm* — Martine Penilla Group, LLP

(57) ABSTRACT

A method for determining an orientation of a photosensor of a controller with respect to a projector is described. The method includes generating, by a beam generator of the projector, a beam. The method further includes modifying a direction of travel of the beam using a micro-electro-mechanical systems (MEMS) mirror that moves in a pattern, detecting the beam, calculating a time at which the beam is detected, and determining based on the pattern and the time an orientation of the beam to determine the orientation of the photosensor.

20 Claims, 29 Drawing Sheets

(Triangulation to determine position of a photosensor)
(Time division multiplexing between two projectors to identify a projector to further determine angles w.r. to each projector)

(51) Int. Cl.
  *G02B 26/08* (2006.01)
  *G09G 3/02* (2006.01)
  *G09G 3/34* (2006.01)
  *G02B 27/01* (2006.01)
  *G06F 3/01* (2006.01)
  *G09G 3/00* (2006.01)

(52) U.S. Cl.
  CPC ..... *G02B 2027/0187* (2013.01); *G09G 3/003* (2013.01); *G09G 2310/08* (2013.01); *G09G 2360/14* (2013.01)

(56) References Cited

U.S. PATENT DOCUMENTS

2009/0167726 A1   7/2009   Sprague
2010/0085581 A1   4/2010   Barbier

OTHER PUBLICATIONS

Wikipedia, "Lissajous curve", https://en.wikipedia.org/wiki/Lissajous_curve, Jun. 26, 2015, 6 pages.
Wikipedia, "Microscanner", https://en.wikipedia.org/wiki/Microscanner, Mar. 2, 2015, 6 pages.
Hofmann, Ulrich et al., "High-Q MEMS Resonators for Laser Beam Scanning Displays", http://www.mdpi.com/2072-666X/3/2/509/pdf, Micromachines 2012, 3, pp. 509-528, published Jun. 6, 2012, 20 pages.
Conant, Robert et al., "A Flat High-Frequency Scanning Micromirror", Berkeley Sensor & Actuator Center, University of California, Berkeley, http://inst.cs.berkeley.edu/~n245/fa01/HH2000-rconant.pdf, Hilton Head Solid-State Sensor and Actuator Workshop 2000, pp. 6-9, Transducer Research Foundation, 4 pages.
Mirrorcle Technologies, Inc.—Development Kit, "MirrorcleTech MEMS Mirror Development Kit", http://mirrorcletech.com/devkit.html, May 11, 2015, 4 pages.
Mirrorcle Technologies, Inc., "Mirrorcle Technologies MEMS Mirrors—Technical Overview", http://mirrorcletech.com/pdf/Mirrorcle%20Technologies%20MEMS%20Mirrors%20-%20Technical%20Overview.pdf, Copyright© 2009-2014, 7 pages.
MicroVision, "How it Works", http://www.microvision.com/technology/picop-display-technology/, Copyright©1996-2014 MicroVision, Inc., 3 pages.
Freeman, Mark et al., "Scanned Laser Pico-Projectors: Seeing the Big Picture (with a Small Device)", http://www.microvision.com/wp-content/uploads/2014/07/OPN_Article.pdf, OPN May 2009, 7 pages.
Wikipedia, "Gaussian beam", https://en.wikipedia.org/wiki/Gaussian_beam, Jul. 18, 2015, 10 pages.
Xiao, Robert et al., "Lumitrack: Low Cost, High Precision, High Speed Tracking with Projected m-Sequences", http://www.ivanpoupyrev.com/e-library/2013/Lumitrack_UIST2013.pdf, UIST'13, Oct. 8-11, 2013, St. Andrews, United Kingdom, 10 pages.
Wikipedia, "Maximum length sequence", https://en.wikipedia.org/wiki/Maximum_length_sequence, Dec. 2, 2014, 4 pages.
Rushanan, Joseph, "A Tutorial on Finite Fields and Binary m-Sequences", http://www.ccs.neu.edu/home/jjr/tutor.ps, Dec. 1996, 88 pages.
Thomas, Mark, "MLS Theory", http://www.commsp.ee.ic.ac.uk/~mrt102/projects/mls.html, Mark Thomas's Website, Copyright© 2005-2009 M. R. P. Thomas, 9 pages.

\* cited by examiner

400

450

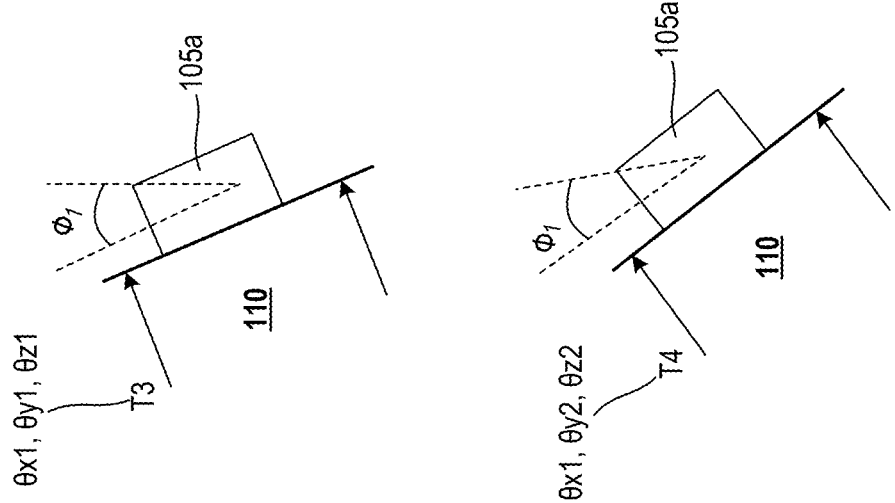

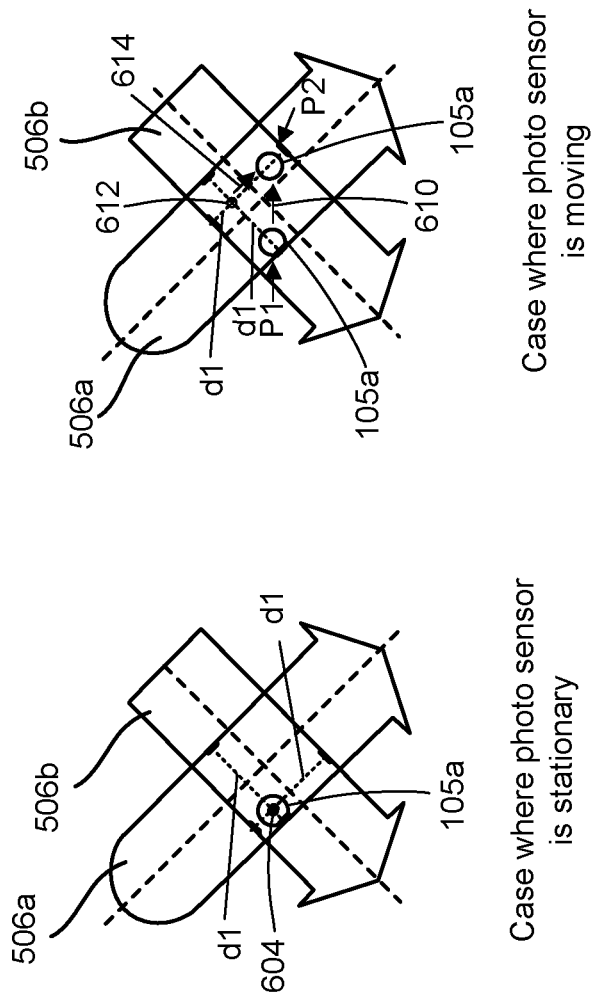

Generalized case where intervals are based on Lissajous curve (Triangulation to determine position of a photosensor)

(Time division multiplexing between two projectors to identify a projector to further determine angles w.r. to each projector)

(modulate each beam w. a unique bit pattern code to identify each projector to further determine angles w.r. to each projector)

Above shows that a 01010 partial hit will match
in 5 places in the M-sequence at A, B, C, D, and E Above shows that a 0100100110 full 10 bit hit will match
in one place in the M-sequence at A Part of the Lissajous pattern showing multiple matches in the repeating M-sequence Photosensor sees beam twice, can average times associated w. beam intensities to determine orientation

SYSTEMS AND METHODS FOR USING MULTIPLE MEMS PROJECTORS TO DETERMINE A POSITION OF A PHOTOSENSOR OF AN HMD OR ANOTHER CONTROLLER

CLAIM OF PRIORITY

This application claims priority, under 35 U.S.C. § 119(e), from U.S. Provisional Patent Application No. 62/202,766, filed on Aug. 7, 2015, and entitled "Systems And Methods For Using MEMS Projectors To Determine Position Of A Controller", which is incorporated herein by reference in its entirety for all purposes.

FIELD

The present disclosure relates to systems and methods for using multiple Micro-Electro-Mechanical Systems (MEMS) mirror projectors to determine a position of a photosensor of a controller.

BACKGROUND

The video gaming industry is gaining traction. With the advancement of time, more people are playing video games using gadgets, e.g., controllers, cell phones, head-mounted displays, etc. To play the video games, a position of a user is determined.

It is within this context that embodiments described in the present disclosure arise.

SUMMARY

In one embodiment, a system including a Micro-Electro-Mechanical Systems (MEMS) mirror is used to trace a beam across a measurement space. Many patterns of beam steering are possible using the MEMS mirror. However, as an example, a Lissajous variant pattern is applied. The Lissajous variant pattern is to drive the MEMS mirror in a resonant mode of operation, e.g., move the MEMS mirror along a y axis of the MEMS mirror below a resonant frequency of the MEMS mirror and to move the MEMS mirror along an x axis of the MEMS mirror above the resonant frequency. Criteria for repetition of the Lissajous variant pattern are set. When the MEMS mirror is a rotating mirror, measurements, e.g., pulses of a detected beam hit signal, etc., are limited to a pre-determined frequency, e.g., 60 hertz, a range between 55 hertz and 65 hertz, etc., of the Lissajous variant pattern.

By using the beam, an entire measurement space, e.g., volume, etc., is swept with one or two rotating MEMS mirrors at this rate. The beam moves more quickly than a line to scan the entire measurement space. By driving the MEMS mirror close to its resonant frequency, the beam is used and desired update rates are achieved for tracking the beam. The MEMS mirror moves in the resonant mode as long as frequencies of movement of the MEMS mirror along the x and y axes are within a few percentage of a resonant peak. A slight difference in the frequencies of movement of the MEMS mirror along the x and y axes in an order of, e.g., $\frac{1}{180}^{th}$, $\frac{1}{200}^{th}$, $\frac{1}{170}^{th}$, etc., generates the Lissajous variant pattern that fills the entire measurement space.

By using the beam instead of the line, a synchronized timing of the system is used to determine an orientation of the beam. The system further includes a receiver, e.g., a head-mounted display, a hand-held controller, etc., which includes one or more photosensors and the system includes a projector having the MEMS mirror to determine the orientation of the beam. Clock signals of both the projector and the receiver are synchronized to determine the beam orientation. In an embodiment, multiple photosensors in a rigid topology or multiple projectors with a known baseline facilitates a method of triangulation or Perspective-n-Point to determine a three-dimensional (3D) pose of the photosensor(s) with respect to the projector(s).

The Lissajous variant pattern is executed to facilitate a derivation of the orientation of the beam from a timing of the photosensor detected beam hit signal. With a configuration of a width of the beam and the frequencies, of the MEMS mirror, associated with the Lissajous pattern, the photo sensor detects intensity peaks of the beam several times per measurement period, e.g., a frequency of the Lissajous pattern repeat, etc. The timings of the intensity peaks allow for good overall averaging of the orientation of the beam. So even if there is noise in precision of the timings of the intensity peaks, by having a pre-determined number, e.g. 3 to 5, etc. of the intensity peaks per measurement period of the frequency of the Lissajous pattern, the noise is reduced to obtain the orientation of the beam.

In one embodiment, the projector generates infra-red light or visible light as the beam.

In an embodiment, multiple projectors are configured to perform time division multiplexing. For example, two projectors have alternate emission of beams so that one of the projectors does a sweep of the Lissajous variant pattern and then another one of the projectors performs a sweep of the Lissajous variant pattern.

In one embodiment, the time division multiplexing is performed at a finer grain, e.g., a period of the resonance mode of operation, etc.

In an embodiment, to achieve the synchronization, a global strobe illumination is used during each sweep of the Lissajous pattern or during fractions of the sweep. In one embodiment, to achieve the synchronization, wired communication or radio frequency (RF) communication is used.

In one embodiment, a beam is modulated by embedding a repeating bit code into the beam. In this way, the photo sensor detects several bits of the repeating bit code to differentiate between multiple uniquely coded projectors.

In an embodiment, a correlation to determine the repeating bit code is used to improve the time synchronization and consequently improve the measurement of the beam orientation when detected by the photosensor.

As an alternative to time division multiplexing, frequency multiplexing is used. For example, two different light frequencies are used and then filters are placed on photosensors so that one of the photosensors detects one of the frequencies from a first one of the projectors but not a second one of the projectors and another one of the photosensors detects another one of the frequencies from the second projector but not the first projector. Both the first and second projectors are on simultaneously.

BRIEF DESCRIPTION OF THE DRAWINGS

FIG. 4E is a diagram of an embodiment of a system to illustrate that each time at which the beam is generated corresponds to a different orientation of the beam with respect to an xyz co-ordinate system of the projector.

FIG. 6B is a diagram of an embodiment to illustrate that the location of the beam hit is determined using an intersection of a diameter of a portion of the Lissajous pattern and a diameter of another portion of the Lissajous pattern when there is no appreciable movement in the photosensor between detections.

FIG. 6C is a diagram of an embodiment to illustrate a linear correction in a location of the beam hit determined using an intersection of a diameter of a portion of the Lissajous pattern and a diameter of another portion of the Lissajous pattern when there is movement in the photosensor.

DETAILED DESCRIPTION OF THE EMBODIMENTS

Figure 1A:
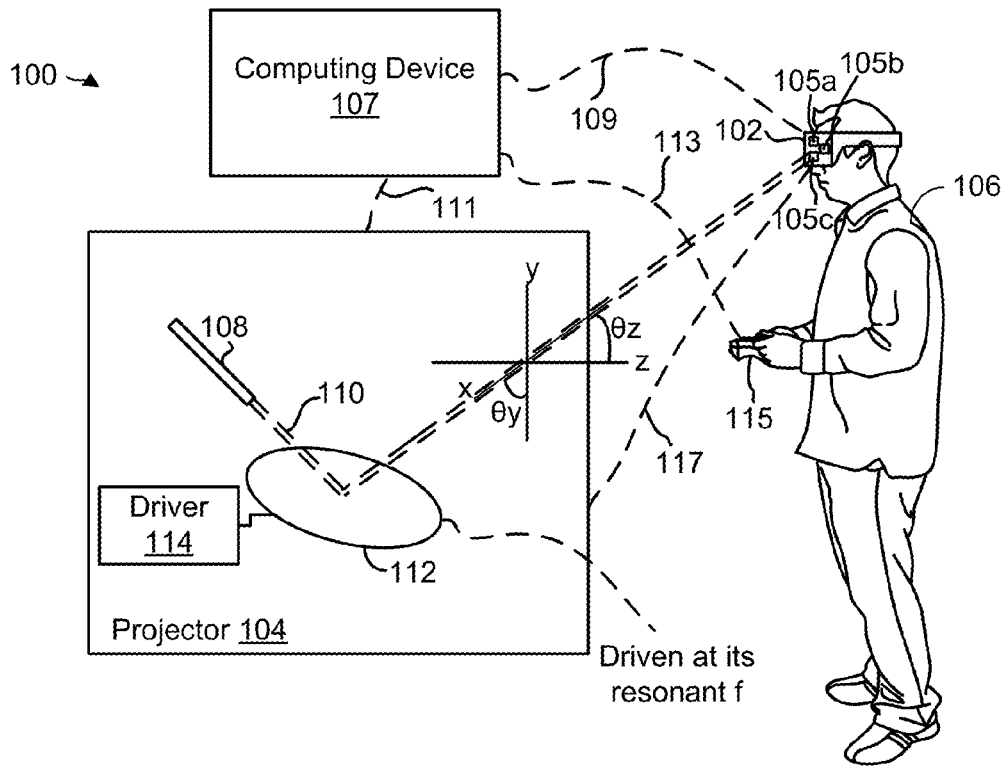
FIG. 1A is a diagram of an embodiment of a system to illustrate determination of a beam orientation of a beam to further determine a position of a head-mounted display (HMD) with respect to a projector.

FIG. 1A is a diagram of an embodiment of a system 100 to illustrate determination of a beam direction θ to further determine a position of a head-mounted display (HMD) 102 with respect to a projector 104. The system 100 includes the projector 104, the HMD 102, a computing device 107, and a hand-held controller 115. The HMD 102 is worn on head of a user 106 and the projector 104 is located within an environment, e.g., a room, a location, etc., in which the user 106 is located.

The computing device 107 is coupled to the HMD 102 via a link 109. An example of a link, as used herein, includes a wired link, e.g., a cable, etc. Another example of a link includes a wireless link. For example, a wireless communication device located within the computing device 107 applies a wireless communication protocol, e.g., Wi-Fi, Bluetooth, radio frequency (RF) protocol, etc., to communicate via the wireless link with a wireless communication link located within the HMD 102.

Similarly, the computing device 107 is coupled to the projector 104 via a link 111. For example, the wireless communication device located within the computing device 107 applies the wireless communication protocol to communicate via the wireless link with a wireless communication device located within the projector 104. Furthermore, the computing device 107 is coupled to the hand-held controller 115 via a link 113. For example, the wireless communication device located within the computing device 107 applies the wireless communication protocol to communicate via the wireless link with a wireless communication link device within the hand-held controller 115.

In one embodiment, a wireless communication device, as used herein, is a processor.

A beam generator 108 of the projector 104 emits a beam 110, which is reflected by a Micro-Electro-Mechanical Systems (MEMS) mirror 112 towards the HMD 102. The MEMS mirror 112 is driven by a driver 114, e.g., an actuator, a magnetic actuator, a thermal actuator, a magnet, etc., at one or more frequencies. For example, the MEMS mirror 112 is driven to move, e.g., translate, rotate, swing, etc., with respect to an X-axis of the MEMS mirror 112 and/or with respect to a Y-axis of the MEMS mirror 112. It should be noted that in some embodiments, axes, e.g., X-axis, Y-axis, etc., of the MEMS mirror 112 are different from axes, e.g., x-axis, y-axis, etc., of a projector. Examples of the beam generator 108 include a laser beam light source, an invisible light source, a visible light source, etc. The MEMS mirror 108 is a dual-axis mirror, e.g., a microscanner, etc. In one embodiment, the driver 114 is connected to a processor of the projector 104 and the processor of the projector 104 provides a control signal to the driver 114 to drive the MEMS mirror 112 at a repetition frequency, e.g., a frequency at which a pattern, e.g., a Lissajous pattern, a raster scan pattern, etc. is repeated by the MEMS mirror 112. Upon receiving the control signal, the driver 114 generates a field, e.g., a magnetic field, an electric field, etc., to control movement of the MEMS mirror 112.

The movement of the MEMS mirror 112 reflects the beam 110 at an angle $\theta x$ with respect to an x-axis of the projector 104, an angle $\theta y$ to a y-axis of the projector 104, and an angle $\theta z$ relative to a z-axis of the projector 104. In some embodiments, the z-axis of the projector 104 is defined by a direction of the beam 110 after being reflected from the MEMS mirror 112 when there is no displacement of the MEMS mirror 112. The angles $\theta x$, $\theta y$, and $\theta z$ provide an orientation of the beam 110 with respect to an origin of an xyz co-ordinate system of the projector 104. The origin of the xyz co-ordinate system is at an intersection of the x-axis of the projector 104, the y-axis of the projector 104, and the z-axis of the projector 104. A y-axis is perpendicular to an x-axis and both the x and y axes are perpendicular to a z-axis. The orientation of the beam 110 when detected by the photosensor 105a provides an orientation of the photosensor 105a with respect to the xyz co-ordinate system of the projector 104.

Multiple photosensors 105a, 105b, and 105c, e.g., photodiodes, etc., located on, e.g., fitted to, placed on, affixed to, etc., an outer surface of the HMD 102 detect the beam 110 to generate electrical sensor signals, which are then used by the computing device 107 to determine a pose of the HMD 102 from the projector 104, e.g., a distance along the beam 110 from the origin of the xyz co-ordinate system of the projector 104, etc., and an orientation of the HMD 102 with respect to the xyz co-ordinate system.

In one embodiment, the HMD 102 includes any other number of photosensors on its outer surface for sensing the beam 110. It should be noted that the outer surface of the HMD 102 is located opposite to an inner surface of the HMD 102. The inner surface of the HMD 102 faces eyes of the user 106 when the HMD 102 is worn by the user 102.

In an embodiment, instead of the Lissajous pattern, the raster scan is used.

In one embodiment, the beam direction, e.g., the angles $\theta x$, $\theta y$, and $\theta z$, etc., is measured with respect to a horizontal axis, e.g., the x-axis of the projector 104, etc., the vertical y-axis of the projector 104, and the forward z-axis of the projector 104.

In an embodiment, a beam generated by a projector, described herein, is a visible light beam, an infrared light beam, or a beam of another light frequency.

In one embodiment, an orientation of the beam hitting photosensor 105a with respect to the projector 104 is represented by the angles $\theta x$, $\theta y$, and $\theta z$ formed by the beam 110 with respect to the corresponding x-axis, y-axis, and z-axis of the projector 104 when the beam 110 is detected by the photosensor 105a.

In an embodiment, a position of the HMD 102 with respect to the projector 104 is the same as a position of the HMD 102 with respect to the origin of the xyz co-ordinate system. Moreover, an orientation of the HMD 102 with respect to the projector 104 is the same as the orientation of the HMD 102 with respect to the xyz co-ordinate system.

In one embodiment, a wide field of view is obtained by sweeping the beam 110. For example, when the MEMS mirror 112 does not have a sufficient pre-determined amount of deflection, a wide angle lens is used between the MEMS mirror 112 and an output of the projector 104 to output the beam 110 at a wide angle from the projector 104.

In an embodiment, an effect of the wide angle lens on beam divergence is determined.

In one embodiment, the beam 110 is modeled as a Gaussian beam.

In an embodiment, a part of the Lissajous pattern that is sparse compared to other parts of the Lissajous pattern is along the z axis of the projector 104.

In one embodiment, the beam 110 fills a space to avoid gaps. The space is a portion of the environment. For example, the space is an amount of the environment covered by movement of the beam 110 in the environment. As another example, the space is an amount of the environment in which a movement of the HMD 102 is detected by a sweep of the beam 110. An amount of the space filled by the beam 110 depends on a diameter of the beam 110, a divergence of the beam 110 from the projector 104, and a collection area of the photosensor 105a. The collection area of the photosensor 105a detects the beam 110. Increasing a diameter of the beam 110 allows for greater coverage but at a cost of measurement precision and power requirements of generating the beam 110.

In one embodiment, instead of or in addition to the diameter of the beam 110, a diameter of the photosensor 105a is increased.

In an embodiment, the photosensor 105a is at an oblique angle to the beam 110 or even partially occluded by a design of the HMD 112 so that the photosensor 105a cannot detect the beam 110. Without any lensing cap on the photosensor 105a, a flat disc of light of the beam 110 becomes an ellipse as it falls on the photosensor 105a as it turns away from the projector 104. The lensing cap improves an angular sensitivity of the photosensor 105a.

In an embodiment, the divergence of the beam 110 matches an optical projection frustum divergence so that at any particular distance from the projector 104, the Lissajous pattern has the same percentages of filled space. However, in one embodiment, in which the match does not occur, e.g., there is overlap at 1 meter range and no overlap at 3 meter range from the projector 104, etc., and the discrepancy in overlap is accounted for.

In one embodiment, the HMD 102 is coupled to the projector 104 via a link 117.

In some embodiments, the terms pose and position are used interchangeably herein.

Figure 1B:
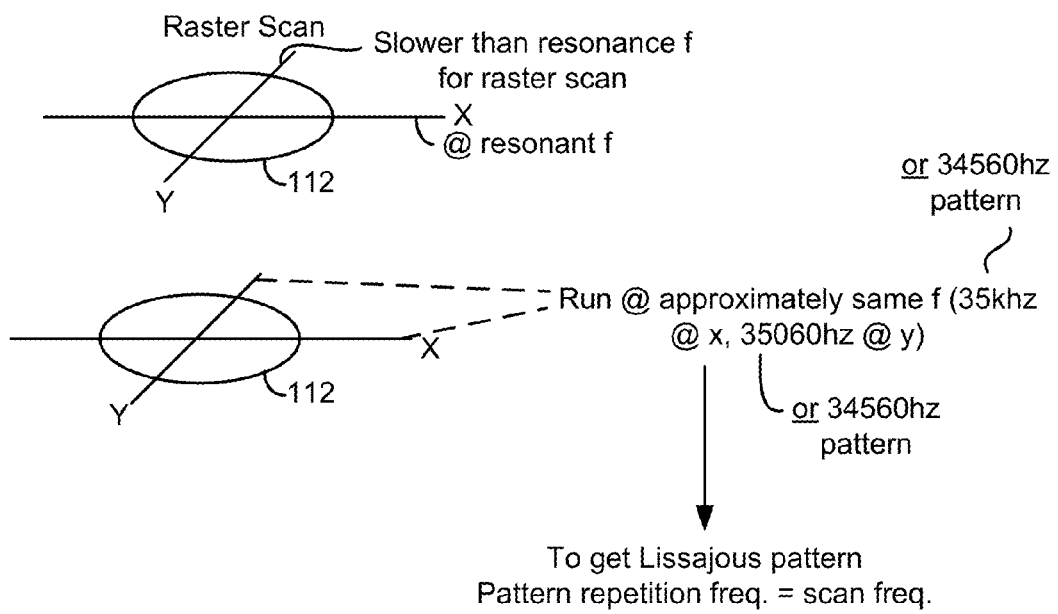
FIG. 1B is a diagram of an embodiment to illustrate frequencies of movement of a Micro-Electro-Mechanical Systems (MEMS) mirror.

FIG. 1B is a diagram of an embodiment of the MEMS mirror 112 to illustrate various frequencies of movement of the MEMS mirror 112. The MEMS mirror 112 is driven with respect to, e.g., about, etc., the X-axis of the MEMS mirror 112 at a frequency f1 and driven with respect to the Y-axis of the MEMS mirror 112 at a frequency f2. In an embodiment, the frequency f2 is different from the frequency f1. For example, when f1 is 35060 hertz (Hz), f2 is 35000 Hz. As another example, when f1 is 34,620 Hz, f2 is 34,560 Hz. As yet another example, when f1 is at a resonant frequency of the MEMS mirror 112, f2 is slower than the resonant frequency. As another example, a resonant frequency of the MEMS mirror 112 is an average of f1 and f2.

When f1 is less than f2 by a substantial pre-determined amount, an approximate raster scan of the HMD 102 is performed by the beam 110. When f1 is substantially the same as f2, then a more symmetrical Lissajous scan pattern emerges.

In one embodiment, the MEMS mirror 112 is driven in several modes. For example, to quickly scan with a large angular displacement in the MEMS mirror 112, one mode is a resonance mode in which driving frequencies at which the MEMS mirror 112 is driven by the driver 114 are close to a natural mechanical resonance of the MEMS mirror 112. Accordingly, the Lissajous pattern is efficient in terms of overall coverage of the space in a certain time frame.

Figure 2:
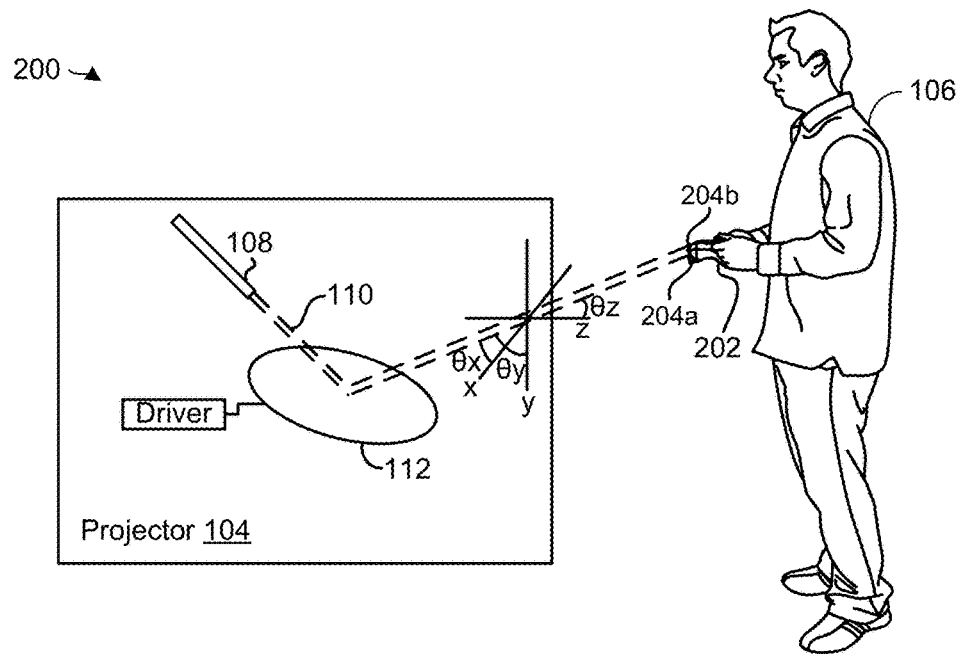
FIG. 2 is a diagram of an embodiment of a system to illustrate that instead of the HMD, a hand-held controller is scanned by the beam emitted by the projector to determine the beam direction to further determine a pose of the hand-held controller with respect to the projector.

FIG. 2 is a diagram of an embodiment of a system 200 to illustrate that instead of or in addition to the HMD 102, a hand-held controller 202 is scanned by the beam 110 of the projector 104 to determine the beam orientation, which includes the angles θx, θy, and θz, to further determine a pose of the hand-held controller 202 with respect to the projector 104. Examples of a hand-held controller, as used herein, include a game controller, a game pad, a paddle, a joystick, a trackball, a gun-shaped controller, a bow-shaped controller, a steering wheel, a yoke, a keyboard, a mouse, a tablet, a cell phone, etc. In one embodiment, the HMD 102 is an example of a controller.

The hand-held controller 202 has multiple photosensors 204a and 204b, e.g., photodiodes, etc., on its surface for sensing the beam 110. In some embodiments, the hand-held controller 202 includes any other number of photosensors, e.g., three, four, five, ten, twenty, etc., on its surface for sensing the beam 110. The projector 104 operates in a similar manner to that described above to generate the beam 110 and to direct the beam 110 at the angles θx, θy, and θz with respect to the projector 104. The photosensor 204a on the hand-held controller 202 senses the beam 110 to generate the electrical sensor signals, which are then used to determine an orientation including the angles θx, θy, and θz of the beam 110 with respect to the projector 104 when the photosensor 204a senses the beam 110. The orientation of the beam 110 with respect to the projector 104 when the beam 110 is sensed by the photosensor 204a provides an orientation of the photosensor 204a with respect to the origin of the xyz co-ordinate system of the projector 104. The orientation is then used to determine a position of the photosensor 204a from the origin of the xyz co-ordinate system of the projector 104. In this manner, orientations of the photosensors 204a and 204b are determined with respect to the xyz co-ordinate system of the projector 104 to determine a pose of the hand-held controller 202 with respect to the xyz co-ordinate system of the projector 104. The pose of the hand-held controller is calculated when at least three photosensors on the handheld controller have known directions with respect to the projector's coordinate system using a technique, such as, for example, Perspective-n-Point, etc. To illustrate, a square of distance between the photosensors 105a and 105b is expressed as a first relation expressed as $1^2_{ab}=a^2+b^2-2ab(\cos \theta_{ab})$, where a is a distance of the photosensor 105a from the origin of the xyz co-ordinate system of the projector 104, b is a distance of the photosensor 105b from the origin of the xyz co-ordinate system of the projector 104, cos is a cosine function, and $\theta_{ab}$ is an angle between the distances a and b. Moreover, a square of distance between the photosensors 105b and 105c is expressed as a second relation expressed as $1^2_{bc}=b^2+c^2-2bc(\cos \theta_{bc})$, where c is a distance of the photosensor 105c from the origin of the xyz co-ordinate system of the projector 104, and $\theta_{bc}$ is an angle between the distances b and c. Also, a square of distance between the photosensors 105a and 105c is expressed as a third relation expressed as $1^2_{ac}=a^2+c^2-2ab(\cos \theta_{ac})$, where $\theta_{ac}$ is an angle between the distances a and c. The distances lab, lbc, and lac are pre-determined by the processor 302. Moreover, the angles $\theta_{ac}$, $\theta_{bc}$, and $\theta_{ac}$ are determined by the processor 302 from the orientations of the photosensors 105a, 105b, and 105c with respect to the origin of the xyz co-ordinate system of the projector 104. The processor 302 solves for the distances a, b, and c by solving the three relationships.

In an embodiment, a position of the hand-held controller 202 with respect to the projector 104 is the same as a position of the hand-held controller 202 with respect to the origin of the xyz co-ordinate system of the projector 104. Moreover, an orientation of the hand-held controller 202 with respect to the projector 104 is the same as the orientation of the hand-held controller 202 with respect to the xyz co-ordinate system of the projector 104.

In one embodiment, the hand-held controller 202 is the same as the hand-held controller 115 (FIG. 1A) except that the hand-held controller 202 includes multiple photosensors 204a, 204b and more.

Figure 3:
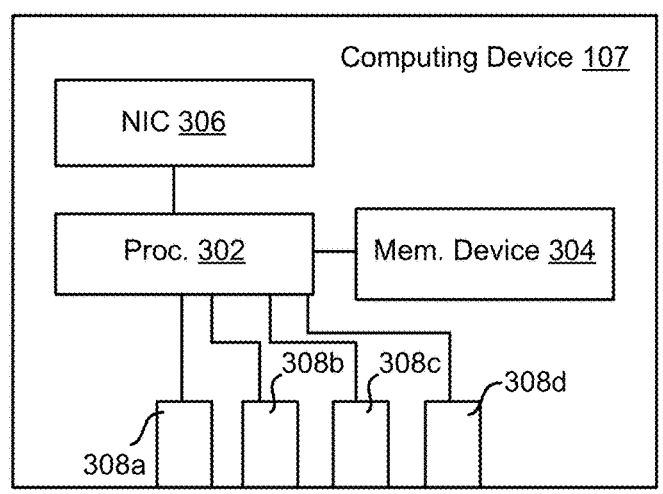
FIG. 3 is a block diagram to illustrate a computing device including a processor that executes one or more of the operations described herein.

FIG. 3 is a block diagram to illustrate a computing device 107 that performs one or more operations, e.g., mathematical operations, calculation operations, determination operations, etc., described herein. The computing device 107 includes a processor 302, a memory device 304, a network interface controller 306, and multiple input/output (I/O) ports 308a, 308b, 308c, and 308d. An example of the network interface controller 306 includes a network interface card (NIC) for accessing a computer network, e.g., a local area network (LAN), a wide area network (WAN) such as the Internet, or a combination thereof, etc. An example of each the I/O ports 308a-308d include a serial port, a parallel port, or a Universal Serial Bus (USB) port. The serial port transfers data in a serial manner, e.g., one bit at a time, etc., between the processor 302 and an I/O device, e.g., the HMD 102, the hand-held controller 115 (FIG. 1A), the projector 104 (FIG. 1A), etc., that is coupled to the serial port. The parallel port transfers data in a parallel manner, e.g., multiple bits at a time, etc., between the processor 302 and the I/O device that is coupled to the parallel port. The USB port applies the USB protocol to transfer data between the processor 302 and the I/O device that is coupled to the USB port. A processor, as used herein, refers to a central processing unit (CPU), an application specific integrated circuit (ASIC), or a programmable logic device (PLD) is used, and these terms are used interchangeably herein. Examples of a memory device, as used herein, include a read-only memory (ROM), a random access memory (RAM), a hard disk, a volatile memory, a non-volatile memory, a redundant array of storage disks, a Flash memory, etc. Examples of a computing device include a game console, a desktop computer, a laptop computer, a smart television, a tablet, a cell phone, etc.

In one embodiment, the computing device 107 is accessible via the computer network by the HMD 102 and/or the projector 104. For example, the computing 300 device is a portion of a cloud network or a server rack.

In an embodiment, any of the processing operations described herein as being performed by the computing device 107 are performed in the cloud network.

Figure 4A:
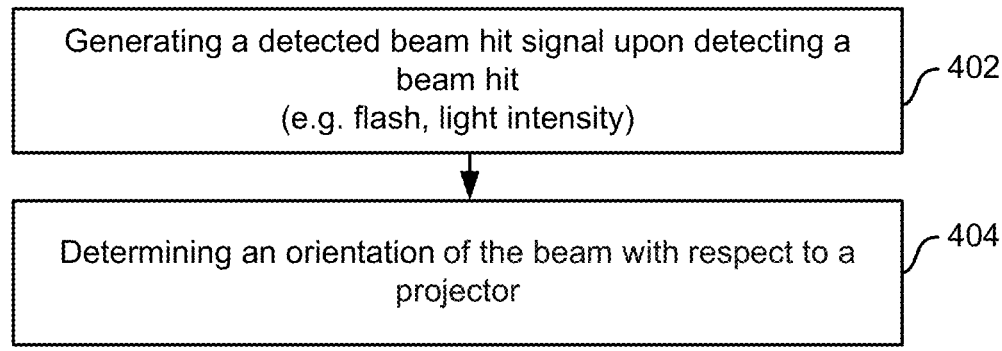
FIG. 4A is a flowchart of an embodiment of a method for determining the beam orientation.

FIG. 4A is a flowchart of an embodiment of a method 400 for determining the orientation of the photosensor 105a with respect to the origin of the xyz co-ordinate system. The photosensor 105a located on the HMD 102 generates, in an operation 402, a detected beam hit signal, e.g., a signal having a pulse having a light beam intensity peak, a signal having a pulse having a light beam intensity local maxima, an electrical sensor signal, a signal having a pulse having a maximum amplitude, etc., when the beam 110 is sensed by the photosensor 105a. The photosensor 105a sends the detected beam hit signal to the processor 302 of the computing device 107. The processor 302 determines, in an operation 404, the orientation of the photosensor 105a with respect to the origin of the xyz co-ordinate system based on the detected beam hit signal according to a method 450 described below with respect to FIG. 4B.

Figure 4B:
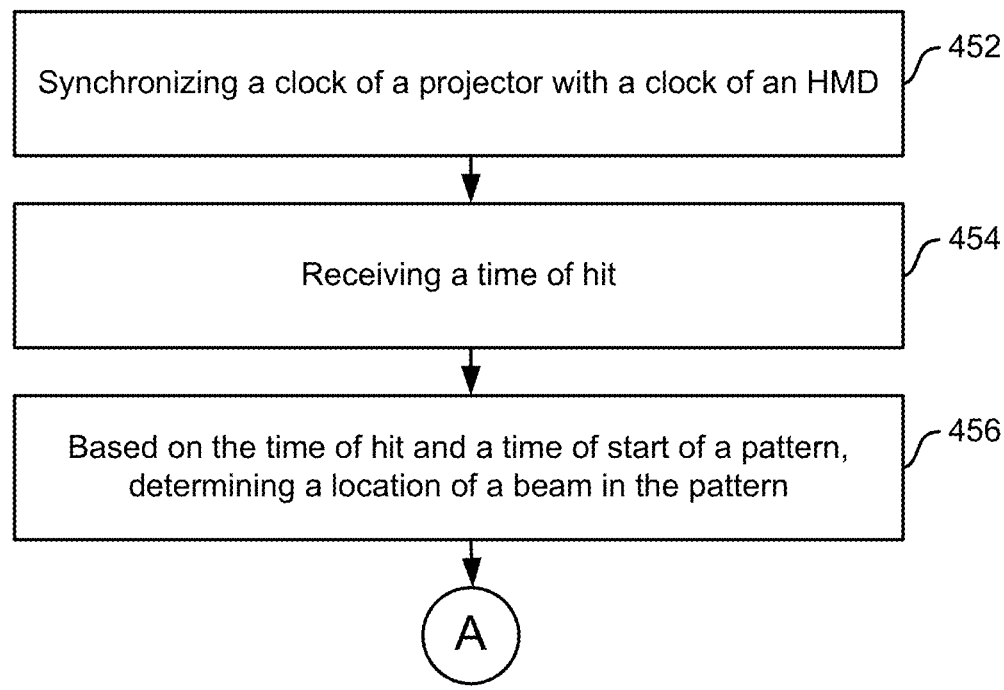
FIG. 4B is a flowchart of an embodiment of a method for determining the beam orientation and the pose of the HMD.

FIG. 4B is a flowchart of an embodiment of the method 450 for determining the orientation of the photosensor 105a with respect to the origin of the xyz co-ordinate system of the projector 104. It should be noted that during the projection and scanning of beam 110 from the projector 104 (FIG. 1A), a clock signal generated by a clock source, e.g., a crystal oscillator, a clock oscillator, a clock signal generator, etc., of the projector 104 is continuously synchronized, in an operation 452, with a clock signal generated by a clock source, e.g., a crystal oscillator, a clock oscillator, a clock signal generator, etc., of the HMD 102. For example, the clock signal generated by the clock source of the HMD 102 is within a pre-determined phase difference from the clock signal generated by the clock source of the projector 104. As another example, the clock signal of the HMD 102 has the same phase as that of the clock signal of the projector 104. A location of movement of the MEMS mirror 112 and the beam 110 in a pattern, e.g., the Lissajous pattern, the raster scan pattern, etc., is determined using the clock signal generated within the projector 104 and a time of detection of the beam 110, e.g., a time of peak intensity of the pulse of the beam 110, a time of maximum amplitude of the pulse, a time of amplitude peak of the pulse, etc., by the photosensor 105a. The time of detection of the beam 110 is measured by the clock signal generated within the HMD 102.

The synchronization of the clock signal generated by the projector 104 with the clock signal generated by the HMD 102 is performed by the processor 302 of the computing device 107. For example, the processor 302 of the computing device 107 communicates via the link 111 (FIG. 1A) with the processor of the projector 104 to receive a phase of the clock signal of the projector 104. The processor of the projector 104 is coupled to the clock source of the projector 104. Moreover, the processor 302 of the computing device 107 communicates via the link 109 (FIG. 1A) with a processor of the HMD 102 to provide the phase of the clock signal to the processor of the HMD 102. Upon receiving the phase, the processor of the HMD 102 sends a signal to the clock source of the HMD 102 to modify a phase of the clock signal of the HMD 102 so that the phases of the clock signal of the projector 104 and of the clock signal of the HMD 102 are synchronized.

In one embodiment, the processor of the projector 104 sends a phase of the clock signal generated by the clock source of the projector 104 via the link 117, e.g., a radio frequency signal link, a wireless link, a wired communication medium, etc., between the projector 104 and the HMD 102 to the processor of the HMD 102. The processor of the HMD 102 receives the phase of the clock signal of the projector 104 and modifies a phase of the clock signal generated by the clock source of the HMD 102 to match with the phase of the clock signal of the projector 104.

In an embodiment, the processor of the HMD 102 sends a phase of the clock signal generated by the clock source of the HMD 102 via the link 117 between the projector 104 and the HMD 102 to the processor of the projector 104. The processor of the projector 104 receives the phase of the clock signal of the HMD 102 and modifies a phase of the clock signal generated by the clock source of the projector 104 to match with the phase of the clock signal of the HMD 102.

In one embodiment, when the clock signals of the HMD 102 and the projector 104 are synchronized, there is less than a pre-determined phase difference between phases of the clock signals.

In an embodiment, a processor of a device, e.g., the HMD 102, the projector 104, etc., sends a phase, of a clock signal, received from another device, e.g., the projector 104, the HMD 102, etc., to a phase-locked loop (PLL) of the device and the PLL matches the phase to a phase of a clock signal generated by the device.

The photosensor 105a sends the detected beam hit signal to the processor of the HMD 102. The processor of the HMD 102 converts the detected beam hit signal from an analog form to a digital form and sends the digital form of the beam hit signal timing via the link 109 (FIG. 1A) to the computing device 107. Moreover, the processor of the HMD 102 obtains a time of hit of the beam 110, e.g., a time of occurrence of the peak magnitude of the pulse of the beam 110, a time of occurrence of the local maxima of intensity of the pulse of the beam 110, a time of an increase in intensity of the beam 110 beyond a pre-determined limit, a time of generation of the pulse of the detected beam hit signal, etc., on the photosensor 105a from the clock source of the HMD 102 and sends the time of hit via the link 109 to the processor 302 of the computing device 107. The processor 302 of the computing device 107 receives, in an operation 454, the detected beam hit signal and the time of hit of the beam 110 on the photosensor 105a. The time of hit of the beam 110 is a time at which the beam 110 is detected by the photosensor 105a and is measured by the clock source of the HMD 102.

The processor 302 determines, in an operation 456, a location of the beam 110 within the pattern based on the time of hit and a time of start of the pattern. In one embodiment, the time of start of the pattern is obtained by the processor 302 from the processor of the projector 104 via the link 111 (FIG. 1A), and is a time at which the MEMS mirror 112 moves to create or repeat the pattern. The processor of the projector 104 obtains the time of start of the pattern from the clock source of the projector 104. The clock source of the projector 104 measures the time of start of the pattern. As an example of the determination of the location of the beam 110 within the pattern, the processor 302 of the computing device 107 determines from the time of the start of the pattern, the frequency f1, the frequency f2, and the time of hit, the location of the beam 110 within the pattern. To illustrate, the processor 302 of the computing device 107 determines that the time of start corresponding to an initial location of the beam 110 in the pattern. Moreover, the processor 302 determines that the initial location changes according to the frequencies f1 and f2 of the MEMS mirror 112 to achieve the location of the beam on the pattern 110 at the time of hit. In one embodiment, a correspondence, e.g., a one-to-one relation, etc., among the frequencies f1 and f2, the time of hit, the time of start, and the location of the beam 110 in the pattern is stored in the memory device 304 of the computing device 107. The correspondence is accessed by the processor 302 to determine the location of the beam 110 in the pattern from the time of start, the frequencies f1 and f2, and the time of hit.

Figure 4C:
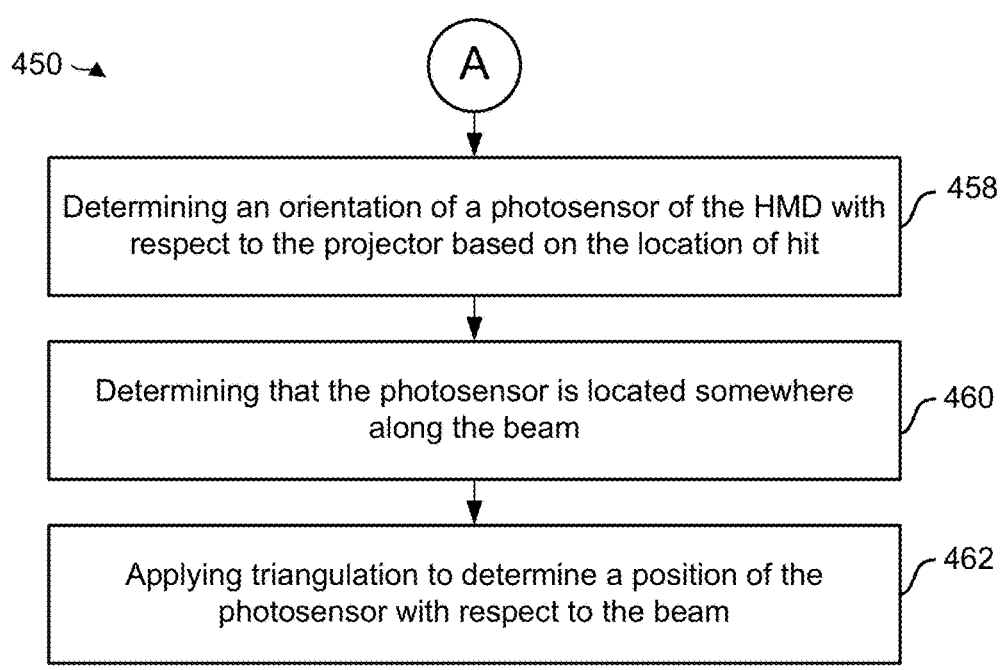
FIG. 4C is a continuation of the flowchart of FIG. 4B.
Figure 4D:
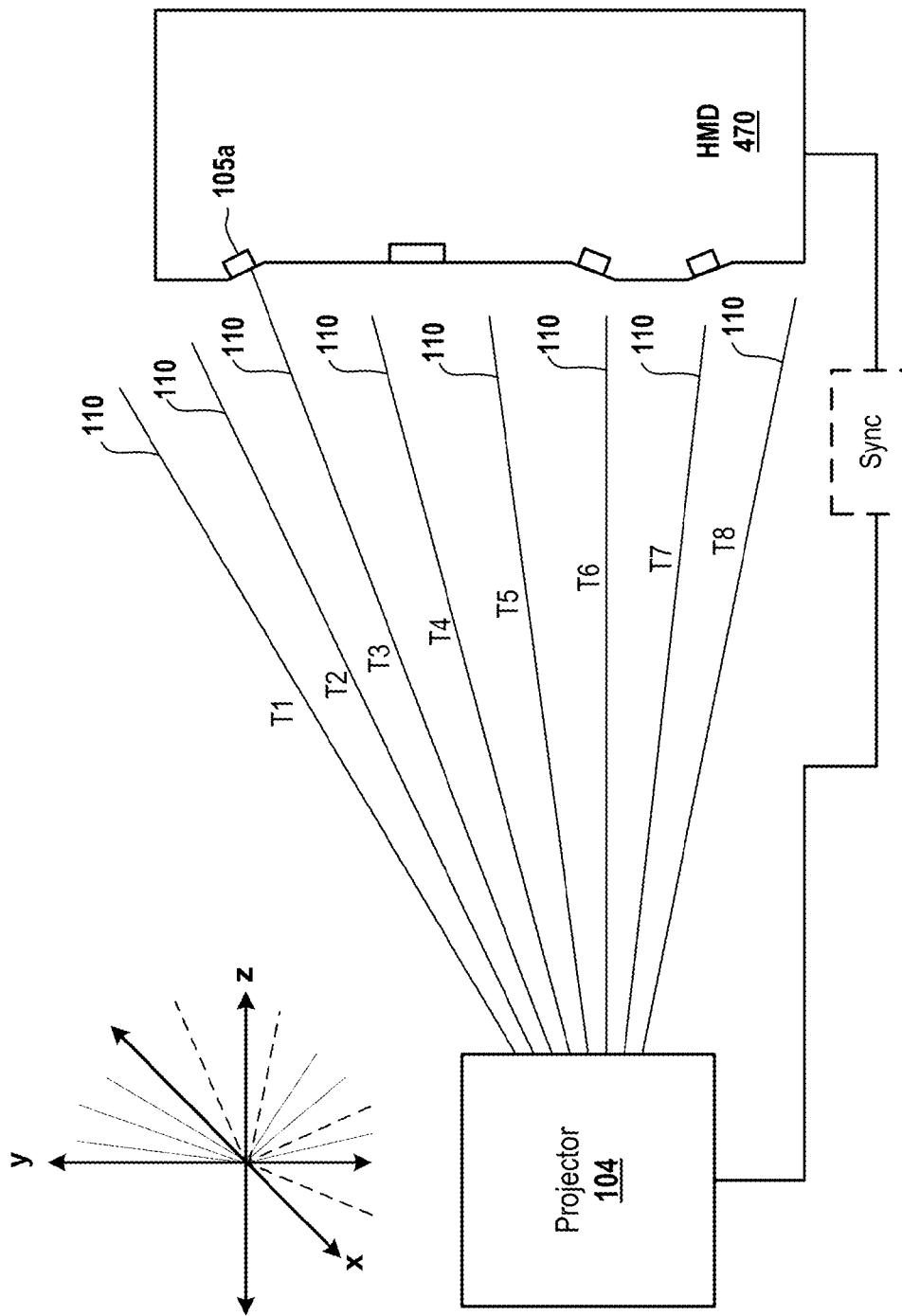
FIG. 4D is a diagram of an embodiment of a system to illustrate a determination of the beam orientation.

FIG. 4C is a continuation of the flowchart of FIG. 4B and of the method 450 of FIG. 4B. In an operation 458, the processor 302 of the computing device 107 determines the orientation of the photosensor 105a with respect to the origin of the xyz co-ordinate system of the projector 104 from the location on the pattern. For example, as shown in FIG. 4D, the clock signals of the projector 104 and an HMD 470 are synchronized. The HMD 470 is an example of the HMD 102 (FIG. 1A). The projector 104 emits the beam 110 at times T1 through T8 as the beam 110 follows the pattern. The times T1 through T8 are measured by the clock source of the projector 104. Each time T1 through T8 corresponds to a different orientation of the beam 110 with respect to the xyz co-ordinate system of the projector 104. It should be noted that the generation of the beam 110 is shown along the y-axis of the projector 104 for simplicity purposes. The beam 110 scans to form the pattern along the x-axis of the projector 104 and also along the y-axis of the projector 104 as shown by the xyz co-ordinate system in FIG. 4D. The photosensor 105a detects the beam 110 at the time T3. As illustrated with reference to FIG. 4E, based on a one-to-one correspondence, e.g., mapping, relationship, link, etc., with the time T3, the processor 302 of the computing device 107 determines that the orientation of the beam 110 is at angles θx1, θy1, and θz1 with respect to the origin of the xyz co-ordinate system of the projector 104. For each repetition of the pattern, there is a one-to-one correspondence between the time of hit, the angles θx, θy, and θz, and the location of the beam 110 in the pattern. The user 106 then moves to move the HMD 102 with respect to the origin of the xyz co-ordinate system of the projector 104. After the movement of the HMD 102, the photosensor 105a detects the beam 110 at the time T4. From a one-to-one correspondence with the time T4, the processor 302 determines that the orientation of the beam 110 is at angles θx2, θy2, and θz2 with respect to the origin of the xyz co-ordinate system of the projector 104.

As shown in FIG. 4E, each of the photosensors of an HMD 470 is angled with respect to a front face of the HMD 470, which is an example of the HMD 102. For example, the photosensor 105a is angled to form an angle φ1 with respect to a y-axis of the HMD 470. A direction of the y-axis of the HMD 470 changes with a movement of the HMD 470.

Referring back to FIG. 4C, the processor 302 further determines, in an operation 460, that the photosensor 105a, which detects the beam 110, is located somewhere along the beam 110. The processor 302 applies, in an operation 462, a method of triangulation, described below, to determine a position of the photosensor 105a with respect to the xyz co-ordinate system of the projector 104 (FIG. 1A).

In some embodiments an orientation of a photosensor that is not angled with respect to, e.g., is parallel to, etc., the front face of the HMD 470 detects the beam 110 is the same as that of the beam 110. In these embodiments, the orientation of the photosensor and the beam 110 is with respect the xyz co-ordinate system of the projector 104. In various embodiments, an orientation of a photosensor that is angled with respect to the front face of the HMD 470 is a combination of an angle formed by the photosensor with respect to the front face of the HMD 470 and the angle formed by the beam 110 with respect to the xyz co-ordinate system of the projector 104.

FIG. 4D is a diagram of an embodiment of a system to illustrate the determination of the orientation of the photosensor 105a with respect to the projector 104. The system illustrated in FIG. 4D includes the HMD 470 and the projector 104. The projector 104 emits the beam 110 at the times T1 through T8 during a scan to form the pattern and the beam 110 is detected by one or more photosensors of the HMD 470.

FIG. 4E is a diagram of an embodiment of a system to illustrate that each of the times T1 through T8 at which the beam 110 is generated corresponds to a different orientation of the beam 110 with respect to the xyz co-ordinate system of the projector 104. For example, the time T3 corresponds to a first combination of values of the angles θx, θy, and θz, and the time T4 corresponds to a second combination of values of the angles θx, θy, and θz. It should be noted that at least one of the values of the first combination is different from at least one of the corresponding values of the second combination. For example, the value of the angle θx of the first combination is different from the value of the angle θx of the second combination, and/or the value of the angle θy of the first combination is different from the value of the angle θy of the second combination, and/or the value of the angle θz of the first combination is different from the value of the angle θz of the second combination.

Figure 5:
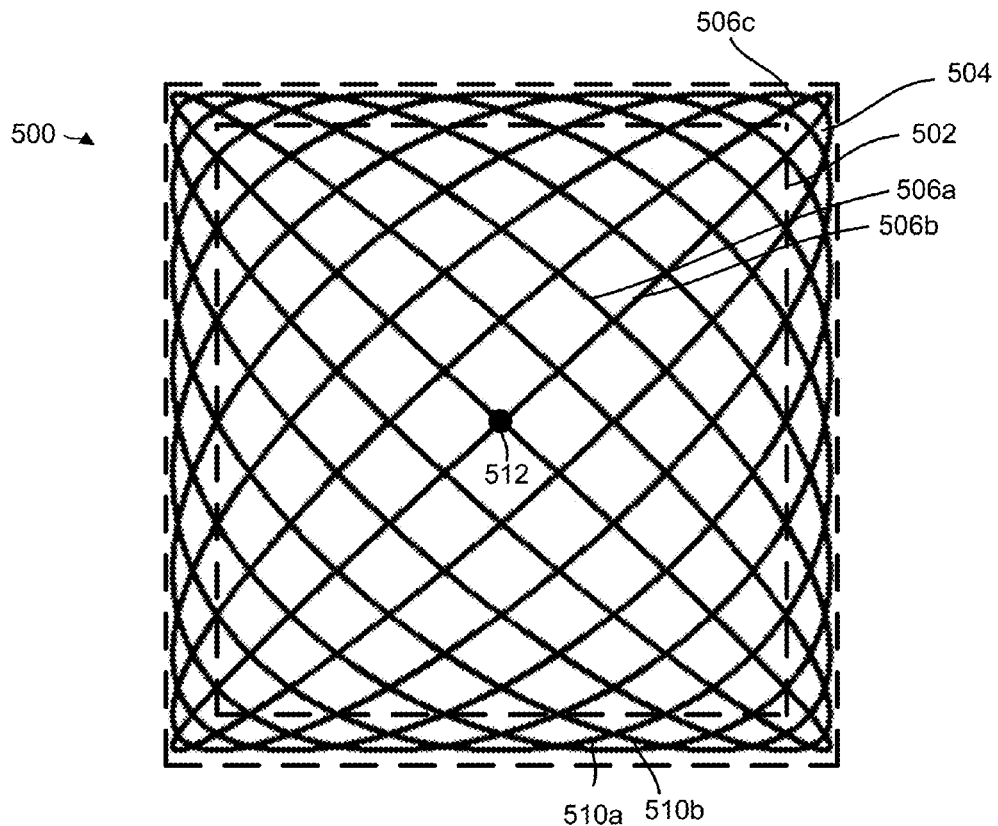
FIG. 5 is a diagram of an embodiment of a Lissajous pattern.

FIG. 5 is a diagram of an embodiment of a Lissajous pattern 500. The Lissajous pattern 500 has a central region 502 and an edge region 504. As shown, angles between traversal of the Lissajous pattern 500 in the central region 502 are greater than angles between traversal of the Lissajous pattern 500 in the edge region 504. For example, an angle between a portion 506a of the Lissajous pattern 500 and a portion 506b of the Lissajous pattern 500 is greater than an angle between the portion 506b and a portion 506c of the Lissajous pattern 500. For example, the angle between the portions 506a and 506b in the central region 502 is between 80 degrees and 90 degrees and the angle between the portions 506b and 506c in the edge region 504 is less than 45 degrees. As another example, an angle between a portion 510a of the Lissajous pattern 500 in the edge region 504 and a portion 510b of the Lissajous pattern 500 in the edge region 504 is less than 45 degrees.

The Lissajous pattern 500 has an origin 512 at which there is zero angular displacement of the beam 110 with respect to the xyz co-ordinate system of the projector 104. The Lissajous pattern 500 starts at the origin 512 and ends at the origin 512 and then repeats in a continuous way.

In an embodiment, the Lissajous pattern 500 is represented as:

$$x = A \sin(\omega_1 t + \delta) \quad \text{(equation 1)}$$

along the X-axis of the MEMS mirror 112, and as $$y = B \sin(\omega_2 t) \quad \text{(equation 2)},$$

along the Y-axis of the MEMS mirror 112, where $\omega_1 = 2\pi t\, f1$ and $\omega_2 = 2\pi t\, f2$, t is time, A is an amplitude of the Lissajous pattern 500 along the X-axis of the MEMS mirror 112, and B is an amplitude of the pattern 500 along the Y-axis of the MEMS mirror 112, and δ is a phase difference between the Lissajous pattern 500 along the X-axis of the MEMS mirror 112 compared to the Y-axis of the MEMS mirror 112.

In one embodiment, the phase δ is not needed. So, the equation (1) becomes $$x = A \sin(\omega_1 t) \qquad \text{(equation 3)}.$$

In an embodiment in which f1 is greater than f2, a repeat frequency F at which a frame of the Lissajous pattern 500 is repeated is equal to a difference between f1 and f2. A value of f1 and/or a value of f2 determines a density of the Lissajous pattern 500.

Figure 6A:
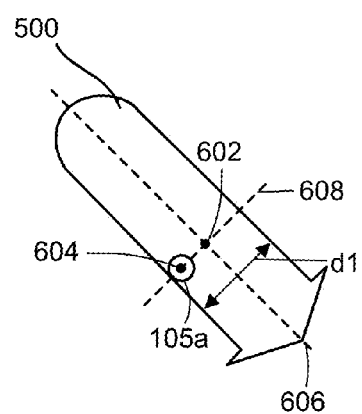
FIG. 6A is a diagram of an embodiment to illustrate a measured location of a photosensor with respect to an actual location of the photosensor to determine a location of a beam hit within a diameter of the beam.

FIG. 6A is a diagram of an embodiment to illustrate a measured location 602 of the photosensor 105a with respect to an actual location 604 of the photosensor 105a to determine the location of the beam hit in the Lissajous pattern 500. The measured location 602 of the photosensor 105 is determined with reference to the origin of the xyz co-ordinate system of the projector 104. The Lissajous pattern 500 of the beam 110 is shown as being incident on the photosensor 105a and has a Lissajous axis 606, which provides a direction followed by the Lissajous pattern 500. A diameter of the Lissajous pattern 500 is d1, e.g., 10 millimeters, 5 millimeters, 8 millimeters, etc. Instead of the actual location 604, the processor 302 determines the location of the photosensor 105a with respect to the origin of the xyz co-ordinate system of the projector 104 to be anywhere along an axis 608 orthogonal to the Lissajous axis 606. For example, the processor 302 determines the location of the photosensor 105a with respect to the origin of the xyz co-ordinate system of the projector 104 to be at a point at the measured location 602. The point at the measured location 602 is at an intersection of the Lissajous axis 606 and the axis 608. The axis 608 extends via the actual location 604 at which the beam hit is detected. In this way, a reading will have accuracy along a sweep of the beam 110 but its accuracy orthogonal to the beam 110 depends upon the diameter d1 of the beam 110 and a size, e.g., a diameter, etc., of the photosensor 105a. As shown, a diameter of the photosensor 105a is smaller than the diameter d1 of the Lissajous pattern 500 followed by the beam 110.

FIG. 6B is a diagram of an embodiment to illustrate that the location of the beam hit is determined using an intersection of the diameter d1 of the portion 506a and the diameter d1 of the portion 506b of the Lissajous pattern 500 when there is no movement in the photosensor 105a between the illumination of the photosensor by each of the Lissajous pattern sweeps shown. The location of the beam hit is the actual location 604, which is at the intersection of the diameter d1 of the portion 506a and the diameter d1 of the portion 506b. The photosensor 105a generates a detected beam hit signal at a time t1 during the portion 506a of the Lissajous pattern 500 and generates another detected beam hit signal at a time t2 during the portion 506b of the Lissajous pattern 500. The portion 506a traverses in a direction angular, e.g., at a 90 degree angle, at an angle between 80 and 95 degrees, etc., to a direction in which the portion 506b traverses. Moreover, there is no movement of the photosensor 105a when the Lissajous pattern 500 traverses in the angular directions. The location of the beam hit is determined when the photosensor 105a detects the beam hit multiple times, e.g., the times t1 and t2, etc., during the frame, e.g., one round of execution, etc., of the Lissajous pattern 500.

In one embodiment, when the Lissajous pattern 500 and a size of the photosensor 105a are matched, e.g., same diameter, diameters within a pre-determined range from each other, etc., a first detected beam hit signal is obtained during the frame when the portion 506a sweeps, e.g., during a first sweep, etc., across the photosensor 105a and a second detected beam hit signal is obtained during the frame when the beam 110 sweeps, e.g., during a second sweep, etc., approximately orthogonally to the first sweep. The second sweep occurs when the portion 506b sweeps across the photosensor 105a. The clock source of the HMD 102 measures a time at which the first detected beam hit signal is generated and measures a time at which the second detected beam hit signal is generated. The processor 302 determines from the times associated with the first and second detected beam hit signals the orientation of the photosensor 105a with respect to the origin of the xyz co-ordinate system of the projector 104. For example, the processor 302 determines a corresponding first orientation of the beam 110 with respect to the origin of the xyz co-ordinate system of the projector 104 based on the time at which the first detected beam hit signal is generated. Moreover, the processor 302 determines a corresponding second orientation of the beam 110 with respect to the origin of the xyz co-ordinate system of the projector 104 based on the time at which the second detected beam hit signal is generated. The processor 302 calculates a statistical value, e.g., an intersection of the d1 uncertainty between the first and second orientations, etc., to determine an orientation of the beam 110 with respect to the origin of the xyz co-ordinate system of the projector 104. In one embodiment, the orientation of the beam 110 that is determined by the processor 302 is the same as that of the photosensor 105a with respect to the origin of the xyz co-ordinate system of the projector 104.

FIG. 6C is a diagram of an embodiment to illustrate that the location of the beam hit is determined using an intersection of the diameter d1 of the portion 506a and the diameter d1 of the portion 506b of the Lissajous pattern 500 and the location is corrected when there is movement in the photosensor 105a. Between a movement from the portion 506a to the portion 506b of the Lissajous pattern 500, the photosensor 105a moves from a position P1 to a position P2 by an amount 610. At the position P1, the photosensor 105a generates a detected beam hit signal at a time ta during the portion 506a of the Lissajous pattern 500 and at the position P2, the photosensor 105a generates another detected beam hit signal at a time tb during the portion 506a of the Lissajous pattern 500. An intersection of the diameter d1 when the photosensor 105a is at the position P1 and the diameter d1 when the photosensor 105a is at the position P2 is an error location of the photosensor 105a with respect to the origin of the xyz co-ordinate system of the projector 104. The error location is corrected by the processor 302 based on the movement 610 to remove an error 614 in the error location 612 to achieve the location of the photosensor 105a with respect to the origin of the xyz co-ordinate system of the projector 104. The movement 610 is predicted by the processor 302 based on previously stored movement of the photosensor 105a that is recorded in the memory device 304 of the computing device 107 and may be the result of sensor fusion with other measurement sensors, such as, inertial measurement units (IMUs), e.g., accelerometers and gyroscopes, etc.

In an embodiment, the method that is described above with reference to FIG. 6B or FIG. 6C in which the intersection of the diameters d1 is used, is used to determine the location of the photosensor 105a with respect to the origin of the xyz co-ordinate system of the projector 104 when the photosensor 105a encounters the beam 110 in the edge region 504 (FIG. 5) of the Lissajous pattern 500.

Figure 6D:
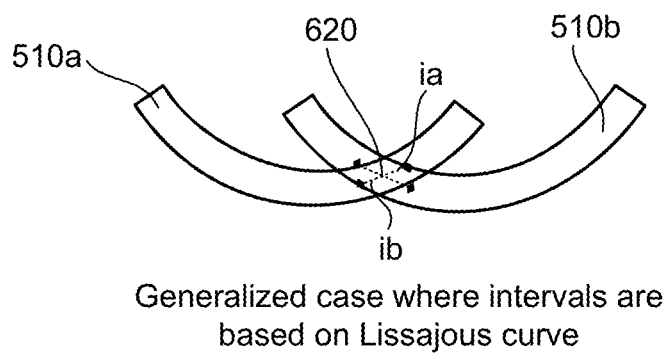
FIG. 6D shows a more generalized correction based around the formula of the Lissajous curves and the correction is more accurate than a simple linear correction.

FIG. 6D shows the portions 510a and 510b of the Lissajous pattern 500 to illustrate a determination of the location of the photosensor 105a with respect to the origin of the xyz co-ordinate system of the projector 104 when the photosensor 105a is stationary and encounters the beam 110 in the edge region 504 (FIG. 5) of the Lissajous pattern 500. A location of the photosensor 105a that detects the beam 110 is determined by the processor 302 to be at an intersection 620 of an interval ia of the portion 510a and an interval ib of the portion 510b. For example, at a time tc at which the photosensor 105a detects the portion of the interval ia of the beam 110, the processor 302 calculates a curved trajectory of the Lissajous pattern segment 510a and similarly at a time td at which the photosensor 105a detects a portion of the interval ib of the beam 110, the processor 302 calculates a curved trajectory of the Lissajous pattern segment 510b. The measured location of the photosensor 105a with respect to the origin of the xyz co-ordinate system of the projector 104 is calculated by the processor 302 by intersecting the two measured curved trajectories, e.g., segments, etc.

Figure 7A:
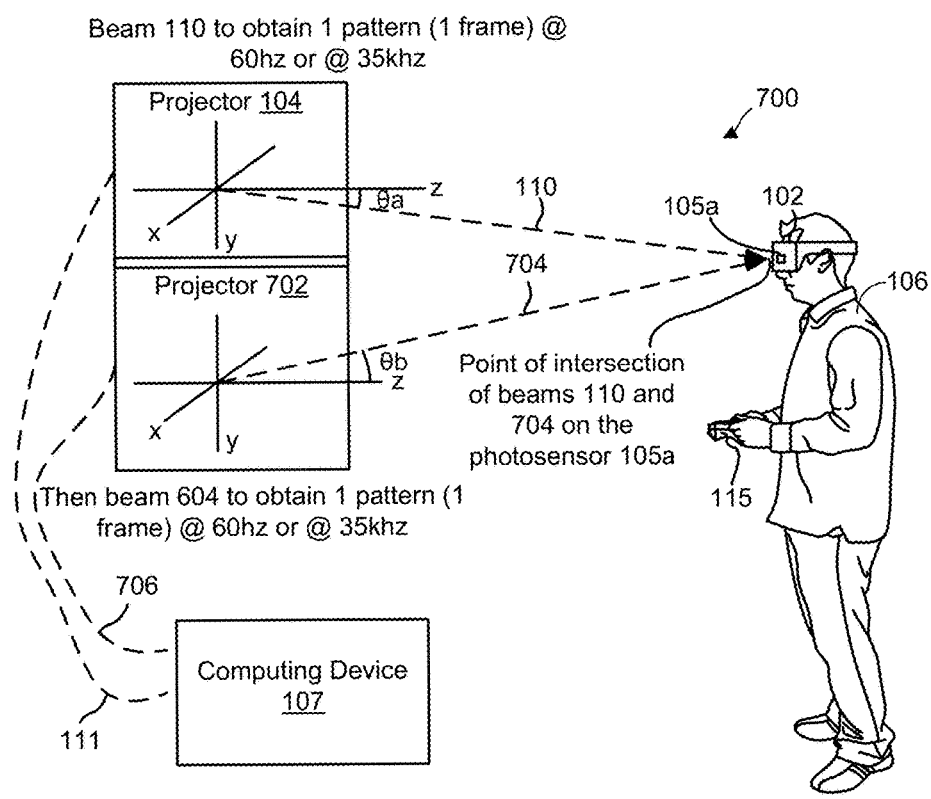
FIG. 7A is a diagram of an embodiment of a system for illustrating a method of triangulation to determine a position of the photosensor with respect to the projectors and for illustrating time division multiplexing between multiple projectors to identify one of the projectors from which the beam is detected by the photosensor of the HMD.

FIG. 7A is a diagram of an embodiment of a system 700 for illustrating the method of triangulation to determine the position of the photosensor 105a with respect to the projector 104. The system 700 includes the projector 104 and a projector 702, e.g., two projectors instead of one, etc. The projector 702 is the same as the projector 104 in structure and function. Projectors 104 and 702 are fixed in a rigid and known topology with respect to one another in order to provide a known baseline for triangulation. A direction of the beam 110 emitted from the projector 104 is at an angle θa with respect to the z-axis of the projector 104 and a direction of a beam 704, e.g., laser beam, visible light beam, infrared light beam, invisible light beam, etc., emitted from the projector 702 is at an angle θb with respect to an z-axis of the projector 702, and both the angles θa and θb are determined by the processor 302 of the computing device 107 by applying the operation 458 (FIG. 4C) of determining the orientation. The projector 702 includes an MEMS mirror, which is the same as the MEMS mirror 112 of the projector 104. The z-axis of the projector 702 is perpendicular to an x-axis of the projector 702 and both the z and x axes of the projector 702 are perpendicular to a y-axis of the projector 702.

The processor 302 applies the method of triangulation to the angles θa and θb to determine an intersection (or closest points of two lines) of the beam 110 with the beam 704, and determines that a point of the intersection is a position of the photosensor 105a, of the HMD 102, that detects the beams 110 and 704. The position of the photosensor 105a is measured with respect to the origin of the xyz co-ordinate system of the projector 104 and/or of an xyz co-ordinate system of the projector 702. The xyz co-ordinate system of the projector 702 includes the x-axis of the projector 702, the y-axis of the projector 702, and the z-axis of the projector 702.

In an embodiment, the projectors 102 and 702 time division multiplex generation of the beams 110 and 704 to identify one of the projectors 104 and 702 from the corresponding one of the beams 110 and 704 detected by the photosensor 105a of the HMD 102. The projector 104 emits the beam 110 at a frequency, e.g., 60 Hz, etc., which is a frequency of the Lissajous pattern scan, e.g., a frequency at which the Lissajous pattern is repeated by the MEMS mirror 112, etc. Then after the pattern is executed by the projector 104, the projector 104 stops emitting the beam 110, and the projector 702 emits the beam 704 at the same frequency at which the beam 104 was emitted to form the same pattern on the MEMS mirror of the projector 702 as that formed by the beam 110. Then, after the pattern is formed by the beam 704, the projector 702 stops emitting the beam 704, and the projector 104 emits the beam 110 at the same frequency at which the beam 704 was emitted. This is how the projectors 104 and 702 time division multiplex.

In one embodiment, instead of time division multiplexing at the frequency of 60 Hz, the projectors 104 and 702 time division multiplex at a frequency of thousands of hertz, e.g., a frequency at which the MEMS mirror 112 moves with respect to the resonant frequency of the MEMS mirror 112.

In an embodiment, the processor of the projector 104 sends a control signal to the processor 302 of the computing device 107 via the link 111 indicating that the beam generator 108 of the projector 104 has stopped emitting the beam 110 and a processor of the projector 702 sends a control signal to the processor 302 via a link 706, same in structure and function as the link 111, indicating that a beam generator of the projector 702 has stopped emitting the beam 704. Moreover, the processor of the projector 104 sends a control signal to the processor 302 of the computing device 300 via the link 111 indicating that the beam generator 108 of the projector 104 has started emitting the beam 110 and the processor of the projector 702 sends a control signal to the processor 302 via the link 706 indicating that the beam generator of the projector 702 has started emitting the beam 704. The processor of the projector 104 is coupled to the beam generator 108 and the processor of the projector 702 is coupled to the beam generator of the projector 702. The control signals sent by the projector 104 to the processor 302 include an identity of the projector 104 and the control signals sent by the projector 702 to the processor 302 include an identity of the projector 702. Upon receiving the control signals from the projector 104, the processor 302 identifies the projector 104 from the identity of the projector 104. Similarly, upon receiving the control signals from the projector 702, the processor 302 identifies the projector 702 from the identity of the projector 702.

In an embodiment, the processor 302 of the computing device 107 sends control signals to the processors of the projectors 104 and 702 to turn on the beam generator 108 of the projector 104 and to turn on the beam generator of the projector 702, and sends control signals to the processors of the projectors 104 and 702 to turn off the beam generator 108 of the projector 104 and to turn on the beam generator of the projector 702 to time division multiplex generation of the beams 110 and 704. For example, the computing device 107 sends a control signal to the projector 104 to turn on the projector 104 at a time, e.g., during a clock cycle, during a rising edge of the clock cycle, during a falling edge of the clock cycle, etc., and at the same time sends a control signal to the projector 702 to turn off the projector 702. As another example, the computing device 107 sends a control signal to the projector 702 to turn on the projector 702 at a time, e.g., during a clock cycle, during a rising edge of the clock cycle, during a falling edge of the clock cycle, etc., and at the same time sends a control signal to the projector 104 to turn off the projector 104. A processor of a projector receives a control signal to turn on the projector, and sends the control signal to a driver, e.g., one or more transistors, etc., of a beam generator of the projector so that the driver turns on and generates a current signal to drive a beam source, e.g., a light emitting diode (LED) lamp, an incandescent lamp, a neon lamp, a gas-discharge lamp, a xenon arc lamp, a laser beam emitter, an electromagnetic radiation emitter, a gas laser source, a chemical laser source, a solid-state laser source, a fiber laser source, a photonic crystal laser source, a semiconductor laser source, a diode, etc., of the beam generator. Upon receiving the current signal from the driver for turning on the beam source, the beam source emits a beam of light. Similarly, the processor of the projector receives a control signal to turn off the projector, and sends the control signal to the driver of the projector so that the driver turns off and discontinues generating the current signal. When the current signal is discontinued to be generated, the beam source ceases to emit the beam of light.

The computing device 107 is coupled to the projector 702 via the link 706 and sends control signals to the projector 702 via the link 706. Similarly, the projector 702 communicates with the computing device 107 via the link 706. Moreover, the computing device 107 sends control signals to the projector 104 via the link 111. Similarly, the projector 104 communicates with the computing device 107 via the link 111.

It should be noted that in some embodiments, the methods described above with reference to FIGS. 4A-4E are applicable to the projector 702 and the HMD 102 instead of the projector 104 and the HMD 102. For example, the method of FIG. 4A is used to determine the orientation of the beam 704 with respect to the xyz co-ordinate system of the projector 702 and the method described with reference to FIGS. 4B and 4C is used to determine the orientation of the beam 704 with respect to the xyz co-ordinate system of the projector 702 and the position of the photosensor 105a with respect to the xyz co-ordinate system of the projector 702.

Figure 7B:
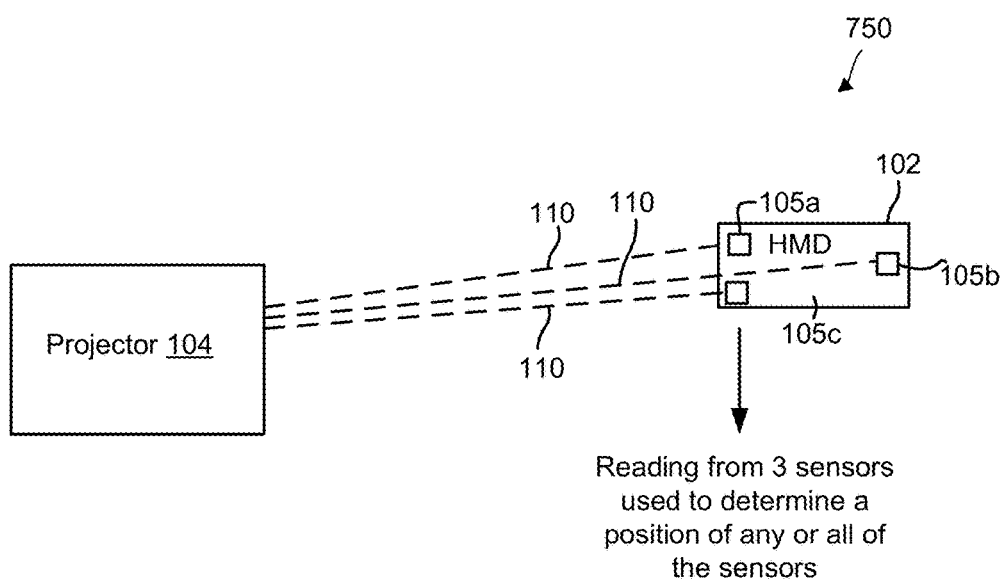
FIG. 7B is a diagram of an embodiment of a system for illustrating another method to determine a pose of a rigid topology of photosensors with respect to a single projector using a method, such as, Perspective-n-Point.

FIG. 7B is a diagram of an embodiment of a system 750 for illustrating another method to determine a position of the photosensor 105a with respect to the projector 104. When the photosensors 105a, 105b, and 105c are hit by the beam 110, the processor 302 of the computing device 107 receives timings of generation of the detected beam hit signals from the processor of the HMD 102. The timings are measured by the clock source of the HMD 102 and obtained by the processor of the HMD 102 from the clock source of the HMD 102. The processor 302 determines orientations of the photosensors 105a, 105b, and 105c from the timings in a manner similar to determining the orientation in the operation 458 (FIG. 4C). The processor 302 applies a method, such as, Perspective-n-Point, etc., to estimate the pose of the HMD 102 with respect to the origin of the xyz co-ordinate system of the projector 104.

Figure 8A:
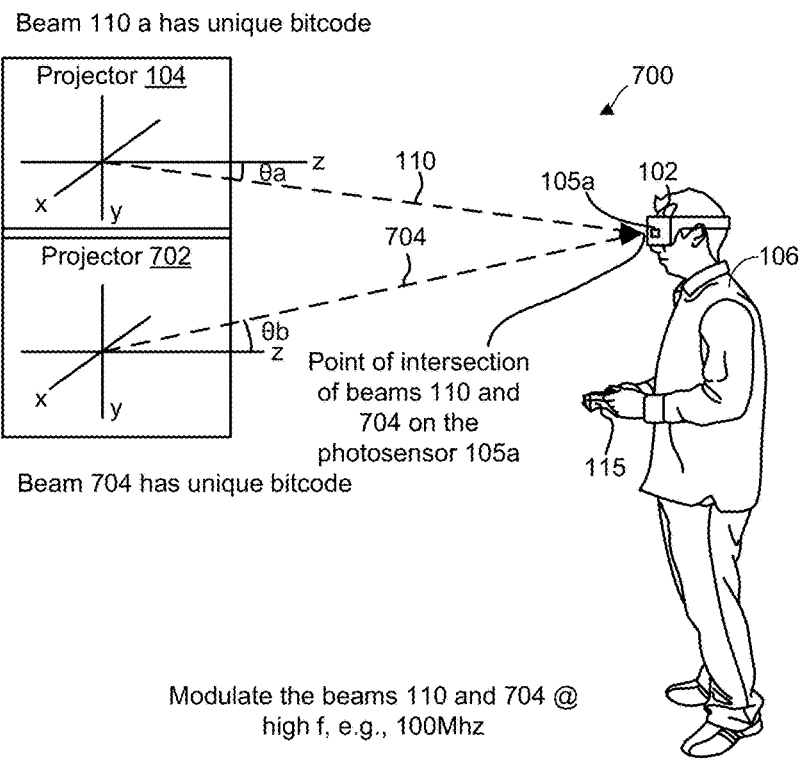
FIG. 8A is a diagram of an embodiment of a system to illustrate a modulation of beams emitted by the projectors to identify the projectors.

FIG. 8A is a diagram of an embodiment of the system 700 to illustrate a modulation of the beams 110 and 704 to identify the projectors 104 and 702. A modulator, e.g., a digital modulator, etc., of the projector 104 is coupled to the beam source of the beam generator 108 of the projector 104 to modulate a beam that is emitted by the beam source of the projector 104 with a first bit code, e.g., a bit pattern, a sequence of L bits, etc., where L is an integer greater than two. For example, the beam emitted by the beam source of the beam generator 108 is overlaid with a sequence of bits so that the pulse of the detected beam hit signal generated by the photosensor 105a is overlaid with a first sequence of L bits. The beam emitted by the beam source of the projector 104 is modulated to generate the beam 110.

Similarly, a beam emitted by a beam source of the beam generator of the projector 702 is overlaid with a sequence of bits so that a pulse of a detected beam hit signal generated by the photosensor 105a upon detecting the beam 704 is overlaid with a second bit code, e.g., a bit pattern, a second sequence of L bits, etc. The second bit code has a different combination of bits than the first bit code to distinguish the beam 704 from the beam 110. For example, the first sequence has a bit combination of 0110011 and the second sequence has a bit combination of 1001100. A modulator, e.g., a digital modulator, etc., of the projector 702 is coupled to the beam source of the beam generator of the projector 702 to modulate the beam that is emitted by the beam source of the projector 702 with a sequence of bits so that a pulse of a detected beam hit signal emitted by the photosensor 105a has overlaid thereon the second bit code. Examples of the first and second bit codes are provided below.

In an embodiment, both the beams 110 and 704 that are generated after the modulation with the corresponding sequences of bits are emitted at all times. For example, the beam generator 108 of the projector 104 and the beam generator of the projector 702 continuously emit their respective beams. There is no time division multiplexing by the projectors 104 and 702 to generate the beams 110 and 704. A collision during which the two beams 110 and 704 hit the photosensor 105a at the same time is rare and these cases may be discounted as error cases.

In one embodiment to avoid the collision, both the beams 110 and 704 that are generated after the modulation with the corresponding sequences of bits are emitted at different times. For example, the beam generator 108 of the projector 104 emits the beam 110 when the beam generator of the projector 702 does not emit the beam 704 and the beam generator 108 of the projector 104 does not emit the beam 110 when the beam generator of the projector 702 emits the beam 704. There is time division multiplexing by the projectors 104 and 702 to generate the beams 110 and 704.

When the beams 110 and 704 are incident on the photosensor 105a, the photosensor 105a of the HMD 102 detects the beam 110 to generate a first detected beam hit signal and detects the beam 704 to generate a second detected beam hit signal. The first and second detected beam hit signals generated by the photosensor 105a are provided from the photosensor 105a to a demodulator of the HMD 102. The demodulator of the HMD 102 demodulates the first detected beam hit signal to extract the first sequence of L bits from the first detected beam hit signal and demodulates the second detected beam hit signal to extract the second sequence of L bits from the second detected beam hit signal. The processor 302 of the computing device 107 receives the first and second sequences of L bits from the demodulator of the HMD 102 via the link 109 (FIG. 1A), determines that the first sequence has a different combination, e.g., pattern, etc., of bits compared to the second sequence of bits and determines that the first detected beam hit signal is generated from the beam 110 generated the projector 104 and the second detected beam hit signal is generated from the beam 704 generated the projector 702. A correspondence, e.g., a mapping, an association, etc., between the projectors 110 and 702 and the first and second sequences is stored in the memory device 304 of the computing device 107. For example, an identity of the projector 104 is in the same row as that of the first sequence of bits and an identity of the projector 702 is in the same row as that of the second sequence of bits. The correspondence is accessed by the processor 302 to determine whether the first sequence is generated by the projector 104 or the projector 702 and whether the second sequence is generated by the projector 104 or by the projector 702. As such, the projectors 104 and 702 are identified by the processor 302.

In one embodiment, a frequency of a modulating signal, generated by a modulator, having a unique bit code is high, e.g., 100 MHz, 90 MHz, a frequency between 90 MHz and 110 MHz, a frequency of 1 GHz or higher, etc. An example of the modulating signal is a sequence of bits, e.g., the first sequence of bits, the second sequence of bits, etc.

In an embodiment, a modulator of a projector is computer software program that is executed by a processor of the projector to modulate a beam that is generated by a beam source of the projector. For example, the modulator of the projector 104 is a computer software routine that is executed by the processor of the projector 104 and the modulator of the projector 702 is a computer software routine that is executed by the processor of the projector 702. In one embodiment, a demodulator of the HMD 102 is computer software program that is executed by the processor of the HMD 102 to demodulate the detected beam hit signal that is generated the photosensor 105a of the HMD 102.

In one embodiment, a modulator is an electrical circuit and a demodulator is an electrical circuit.

In an embodiment, in a manner similar to determining the orientation of the photosensor 105a with respect to the origin of the xyz co-ordinate system of the projector 104 during the frame of the pattern, multiple detected beam hit signals generated by remaining photo sensors, e.g., the photosensors 105b and 105c, etc., of the HMD 102 are used to determine orientations of the photosensors of the HMD 102 with respect to the xyz co-ordinate system of the projector 104. The orientations of the remaining photosensors of the HMD 102 with respect to the xyz co-ordinate system of the projector 702 are determined by the processor 302. Triangulation or Perspective-n-Point methods are applied by the processor 302 to the orientations of the photosensors, e.g., the photosensor 105a, the photosensor 105b, and the photosensor 105c, etc., of the HMD 102 with respect to the xyz co-ordinate system of the projector 104 and the xyz co-ordinate system of the projector 702 to determine an orientation and a position of the HMD 102 with respect to the xyz co-ordinate system of the projector 104 or the xyz co-ordinate system of the projector 702.

In an embodiment, a motion of the HMD 102 is taken into account by the processor 302 to determine an orientation and a position of the HMD 102 with respect to the xyz co-ordinate system of the projector 104 or the xyz co-ordinate system of the projector 702.

In the case of the multiple projectors, e.g., the projectors 104 and 702, etc., in an embodiment, beam collision occurs between beams emitted by the projectors, e.g., the beams 104 and 704, etc. The beam collision occurs when the photosensor 105a is simultaneously hit by two or more projector beams, e.g., the beams 104 and 704, etc. Chances of the collision increase with an increase in a number of the projectors, with an increase in diameters of the beams emitted by the projectors, and with a decrease in distance between the HMD 102 and the projectors. The beam collision is modeled in a simulation. Chances of the beam collision are reduced by using different light frequencies of the beams and by using multiple photo sensors with notch filters. For example, a frequency of the beam 110 is different from a frequency of the beam 704.

In one embodiment, the collisions are reduced by switching the beams emitted by the projectors off at a perimeter, e.g., the edge region 504, etc., of the Lissajous pattern 500 (FIG. 5) where the Lissajous pattern 500 is more dense compared to the central region 502 (FIG. 5). For example, the beam generator 108 is turned off, e.g., powered off, etc., at a time the beam 110 reaches the edge region 504 from the central region 502 on the Lissajous pattern 500 and the beam generator of the projector 702 is turned off at a time the beam 704 reaches the edge region 504 from the central region 502 on the Lissajous pattern 500. In an embodiment, a processor of a projector sends a control signal to a power source, e.g., a battery, an alternating current supply, a power generator, etc., of the projector to turn off the power source at a time the processor determines that a beam reaches the edge region 504 from the central region 502 on the Lissajous pattern 500. The power source is coupled to the processor. The power source is coupled to a beam generator of the projector to provide power to the beam generator.

In an embodiment, the projector 104 is turned on at a time the beam 110 reaches the central region 502 from the edge region 504 on the Lissajous pattern 500 and the projector 702 is turned on, e.g., powered on, etc., at a time the beam 704 reaches the central region 502 from the edge region 504 on the Lissajous pattern 500. In an embodiment, a processor of a projector sends a control signal to a power source of the projector to turn on the power source at a time the processor determines that a beam reaches the central region 502 from the edge region 504 on the Lissajous pattern 500.

In one embodiment, a first modulation frequency, e.g., a frequency with which the beam 110 is modulated with a bit sequence, etc., of the beam 110 is different from a second modulation frequency, e.g., a frequency with which the beam 704 is modulated with a bit sequence, etc., of the beam 704. The processor 302 receives first and second detected beam hit signals that represent the two modulation frequencies, and applies a Fourier transformation to convert the first and second detected beam hit signals from a time domain to a frequency domain to extract the two different modulation frequencies from the detected beam hit signals. The processor 302 identifies from the first modulation frequency and a correspondence stored between the first modulation frequency and an identity of the projector 104 that the first detected beam hit signal is generated from the beam 110 emitted from the projector 104. Similarly, the processor 302 identifies from the second modulation frequency and a correspondence stored between the second modulation frequency and an identity of the projector 702 that the second detected beam hit signal is generated from the beam 704 emitted from the projector 702.

In an embodiment, a first filter that filters in the first frequency is connected to the photosensor 105a and a second filter that filters in the second frequency is connected to another photosensor, e.g., the photosensor 105b, etc., that is in close proximity to the photosensor 105a. The first filter receives the first detected beam hit signal having the first frequency from the photosensor 105a to output a first filtered signal and the second filter receives the second detected beam hit signal having the second frequency from the other photo sensor to output a second filtered signal. The processor 302 receives the first filtered signal from the first filter via the link 109 (FIG. 1A) and the second filtered signal from the second filter via the link 109. Upon determining that the first filtered signal is received from the first filter and that the second filtered signal is received from the second filter, the processor 302 identifies that the first filtered signal is generated based the beam 110 emitted from the projector 104 and that the second filtered signal is generated based the beam 704 emitted from the projector 702. The first and second filters are located within the HMD 102.

Figure 8B:
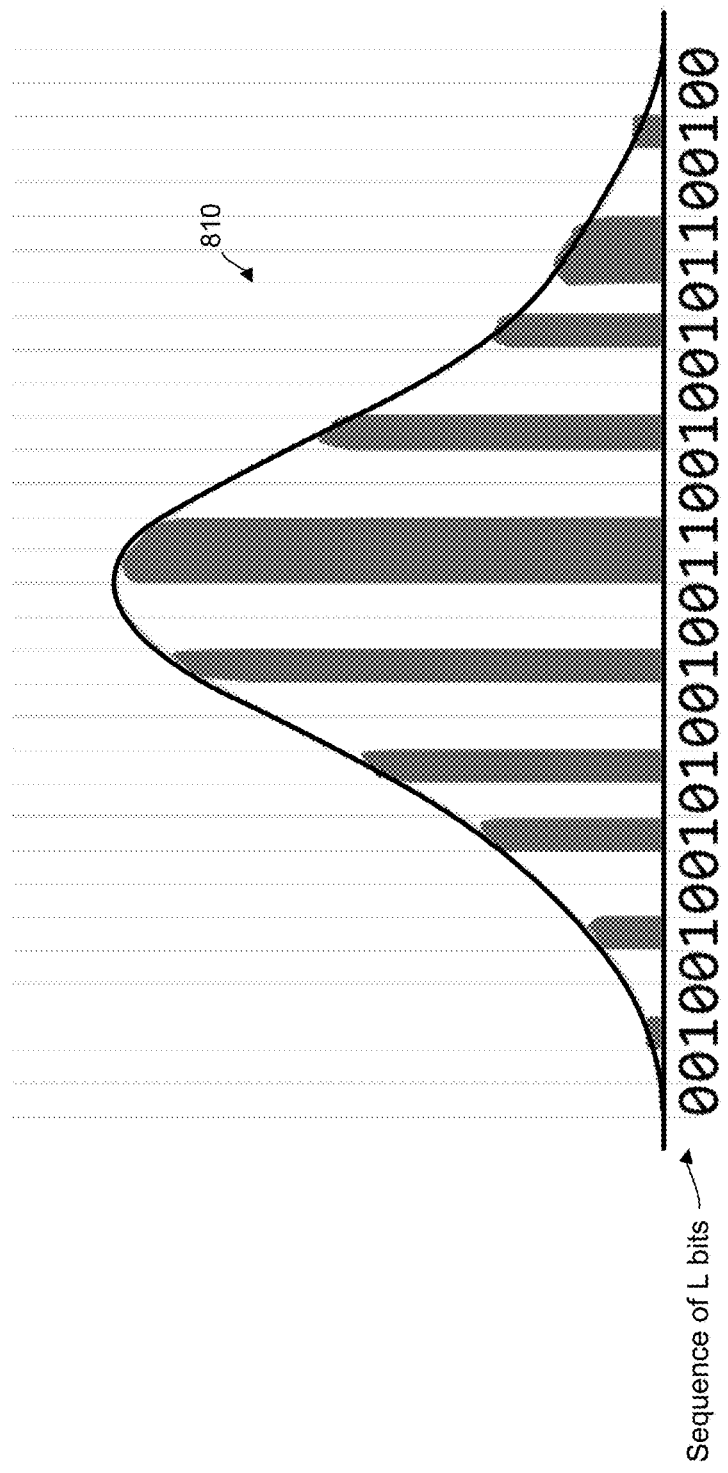
FIG. 8B is a diagram of an embodiment of a modulated pulse of a detected beam hit signal that is generated by the photosensor upon detecting the beam hit from the beam as the beam moves across the photosensor.

FIG. 8B is a diagram of an embodiment of a pulse 810 of the detected beam hit signal that is generated by the photosensor 105a upon detecting the beam hit from the beam 110. The pulse 810 as illustrated is overlaid with a sequence of L bits.

In an embodiment, K independent bit sequences with globally unique M-bit windows are generated with each of the K independent bit sequences having a length L, where K is a number of the projectors 104 and 702 that are uniquely identified, and L is the number of bits before a bit pattern for that sequence repeats itself. For example, the photosensor 105a generates the detected beam hit signal in which each pulse of the detected beam hit signal is modulated by the modulator of the projector 104 to be overlaid with the L bit sequence. As another example, the photosensor 105a generates the detected beam hit signal in which each pulse of the detected beam hit signal is modulated by the modulator of the projector 702 to be overlaid with the L bit sequence. Within each of these sequences of L bits, any sub window of M bits is unique within the sequence and also globally unique across all of the K independent bit sequences. For example, the photosensor 105a generates the detected beam hit signal in which a first pulse of the detected beam hit signal is modulated by the modulator of the projector 104 to be overlaid with a first L bit sequence and in which a second pulse of the detected beam hit signal is modulated by the modulator of the projector 104 to be overlaid with a second L bit sequence. The second L bit sequence has a different M bit sequence of bits than an M bit sequence of bits within the first L bit sequence and than any other M bit sequences in the second L bit sequence. The photosensor 105a generates the detected beam hit signal in which a third pulse of the detected beam hit signal is modulated by the modulator of the projector 702 to be overlaid with a third L bit sequence and in which a fourth pulse of the detected beam hit signal is modulated by the modulator of the projector 702 to be overlaid with a fourth L bit sequence. The fourth L bit sequence has a different M bit sequence of bits than any remaining M bit sequences within the fourth L bit sequence, any M bit sequence of bits within the third L bit sequence, than any M bit sequence within the first L bit sequence, and than any M bit sequence within the second L bit sequence.

In an embodiment, any M bit sequence is decoded by a demodulator. To achieve the decode, a modulator modulates a beam so that any M bit sequence has less than a predetermined number of instances of the same bit and at least one of 010 and 101 switch binary pattern is introduced in any M bit sequence to facilitate identification of the binary pattern with error resilience.

In an embodiment, a modulator modulates a beam so that each M bit sequence is constrained to be different from any another M bit sequence by at least 2 bits. This constraint allows for error resilience.

In one embodiment, a bit rate applied by the modulator of the projector 104 to overlay a bit sequence onto a beam is determined based on a maximum possible distance of the HMD 102 from the projector 104, and the frequencies f1 and f2. For example, the modulator of the projector 104 applies a high data rate to overlay a bit sequence onto a beam generated by the beam source of the beam generator 108 so that when the beam 110 is moving quickly to scan the space, and the photosensor 105a is placed at a maximum defined distance, there is enough time for the photosensor 105a to generate a detected beam hit signal containing the M bit sequence. An example of the maximum defined distance is a distance between two opposite walls of a room in which the HMD 102 is located. Another example of the maximum defined distance is a distance between the projector 104 and a wall, which is located on a side of a room where the HMD 102 is located compared to another side of the room where the projector 104 is located. It should be noted that movement of the beam 110 in the space is dependent upon the frequencies f1 and f2 of movement of the MEMS mirror 112.

In an embodiment, the beam 110 makes a glancing hit on the photosensor 105a such that a time to modulate a beam generated by the beam source of the projector 104 is reduced. The reduction in the time reduces chances that the M bit sequence is embedded within a pulse of a detected beam hit signal generated by the photosensor 105a. In this embodiment, the M bit sequence is arranged by the modulator of the projector 104 to be across a radius of the beam generated by the beam source of the projector 104 and not across a diameter of the beam generated by the beam source of the projector 104. A bit rate at which the beam generated by the beam source of the projector 104 is modulated by the modulator of the projector 104 is determined by the modulator based upon the maximum defined distance and the radius of the beam at the maximum possible distance. The bit rate is determined such that each pulse of the detected beam hit signal generated by the photosensor 105a has the M bit sequence.

In one embodiment, the photosensor 105a is modeled as a disc of radius r, and the detected beam hit signal is generated by the photosensor 105a when the beam 110 traverses slightly to a side of the disc's center, sometimes referred to herein as a grazing beam hit. An example of the radius of the disc is a radius of a lens of the photosensor 105a that is exposed to the beam 110. Furthermore, a traversal distance of the beam 110 is equal to the radius of the disc. This allows a reasonable coverage or a reasonable number of grazing beam hits. When the disc is at a center of the pattern, the beam 110 sweeps across at its maximum speed due to a nature of sinusoidal motion of the MEMS mirror 112. At the maximum speed, over the radius of the disc, the modulator of the projector 104 modulates the beam generated by the beam source of the projector 104 with the M bit sequence so that the photo sensor 105a generates the detected beam hit signal having the M bit sequence. As such, the radius of the disc and the maximum speed defines a bit-rate of the modulation performed by the modulator of the projector 104.

In one embodiment, a bit rate applied by a modulator of a projector to overlay a bit sequence onto a beam generated by a beam source of the projector is a high data rate. For example, when f1=21,060 Hz, and f2=21,000 Hz, and the pattern, e.g., a square pattern, etc., has an amplitude of 60 degrees left to right displacement, e.g., +/−30 degrees from a center of the square pattern, and the photosensor 105a has an 1 millimeter diameter, a radius of the beam 110 is 5 millimeters at a 3 meter distance from the projector 104, and M=10 bit sequence is used, two disjoint sequences of length 61 bits are identified by the processor 302 after demodulation. The two sequences are L=61 bit long and are M=10 bit sequences. The L bit sequences both repeat and any M=10 bit sequence is unique within each L bit sequence and across both the L bit sequences. In addition, each M bit sequence is constrained by the modulator to not have a consecutive sequence of the same bits longer than two, e.g., no 000 or no 111, etc., and is constrained by the modulator to include at least one bit flip pattern, e.g., 101 or 010, etc. An example of a first one of the two L bit sequences is 0010010010100100110010010110010011010010101000110101011011010 and an example of a second one of the two L bit sequences is 00101011010011011010100101101010101100110101101011001011011. An example of the bit rate applied by a modulator of a projector to modulate a beam is 370 megabits per second (Mbps). Another example of the bit rate applied by a modulator of a projector to modulate a beam is 500 Mbps.

In an embodiment, when a demodulator decodes at least 10 bits of a 61 bit sequence of the length L and there is a synchronization between the clock signal generated by the HMD 102 and the clock signal generated by the projector 104, the M bit sequence of the L bit sequence is used to identify an exact location within the 61 bit sequence to further provide an accurate time measurement for a beam hit.

In one embodiment, since the M bit sequence is unique across the L bit sequences of the K projectors, a projector that generates a beam in which the M bit sequence is encoded in is identified. For example, a demodulator, e.g., decoder, etc., of the HMD 102 decodes a detected beam hit signal to extract at least M bits of the L sequence of bits. The L sequence of bits is provided from the demodulator via the link 109 (FIG. 1A) to the processor 302 of the computing device 107. The processor 302 identifies from the L bits the M bit sequence that is unique to all L bit sequences of the projectors 104 and 702. The processor 302 compares the M bit sequence with a sequence pre-stored in the memory device 304 to determine whether there is a match between the two sequences, and upon determining so, determines that the M bit sequence is overlaid on a pulse of the detected beam hit signal generated when the projector 104 emits the beam 110. A correspondence, e.g., one-to-one relationship, etc., between a projector and the M bit sequence is stored in the memory device 304.

In an embodiment, longer M bit sequences allow for longer L bit sequences and better tolerances of time synchronization and the longer M bit sequences mean a larger value of M and consequently a higher bit rate.

In one embodiment, the modulator of the projector 104 modulates the beam generated by the beam source of the projector 104 with an M-sequence window of M bit sequences. Within the M-sequence window, any M bit sequence is unique. When the photosensor 105a generates the detected beam hit signal having the pulse that has one or more of the M bit sequences, the processor 302 determines a location of one of the M bit sequences within the M-sequence window. The clock source of the HMD 102 measures a time $t_s$ at which the one of the M bit sequences starts within the M-sequence window. The one of the M bit sequences is closest among all of the M bit sequences within the M-sequence window to a center of a peak of the pulse 810 of the detected beam hit signal. The clock source of the HMD 102 further measures an offset time, $t_{off}$, which is a time difference between the time $t_s$ and a time at which a center of the one of the M bit sequences occurs within the pulse. The values $t_s$, $t_{off}$ and the one of the M bit sequences are sent from the processor of the HMD 102 to the processor of the projector 104 via the link 117, e.g., Bluetooth link, an RF link, etc. The processor of the projector 104 based on the time $t_s$ finds a bit position within the M-sequence window that the projector 104 transmitted. The processor of the projector 104 searches forward and backwards in the M-sequence window from the bit position to find a location of the one of the M bit sequences and determines from a memory device of the projector 104 a time $t_a$ at which the one of the M bit sequences is sent from the projector 104 as embedded within the beam 110. The time $t_a$ is measured by the clock source of the projector 104 and is stored by the processor of the projector 104 in the memory device of the projector 104. The processor of the projector 104 then corrects the time $t_s$ to the time $t_a$ and sends the time $t_a$ to the processor 302. The processor 302 determines based on the time $t_a$ the orientation of the photosensor 105a with respect to the xyz co-ordinate system of the projector 104 in a manner described in the operations 456 and 458 (FIGS. 4B and 4C). For example, the time $t_a$ is used as a time of a hit to determine the orientation of the photosensor 105a with reference to the origin of the xyz co-ordinate system of the projector 104.

In an embodiment, the processor of the projector 104 calculates a time difference $t_s-t_a$ in the times $t_s$ and $t_a$. The time difference $t_s-t_a$ is a clock error between the clock signal of the HMD 102 and the clock signal of the projector 104, and the processor of the projector 104 sends a signal indicating the time difference to the processor of the HMD 102. The processor of the HMD 102 sends a control signal to the clock source of the projector 104 to remove the time difference to synchronize the clock signal of the projector 104 with the clock signal of the HMD 102.

In an embodiment, the processor of the projector 104 computes a logic offset, which is a time difference $t_a-t_{off}$, to obtain $t_r$, which is a time at which the beam 110 hit a center of the disc of the photosensor 105a. The time $t_r$ is sent from the processor of the projector 104 to the processor 302 via the link 111. Upon receiving the time $t_r$, the processor 302 applies the operations 456 and 458 (FIGS. 4B and 4C) determines the orientation of the photosensor 105a with respect to the xyz co-ordinate system of the projector 104. For example, the time $t_r$ is used as a time of a hit to determine the orientation of the photosensor 105a with reference to the origin of the xyz co-ordinate system of the projector 104.

Figure 8C:
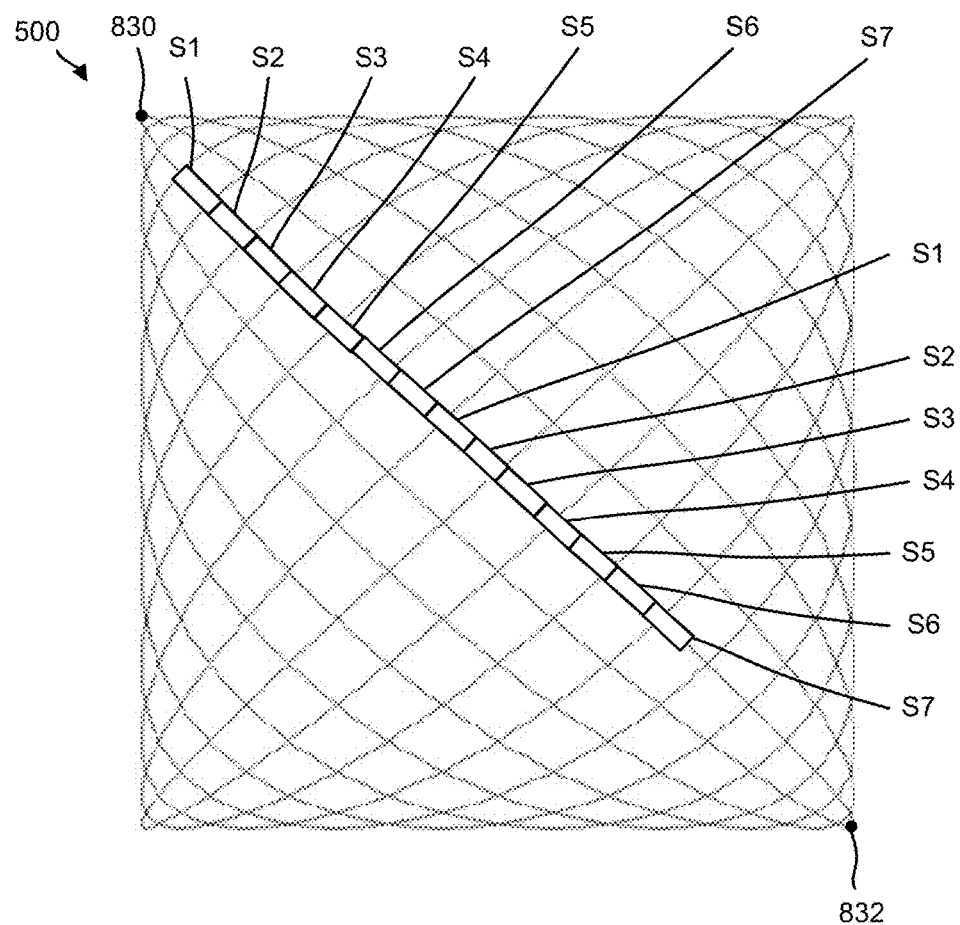
FIG. 8C is a diagram to illustrate than a Maximum Length Sequence (MLS) bit sequence for the projector repeats many times along the Lissajous pattern.

FIG. 8C is a diagram to illustrate than the L bit sequence for a projector repeats many times along the Lissajous pattern 500. Each sequence S1, S2, S3, S4, S5, S6, and S7 is an L bit sequence.

In an embodiment, each sequence S1, S2, S3, S4, S5, S6, and S7 repeats any other number of times, e.g., 150 times, 100 times, 200 times, etc. during a sweep from a diagonal corner, e.g., a diagonal left corner 830, to an oppositely-located diagonal corner, e.g., a diagonal right corner 832, $e_{tc}$, of the Lissajous pattern 500. In one embodiment, the Lissajous pattern 500 has any other number, e.g., eight, nine, ten, etc., of L bit sequences than that shown in FIG. 8C.

Figure 8D:
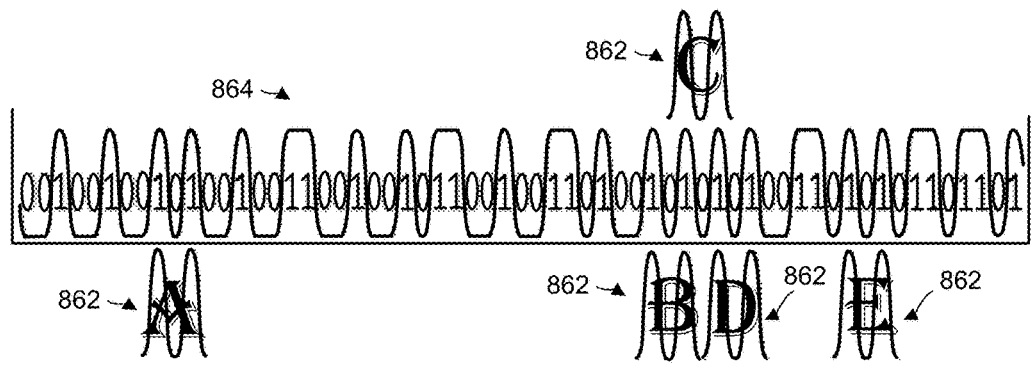
FIG. 8D is a diagram of an embodiment of a correlation filter that is applied by the processor of the computing device to detect a portion of the MLS bit sequence.

FIG. 8D is a diagram of an embodiment of a correlation filter 864 that is applied by the processor 302 of the computing device 107 to detect the L bit sequence. The correlation filter 864 is applied by the processor 302 when a detected beam hit signal on which a bit sequence is overlaid is generated by the photosensor 105a and the demodulator of the HMD 102 demodulates the detected beam hit signal to provide the bit sequence to the processor 302. The correlation filter 864 is stored in the memory device 302. In one embodiment, a correlation filter is a pre-stored sequence of L bits. When the processor 302 determines that a match between the correlation filter 864 and a consecutive sequence of bits within the bit sequence received from the demodulator of the HMD 102 has occurred, the processor 302 determines that the L bit sequence is found. As illustrated in FIG. 8D, the processor 302 determines that a portion of less than M bits of the L bit sequence is found at 5 places, labeled, as A, B, C, D, and E in a bit sequence 862 received from the demodulator.

In one embodiment, upon determining that a number of matches between the correlation filter 864 and the bit sequence 862 exceeds one, or another pre-determined number, the processor 302 disregards the matches since not enough bits were decoded to uniquely identify the L bit sequence.

Figure 8E:
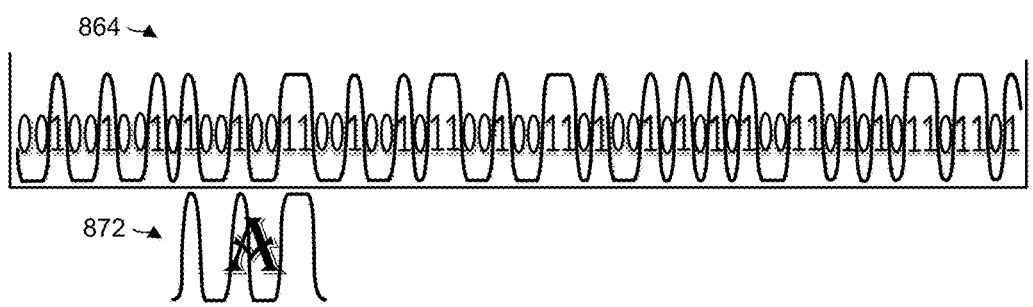
FIG. 8E is a diagram of an embodiment illustrating an application of a threshold to the correlation filter used to determine the match of a portion of the MLS bit sequence.

FIG. 8E is a diagram of an embodiment illustration application of a threshold to the correlation filter 864. The processor 302 determines a unique match between a consecutive sequence of bits within a bit sequence 872 received from the demodulator of the HMD 102 via the link 109 and the correlation filter 864, and determines that the L bit sequence is received within a detected beam hit signal. As the number of bits in a demodulated sequence increases above M, a probability that the L bit sequence is detected within a beam hit signal increases. As shown in FIG. 8E, a match occurs at a place labeled A in the sequence 864.

The correlation filter 864 is applied by the processor 302 when a detected beam hit signal on which a bit sequence is overlaid is generated by the photosensor 105a and the demodulator of the HMD 102 demodulates the detected beam hit signal to provide the bit sequence to the processor 302. The correlation filter 864 is stored in the memory device 302. In one embodiment, a correlation filter is a pre-stored sequence of L bits. When the processor 302 determines that a match between the correlation filter 864 and a consecutive sequence of bits within the bit sequence received from the demodulator of the HMD 102 has occurred, the processor 302 determines that the L bit sequence is found.

In one embodiment, a time tA of the pulse, e.g., a time of maximum amplitude, a time of peak intensity, etc., of the detected beam hit signal is modified by the processor 302 based on a time tB of identification of the bit sequence window position within the L bit sequence. The L bit sequence is identified by using the correlation filter 864. For example, the processor 302 determines the time tA as a time at which the peak intensity of the pulse occurs and determines the time tB at which the processor 302 identifies the bit sequence window position within the L bit sequence by applying the correlation filter 864. The L bit sequence is received from the processor of the HMD 102 by the processor 302 via the link 109 (FIG. 1A). The time tA is measured by the clock source of the HMD 102 and the time tB is measured by a clock source of the computing device 107. Instead of using the time tA, the processor 302 applies the time tB as a correction to the time of hit to the operations 456 and 458 (FIGS. 4B and 4C) to determine a corresponding orientation of the beam 110 with respect to the origin of the xyz co-ordinate system of the projector 104.

Figure 8F:
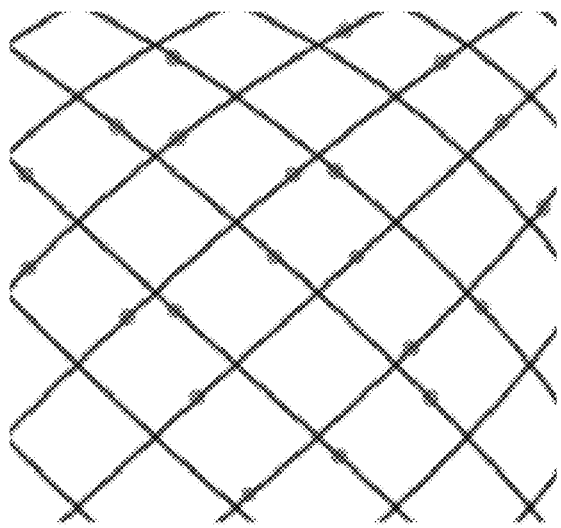
FIG. 8F is a diagram of an embodiment of a portion of the Lissajous pattern to illustrate a number of times a match between the correlation filter and the MLS bit sequence occurs along the Lissajous pattern.

FIG. 8F is a diagram of an embodiment of a portion of the Lissajous pattern 500 to illustrate a number of times a match between a correlation filter and the L bit sequence occurs along the Lissajous pattern 500. For example, a match between a correlation filter and the L bit sequence occurs a number of times, shown as dots in FIG. 8F, across the Lissajous pattern 500.

Figure 8G:
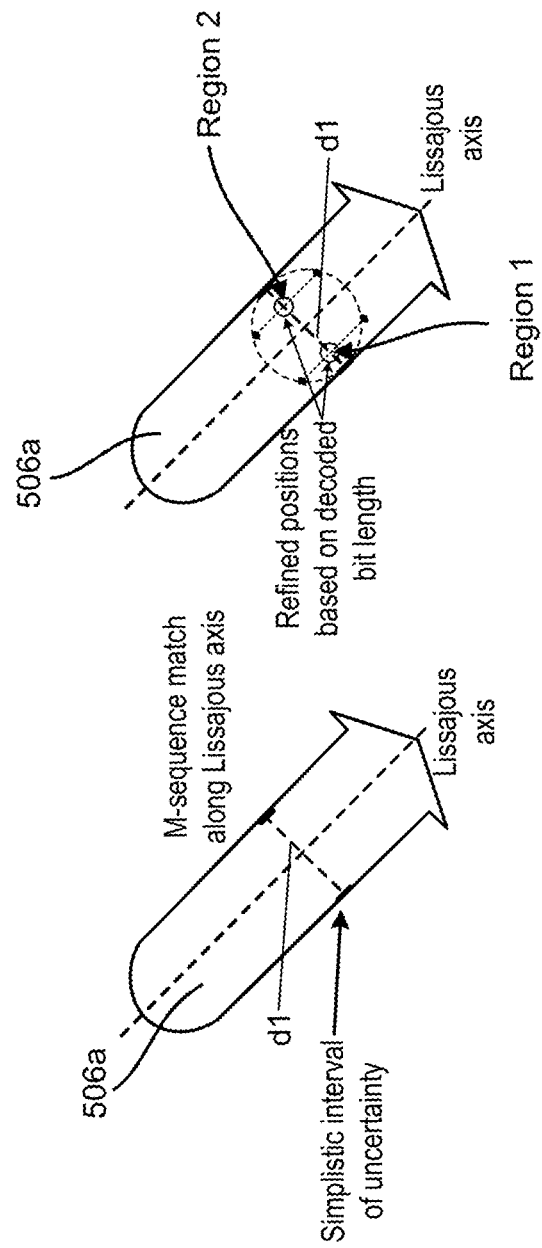
FIG. 8G is a diagram of an embodiment of a portion of the Lissajous pattern to illustrate an MLS-sequence technique in which the length of the MLS bit sequence detected is used to determine an improved location of the photosensor within the diameter of the Lissajous pattern.

FIG. 8G is a diagram of an embodiment of the portion 506a of the Lissajous pattern 500 to illustrate an M-sequence technique in which the L bit sequence is used to determine the location of the photosensor 105a within the diameter d1 of the Lissajous pattern 500. When an intensity, e.g., the maximum amplitude, the peak intensity, the maximum amplitude, etc., of the detected beam hit signal that is used to determine the orientation of the photosensor 105a with respect to the xyz co-ordinate system of the projector 104 is detected, the location of the photosensor 105 is anywhere along the diameter d1 of the Lissajous pattern 500. For example, the clock source of the HMD 102 measures a time at a center of the pulse of the detected beam hit signal and provides the time to the processor 302 to determine the location of the photosensor 105a at the time. The location of the photosensor 105a anywhere along the diameter d1 provides an uncertainty interval that extends +/−a radius of the beam 110 from a trajectory, e.g., the Lissajous axis, etc., of the Lissajous pattern 500. In the M-sequence technique, when the modulator of the projector 104 modulates a beam generated by the beam source of the projector so that the detected beam hit signal is modulated with multiple L bit sequences along the diameter of the Lissajous pattern 500, a number P of the L bit sequence is demodulated. This value P will be greatest along the center of the beam 110 and drop off towards the edge of the beam 110. The uncertainty interval becomes limited to two mirrored regions, e.g., region 1 and region 2, etc., on either side of the trajectory of the Lissajous pattern 500. In the M-sequence technique, the processor 302 narrows the location of the photosensor 105a along the diameter d1 to be at the region 1 or at the region 2. In an embodiment, some information regarding divergence of the beam 110 and a range of the beam 110 within the space is used.

In one embodiment, with a single beam hit, e.g., when the pulse of the beam hit signal is generated, etc., multiple locations, e.g., the regions 1 and 2, etc., are obtained across the Lissajous pattern 500 due to the repetition of the L bit sequence. When there are multiple beam hits, multiple sets of locations across the Lissajous pattern 500 are determined by the processor 302. The locations across the Lissajous pattern 500 are narrowed down by the processor 302 by selecting one or more of the locations that are common across the multiple beam hits. For example, when the processor 302 determines that the region 1 for a first beam hit is the same as that for a second beam hit, the processor 302 determines the location of the photosensor 105a to be at the region 1 along the diameter d1 during the first beam hit instead of being at the region 2. When enough beam hits to disambiguate the multiple possible regions are obtained, there is no need to perform synchronization of the clock signal of the projector 104 with the clock signal of the HMD 102. In an embodiment, when a distance occupied by the L bit sequence along the trajectory of the Lissajous pattern 500 exceeds a distance between crossings of the Lissajous pattern 500 in a lesser dense region, e.g., the center region 502, etc., of the Lissajous pattern 500, a number of the multiple possible regions are reduced by the processor 302.

In an embodiment, an approach is to use a combination of time synchronization, e.g., synchronization of the clock signal of the projector 104 with the clock signal of the HMD 102, etc., to some relatively coarse level and then refine the timing and consequently the orientation of the photosensor 105a with respect to the xyz co-ordinate system of the projector 104 using the M-sequence technique.

In one embodiment, an M-bit sub-sequence of the K number of L-bit sequences is unique both within a disjoint sequence window and also across all disjoint sequence windows, e.g., all disjoint sequence windows of the K number of L bit sequences, etc. The projectors 104 and 702 use a different L bit sequence window. For example, the modulator of the projector 104 modulates the beam generated by the beam source of the projector 104 so that a first sequence window of a first L bit sequence has a unique combination of bits that identifies the projector 104 and the modulator of the projector 702 modulates the beam generated by the beam source of the projector 702 so that a second sequence window of a second L bit sequence has a unique combination of bits that identifies the projector 702. When the demodulator of the HMD 102 provides the second L bit sequence to the processor 302, the processor 302 determines from the second sequence window, that the second L bit sequence is sent from the projector 702 to identify the projector 702. On the other hand, when the demodulator of the HMD 102 provides the first L bit sequence to the processor 302, the processor 302 determines from the first sequence window, that the first L bit sequence is sent from the projector 104 to identify the projector 104. An identification of a projector is used by the processor 302 to determine whether the orientation of the photosensor 105a is with respect to an origin of an xyz co-ordinate system of the projector or with respect to an origin of an xyz co-ordinate system of another projector.

In an embodiment, there are many parameter choices for a frequency of the frame of the Lissajous pattern 500, a diameter of the beam 110, a spread of the beam 110, an optical sweep amplitude of the Lissajous pattern 500, a bit rate of modulation of a beam generated by a beam source, a value of M and L in the L bit M-sequence, a size of the disc of the photo sensor 105a. Other parameters include a location of the photo sensor in the Lissajous pattern 500. These parameters affect the measured orientation of the photosensor 105a with respect to the xyz co-ordinate system of the projector 104. An example is provided. Let a Lissajous base frequency, e.g., the frequency f1, be 34,000 hertz, a Lissajous second frequency, e.g., the frequency f2, be 34,060 hertz, a Lissajous repeat period, e.g., a frequency of the frame, be $\frac{1}{60}^{th}$ second, an optical sweep amplitude be 60 degrees (+/−30 degrees from center), a radius of the disc of the photosensor 105a be 1 millimeter, a diameter of the beam 110 be 4 millimeters at 3 meters from the projector 104, M be 10 with 2 windows of length L, and L be 61 bits. Also, the disc of the photosensor 105a is flat with respect to the projector 104 at the 3 meter distance in a center of a frustum of the projector 104. An approximate time for the beam 110 to traverse a distance dist across an edge of the photosensor 105a of length equal to the photosensor radius is calculated by the processor 302 as follows. Sweep speed is approximately 0.0000147 seconds to sweep 60 degrees. The sweep speed amounts to 4,080,000 degrees/second. At d=3 meter range from the projector 104, an angular distance across the distance dist of the photo sensor 105a is 2*arctan(0.5*dist/d)=0.0191 degrees. Consequently, a time taken to traverse the distance dist across the disc of the photosensor 105a is $4.68 \times 10^{-9}$ seconds, which is approximately 5 nanoseconds. To obtain 10 bits of data in that approximately 5 nanoseconds, the modulator of the projector 104 modulates at a bit rate of 2.14 gigabits per second (Gbps). So, an amount of time calculated by the processor 302 for the modulator of the projector 104 to modulate the beam generated by the beam source of the projector 104 with the 61 bit sequence is 28 nanoseconds. Consequently, synchronization between the clock signal generated by the projector 104 and the clock signal generated by the HMD 102 can have up to a 14 nanosecond error and still unambiguously be determined to fall within a L bit windows which allow us to obtain the orientation of the photosensor 105a with respect to the origin of the xyz co-ordinate system with greater confidence. For example, an accuracy along the sweep of the beam 110 is better than 1 bit, where 1 bit represents approximately $\frac{1}{10}^{th}$ millimeter.

In an embodiment, there is a global synchronization event, e.g., a radio frequency (RF) pulse or a global light pulse, etc., that is accurate to within the sequence of length L, e.g., 61 bits, etc. For example, the processor of the projector 104 sends the RF pulse to the projector 702 and to the HMD 102 to synchronize the clock sources of the HMD 102 and the projector 702 (FIG. 7A) with the clock source of the projector 104. To illustrate, at a time the clock signal of the projector 104 pulses from one state to another, e.g., high to low, low to high, etc., the processor of the projector 104 sends the RF pulse via the link 117 (FIG. 1A) to the HMD 102 and via a link between the projectors 104 and 702 to the projector 702. Upon receiving the RF pulse, the processor of the HMD 102 sends a signal to the clock source of the HMD 102 to synchronize the clock signal of the clock source of the HMD 102 with the clock signal of the projector 104. Moreover, the processor of the projector 702 sends a signal to the clock source of the projector 702 to synchronize the clock signal of the clock source of the projector 702 with the clock signal of the projector 104. As another example, a beam generator, e.g., other than the beam generator 108, etc., of the projector 104 generates a strobe of a beam and the strobe of the beam is detected by the photosensor 105a. At a time the strobe of the beam is detected, the clock signal of the HMD 102 is synchronized with the clock signal of the projector 104. The global synchronization event occurs once during each frame or multiple times during each frame.

In an embodiment, the beams 110 and 704 have different light frequencies and each photosensor 105a and 105b has a different filter to detect the different frequencies. For example, the projector 104 generates the beam 110 having a first frequency and the projector 702 generates the beam 704 having a second frequency, which is different from the first frequency. The photosensor 105a is coupled to a first filter and the photosensor 105b is connected to a second filter. The first filter filters in the first frequency but not the second frequency and the second filter filters in the second frequency but not the first frequency. The photosensor 105a receives the first frequency from the first filter to generate a first detected beam hit signal and the photosensor 105b receives the second frequency from the second filter to generate a second detected beam hit signal. Upon determining that the first detected beam hit signal has the first frequency, the processor 302 determines that the first detected beam hit signal is generated from the beam 110 received from the projector 104. Similarly, upon determining that the second detected beam hit signal has the second frequency, the processor 302 determines that the second detected beam hit signal is generated from the beam 704 received from the projector 702. A correspondence, e.g., one-to-one relationship, association, mapping, etc., between the first frequency and an identification of the projector 104 is stored in the memory device 304 and another correspondence between the second frequency and an identification of the projector 702 is stored in the memory device 304.

Figure 9:
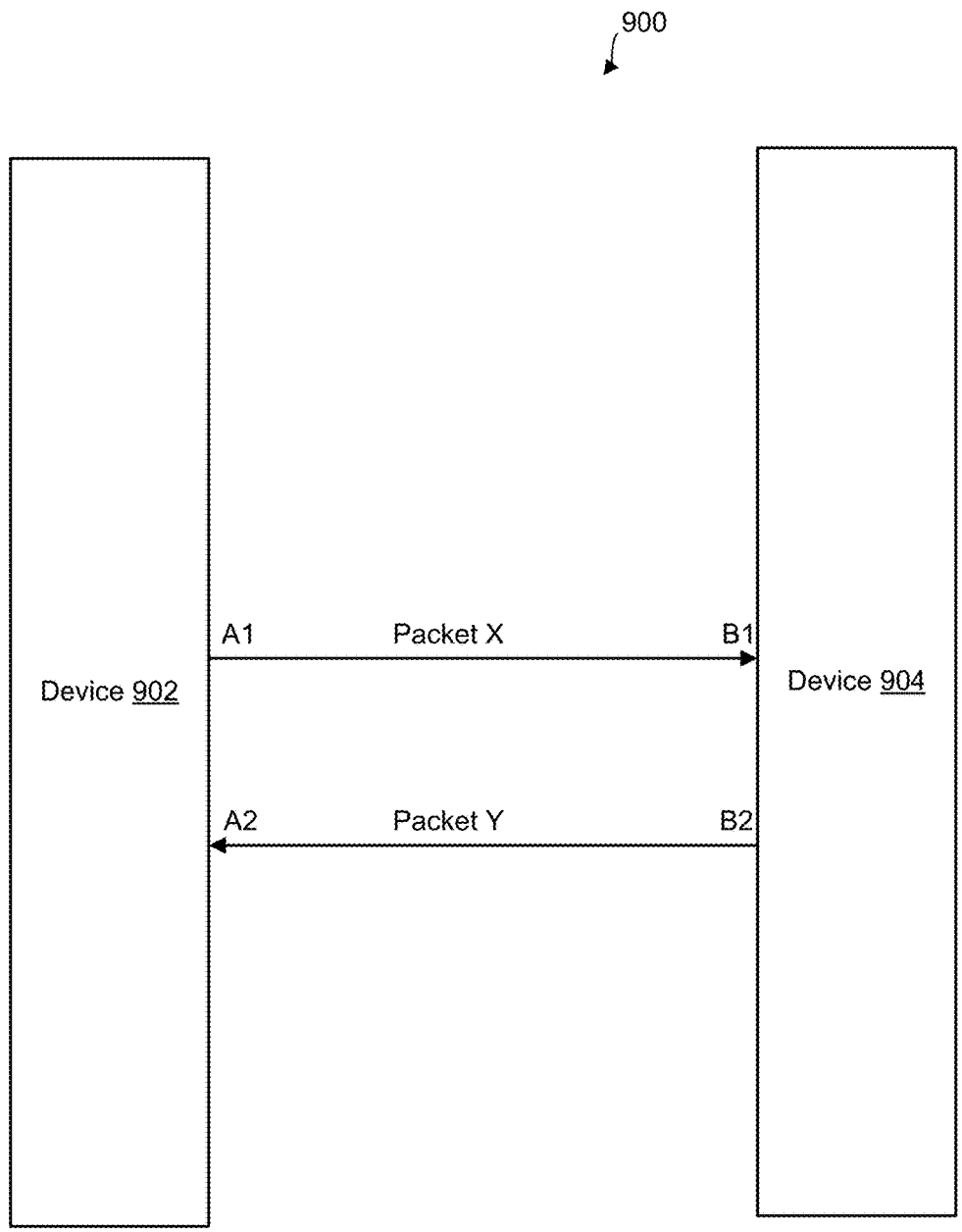
FIG. 9 is a diagram of an embodiment of a system to illustrate a method of synchronization of clock signals between a device and another device.

FIG. 9 is a diagram of an embodiment of a system 900 to illustrate a method of synchronization between a device 902 and another device 904. An example of the device 902 is the projector 104 and the device 904 is the HMD 102. Another example of the device 902 is the projector 702 and the device 904 is the HMD 102.

In an embodiment, the clock signals of the devices 902 and 904 are synchronized to a nanosecond level accuracy. For example, a protocol associated with a computer network's Network Time Protocol (NTP) is used. The device 902 sends a packet X at a local time $A_1$ and receives an answer packet Y from the device 904 at a local time $A_2$. The local times $A_1$ and $A_2$ are measured by the clock source of the device 902. The packet X contains the time $A_1$. When the device 904 receives the packet X, the clock source of the device 904 timestamps a time $B_1$ at which the packet X is received. The device 904 then transmits the packet Y at a time $B_2$ and includes in the packet Y, the times $B_1$ and $B_2$. The time $B_2$ is measured by the clock source of the device 904. The device 902 receives the packet Y at the time $A_2$. Once the device 902 obtains the packet Y, the processor of the device 902 calculates a round trip network time as a difference between a total time and a processing time taken by the device 904. The total time is $(A_2-A_1)$ and the processing time is ($B_2-B_1$). The round trip network time is considered symmetric and so one way trip time is $T_1$=0.5 [($A_2-A_1$)-($B_2-B_1$)]. So, a true time at the time $A_2$ is $B_2+T_1$. Hence, an offset time $T_{off}$=$B_2+T_1-A_2$ is added by the processor of the device 902 to the clock signal of the clock source of the device 902 to synchronize the clock signal of the device 902 with the clock signal of the device 904. It should be noted that a packet is generated by a processor of a device. For example, the packet X is generated by the processor of the device 902 and the packet Y is generated by the processor of the device 904. In an embodiment, instead of the packet X, a request signal is used and instead of the packet Y, a response signal is used.

In an embodiment, some statistics are also used to synchronize the clock signals of the projector 104 and the HMD 102.

In one embodiment, there is some error in the measurement of the times $B_2$ and $B_1$, and therefore in the calculation of $B_2-B_1$. In the embodiment, there will be some errors in the measurements of the times $A_1$ and $A_2$. In the embodiment, the packets X and Y are sent several times to measure several transmit times and measure several receive times before a decision on the adjustment of the clock signal of the device 902 is made by the processor of the device 902, or the transmit times and receive times are smoothed and filtered. For example, the device 902 sends the packet X at a local time $A_3$ and receives the answer packet Y from the device 904 at a local time $A_4$. The local times $A_3$ and $A_4$ are measured by the clock source of the device 902. The packet X contains the time $A_3$. When the device 904 receives the packet X, the clock source of the device 904 timestamps a time $B_3$ at which the packet X is received. The device 904 then transmits the packet Y at a time $B_4$ and includes in the packet Y, the times $B_3$ and $B_4$. The time $B_4$ is measured by the clock source of the device 904. The device 902 receives the packet Y at the time $A_4$. Once the device 902 obtains the packet Y, the processor of the device 902 calculates a round trip network time as a difference between a total time and a processing time taken by the device 904. The total time is ($A_4-A_3$) and the processing time is ($B_4-B_3$). The round trip network time is considered symmetric and so one way trip time is $T_2$=0.5 [($A_4-A_3$)-($B_4-B_3$)]. So, a true time at the time $A_4$ is $B_4-T_2$. Instead of an offset time $T_{off1}$=$B_4+T_2-A_4$, an average of the offset times $T_{off}$ and $T_{off1}$ is added by the processor of the device 902 to the clock signal of the clock source of the device 902 to synchronize the clock signal of the device 902 with the clock signal of the device 904.

In the embodiment in which the L bit sequence and the M-sequence window are used, the L bit sequence is identified by the processor of the HMD 102 or by the processor 302. When $f_1$=21,060 Hz, $f_2$=21,000 Hz, and the Lissajous pattern 500 has a 30 degree amplitude, the L length of a sequence is used to modulate the beam generated by the beam source of the projector 104 is 61 bits, M=10, and a data rate of modulating the beam is 500 megabits per second (Mbps), a time taken by the modulator of the projector 104 to modulate the beam is 122 nanoseconds. The M or greater bit sequence demodulated from a beam hit is unique within the L=61 bit long sequence. The processor of the projector 104 uses the clock signal of the projector 104 to search backwards and forwards the M bit sequence that is closest among neighboring L bit sequences. So long as an error in synchronization between the clock signal of the HMD 102 and the clock signal of the projector 104 is less than 122 nanoseconds, the L bit sequence that is the closest is found. With some tolerances, this reduces a constraint for the synchronization to 100 nanoseconds. At this level, in one embodiment, the clock signals of the HMD 102 and the projector 104 are corrected once per frame using the NTP style out of band RF communication.

Figure 10:
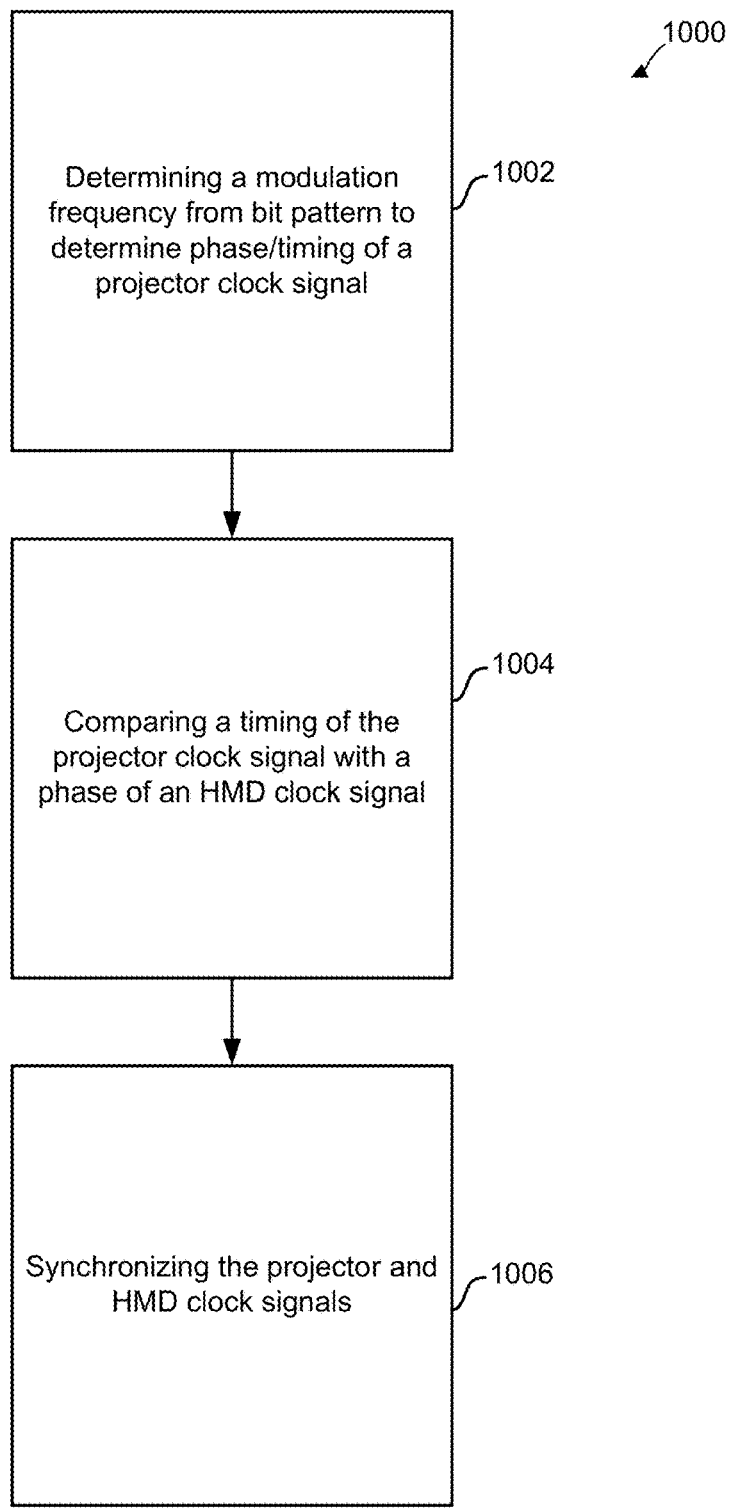
FIG. 10 is a flowchart of an embodiment of a method for synchronizing clock signals of the projector and the HMD by extracting a frequency of a modulating signal from the detected beam hit signal that is generated by the photosensor.

FIG. 10 is a flowchart of an embodiment of a method 1000 for synchronizing the clock signal of the clock source of the projector 104 and the clock source of the HMD 102 by extracting, from the detected beam hit signal that is generated by the photosensor 105a, a frequency of the modulating signal used to modulate the beam generated by the beam source of the beam generator 108. The modulating signal is generated in synchronization with the clock signal of the projector. For example, a bit 0 of the modulating signal is generated by the modulator of the projector 104 at a first rising edge of the clock signal of the clock source of the projector 104 and a bit 1 is generated by the modulator of the projector 104 at a second rising edge of the clock signal. The first rising edge precedes the second rising edge and the bit 0 precedes the bit 1 in a sequence of bits of the modulating signal. As another example, the bit 0 of the modulating signal is generated by the modulator of the projector 104 at a first falling edge of the clock signal of the clock source of the projector 104 and the bit 1 is generated by the modulator of the projector 104 at a second falling edge of the clock signal. The first falling edge precedes the second falling edge and the bit 0 precedes the bit 1 in the sequence of bits of the modulating signal.

The demodulator of the HMD 102 is coupled to the photosensor 105a to receive the detected beam hit signal that is generated by the photosensor 105a by sensing the beam 110. The demodulator of the HMD 102 demodulates the detected beam hit signal to generate the modulating signal. The modulating signal is provided from the demodulator of the HMD 102 to the processor 302 of the computing device 107 via the link 109 (FIG. 1A). The processor 302 determines, in an operation 1002, a frequency of the modulating signal to determine a phase, e.g., timing, etc., of the clock signal generated within the projector 104. The phase, of the clock signal, determined by the processor 302 is provided to a PLL that is coupled to the processor 302. The PLL is located within the computing device 107. The PLL compares, in an operation 1004, the phase of the clock signal generated by the clock source of the projector 104 with a phase of the clock signal generated within the HMD 102. The phase of the clock signal generated within the HMD 102 is received via the link 109 by the processor 302 from the processor of the HMD 102.

The PLL synchronizes, in an operation 1006, the phase of the clock signal generated within the HMD 102 with the phase of the clock signal of the projector 104. For example, when the phase of the clock signal of the HMD 102 lags or leads the phase of the clock signal of the projector 104, the PLL sends a phase difference signal indicating the phase difference to the processor 302 of the computing device 107, and the processor 302 sends the phase difference signal to the clock source of the HMD 102 via the link 109 to match the phase of the clock signal of the HMD 102 with that of the clock signal of the projector 104. To illustrate, the phase difference signal is sent from the processor 302 to the processor of the HMD 102 via the link 109, and in response to receiving the phase difference signal, the processor of the HMD 102 sends a signal to the clock source of the HMD 102 to match the phase of the clock signal generated by the clock source of the HMD 102 with that of the clock signal generated by the clock source of the projector 104. As another example, when the phase of the clock signal of the HMD 102 lags or leads the phase of the clock signal of the projector 104, the PLL sends the phase difference signal to the processor 302 of the computing device 107, and the processor 302 sends the phase difference signal to the clock source of the projector 104 via the link 111 (FIG. 1A) to match the phase of the clock signal of the projector 104 with that of the clock signal of the HMD 102. To illustrate, the phase difference signal is sent from the processor 302 to the processor of the projector 104 via the link 111, and in response to receiving the phase difference signal, the processor of the projector 104 sends a signal to the clock source of the projector 104 to match the phase of the clock signal generated by the clock source of the HMD 102 with that of the clock signal generated by the clock source of the projector 104.

The synchronization is performed to improve an accuracy of the orientation, e.g., the beam angles θx, θy, and θz, etc., of the beam 110 and of the position of the photosensor 105a with respect to the origin of the xyz co-ordinate system of the projector 104. Both the orientation of the beam 110 and the position of the photosensor 105a are dependent on the timing at which the detected beam hit signal is generated by the photosensor 105a, as described above with reference to FIG. 4B.

In one embodiment, the time of hit at which the beam 110 is detected by the photosensor 105a is the same as a time at which the detected beam hit signal is generated by the photosensor 105a upon detecting the beam 110.

In an embodiment, a rise time period for the photosensor 105a to generate the beam hit signal is accounted for by the processor 302 in determining the time of hit. For example, when an initiation time at which the photosensor 105a initiates to detect the beam hit signal is received by the processor 302 as the time of hit, the processor 302 subtracts the rise time period from the initiation time at which the photosensor 105a to modify the time of hit and the modified time of hit is used to determine the orientation of the photosensor 105a with respect to the origin of the xyz co-ordinate system of the projector 104 instead of the time of hit.

In an embodiment, an accuracy of the orientation of the photosensor 105a with respect to the origin of the xyz co-ordinate system of the projector 104 is dependent on synchronization of the clock signals of the HMD 102 and the projector 104. For example, for obtaining a 1 millimeter precision at a 3 meter distance from the projector 104, the beam 110 moves quickly across the origin of the xyz co-ordinate system of the projector 104 or about the z axis of the xyz co-ordinate system of the projector 104. At the 3 meter distance, 1 millimeter represents a 0.00033 radian displacement. When a frustum of the projector 104 is 60 degrees, $f_1=21{,}060$ Hertz, and $f_2=21{,}000$ Hertz, movement of the MEMS mirror 112 along the X-axis of the MEMS mirror 112 is represented as $x=A\sin(2\pi\, tf1)$ and a speed of movement of the MEMS mirror 112 along the X-axis of the MEMS mirror 112 is dx/dt, which is:

$$\frac{dx}{dt} = A2\pi f1\cos(2\pi tf1) \qquad \text{equation (4)}$$

where A is an amplitude of movement of the MEMS mirror 112 along the X-axis of the MEMS mirror 112 to form the Lissajous pattern 500 (FIG. 5), and t is time. The speed will be highest at t=0 when the cosine is 1.0 and the highest speed is 69,285 radians/second. So to traverse the 0.00033 radians, it will take 4.8 nanoseconds for the MEMS mirror 112. When the clock signals of the projector 104 and the HMD 102 are not synchronized by 4.8 nanoseconds, as much as 1 millimeter of precision associated with the orientation of the photosensor 105a with respect to the origin of the xyz co-ordinate system is reduced.

In one embodiment, the clock source of the projector 104 is a temperature compensated crystal oscillator (TCXO) and the clock source of the HMD 102 is a TCXO. In each of the TCXOs, 1 to 3 parts per parts per million (ppm) drift is achieved. So in case the TCXOs are started simultaneously, they will drift by 2 microseconds after one second of operation. In an embodiment, the drift is corrected every frame, e.g., at 16.667 milliseconds, etc. So, the drift at the end of 16.667 milliseconds is 33 nanoseconds. In the embodiment, the clock signal of the HMD 102 or of the projector 104 is corrected 33 times each frame.

Figure 11:
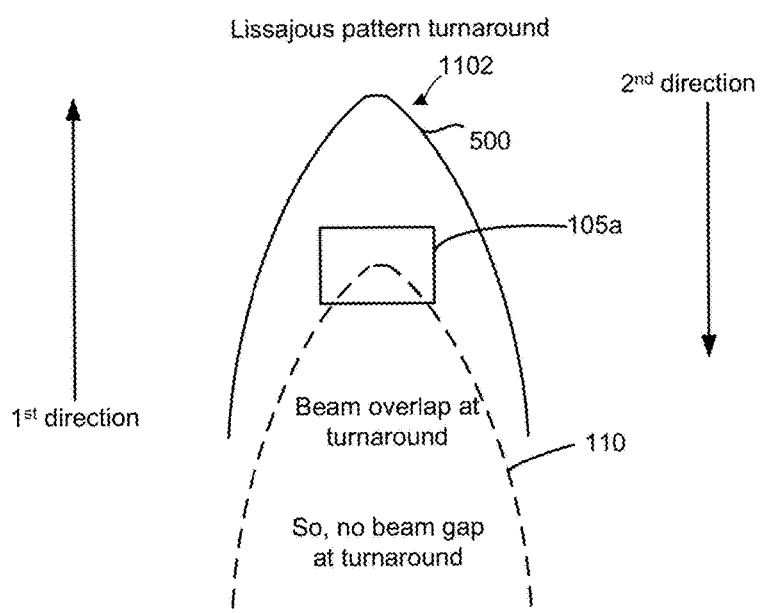
FIG. 11 is a diagram to illustrate a method for averaging of intensities of detected beam hit signals to determine the orientation of the beam.

FIG. 11 is a diagram to illustrate averaging of intensities, e.g., amplitudes, etc., of detected beam signals to determine the orientation of the photosensor 105a with respect to the origin of the xyz co-ordinate system of the projector 104. At edges, e.g., an edge 1102, etc., of the Lissajous pattern 500, the beam 110 traverses the photosensor 105a such that there is no gap in an area on the photosensor 105a covered by the beam 110 when the beam 110 turns around from a first direction to a second direction. The second direction is opposite to the first direction. For example, the second direction is in a −y direction of a y-axis when the first direction is in a +y direction of the y-axis. As another example, the second direction is in a −x direction of the x-axis when the first direction is in a +x direction of an x-axis. As another example, the beam 110 turns around as a result of a turning around the edge 1102 of the Lissajous pattern 500.

The photosensor 105a of the HMD 102 detects a first intensity when the beam 110 traverses in the first direction and detects a second intensity when the beam 110 traverses in the second direction to generate detected beam hit signals, which are provided to the processor of the HMD 102. Moreover, the processor of the HMD 102 receives from the clock source of the HMD 102 times at which the first and second intensities are detected, e.g., a first time at which the first intensity is detected and a second time at which the second intensity is detected. The times are sent by the processor of the HMD 102 to the processor 302 of the computing device 107 via the link 109 (FIG. 1A). The processor 302 averages the times of detection of the first and second beam intensities to calculate an average time.

The processor 302 determines a location of the beam 110 in the Lissajous pattern 500 based on the average time, the time of start of the Lissajous pattern 500, and the frequencies f1 and f2 of the MEMS mirror 112 in a manner similar to that described in the operation 456 (FIG. 4B). For example, the processor 302 determines from the time of the start of the pattern, the frequency f1, the frequency f2, and the average time, the location of the beam 110 on the Lissajous pattern 500. To illustrate, the processor 302 of the computing device 107 determines that the time of start corresponding to an initial location in the Lissajous pattern 500. Moreover, the processor 302 determines that the initial location changes according to the frequencies f1 and f2 of the MEMS mirror 112 to achieve the location of the beam 110 on the Lissajous pattern 500. The location of the beam 110 corresponds to the average time. In one embodiment, a correspondence, e.g., a one-to-one relation, etc., among the frequencies f1 and f2, the average time, the time of start, and the location of the beam 110 on the Lissajous pattern 500 is stored in the memory device 304 of the computing device 107. The correspondence is accessed by the processor 302 to determine the location of the beam 110 on the Lissajous pattern 500 from the time of start, the frequencies f1 and f2, and the average time. The location of the beam 110 on the Lissajous pattern 500 provides the orientation, e.g., the beam angles θx, θy, and θz, etc., of the beam 110 with respect to the origin of the xyz co-ordinate system of the projector 104. By using the average of the two times, the orientation of the beam 110 with respect to the origin of the xyz co-ordinate system of the projector 104 is more accurate than if a single beam intensity is used at the edge 1102 of the Lissajous pattern 500.

Figure 12:
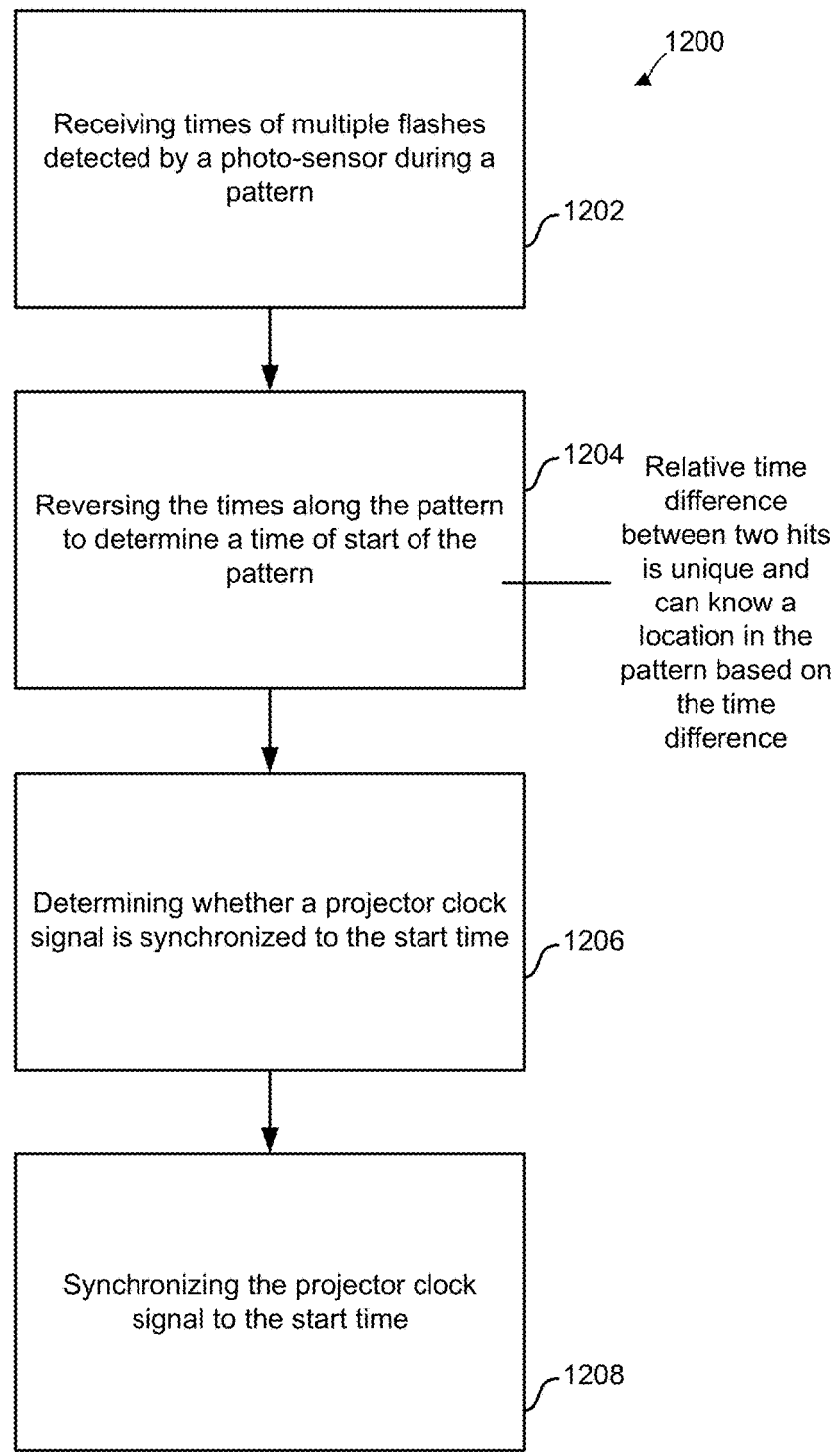
FIG. 12 is a flowchart of an embodiment of a method for synchronization of the clock signal that is generated within the HMD with the clock signal that is generated within the projector.

FIG. 12 is a flowchart of an embodiment of a method 1200 for synchronization of the clock signal that is generated within the HMD 102 with the clock signal that is generated within the projector 104. The beam 110 that follows the pattern on the MEMS mirror 112 is sensed by the photosensor 105a multiple times during the frame, e.g., one round of execution, etc., of the pattern to generate a detected beam hit signal. The photosensor 105a sends intensities of the detected beam signal to the processor 302 of the computing device 107 via the processor of the HMD 102 and the link 109 (FIG. 1A). The processor of the HMD 102 also receives, in an operation 1202, times at which the intensities are detected from the clock source of the HMD 102 and sends the times to the processor 302 via the link 109. The processor 302 backtracks, e.g., reverses, etc., in an operation 1204, the times to determine the time of start of the pattern, e.g., a time at which the pattern starts, a time at which the frame starts, etc. For example, the processor 302 determines from the times at which the intensities are detected and the frequencies f1 and f2, the time of start of the pattern. To illustrate, the processor 302 determines from the times at which the intensities are detected, times associated with movement of the MEMS mirror 112 at the frequencies f1 and f2, the time of start of the pattern. As another illustration, a correspondence, e.g., a one-to-one relationship, an association, etc., between a time at which one of the intensities is detected, times associated with movement of the MEMS mirror 112 at the frequencies f1 and f2, and the time of start of the pattern is stored in the memory device 304 of the computing device 107, and the processor 302 accesses the correspondence to determine the time of start.

In one embodiment, a relative time difference between two of the times provides a unique signature that is backtracked by the processor 302 to determine the time of start of the pattern. As an illustration, a correspondence, e.g., a one-to-one relationship, an association, etc., between a time difference between the times at which two consecutive intensities are detected by the photosensor 105a, times associated with movement of the MEMS mirror 112 at the frequencies f1 and f2, and the time of start of the pattern is stored in the memory device 304 of the computing device 107, and the processor 302 accesses the correspondence to determine the time of start.

The processor 302 determines, in an operation 1206, whether the clock signal of the projector 104 is synchronized to the time of start that is determined in the operation 1204. For example, the processor 302 receives a phase of the clock signal of the projector 104 via the processor of the projector 104 and the link 111 (FIG. 1A), and determines whether the time of start is in phase with the phase of the clock signal. Upon determining that the clock signal of the projector 104 is not synchronized to the time of start that is determined in the operation 1204, the processor 302 sends a control signal to the clock source of the projector 104 via the processor of the projector 104 and the link 111 to synchronize the clock signal to the time of start. As an example, the processor of the projector 104 sends a control signal to the clock source of the projector 104 so that the clock signal generated by the clock source is in phase with the time of start. To illustrate, the clock signal generated by the clock source of the projector 104 is synchronized with the time of start when a rising edge or a falling edge of the clock signal occurs at the same time as the time of start.

In an embodiment, the synchronization of the clock signal to the time of start determined in the operation 1204 is performed by a PLL of the projector 104. For example, the processor of the projector 104 sends a control signal having the time of start to the PLL of the projector 104. The PLL of the projector 104 is connected to the processor of the projector 104 and to the clock source of the projector 104. The PLL of the projector 104 compares the time of start with the clock signal of the clock source of the projector 104 and synchronizes the time of start with the clock signal to generate a PLL signal. The PLL signal is sent to the clock source of the projector 104 so that there is no phase lag or phase lead between the time of start and the clock signal of the clock source of the projector 104.

It should be noted that in an embodiment, when a signal, e.g., a detected beam signal, etc., is provided to a processor, the signal is converted from an analog form to a digital form before being sent to the processor. For example, an analog-to-digital converter is connected between the photosensor 105a and the processor to convert the detected beam hit signal from an analog form to a digital form.

In an embodiment, the frame is repeated at a pre-determined repeat interval, e.g., 60 Hertz (Hz), 50 Hz, 40 Hz, etc.

Figure 13:
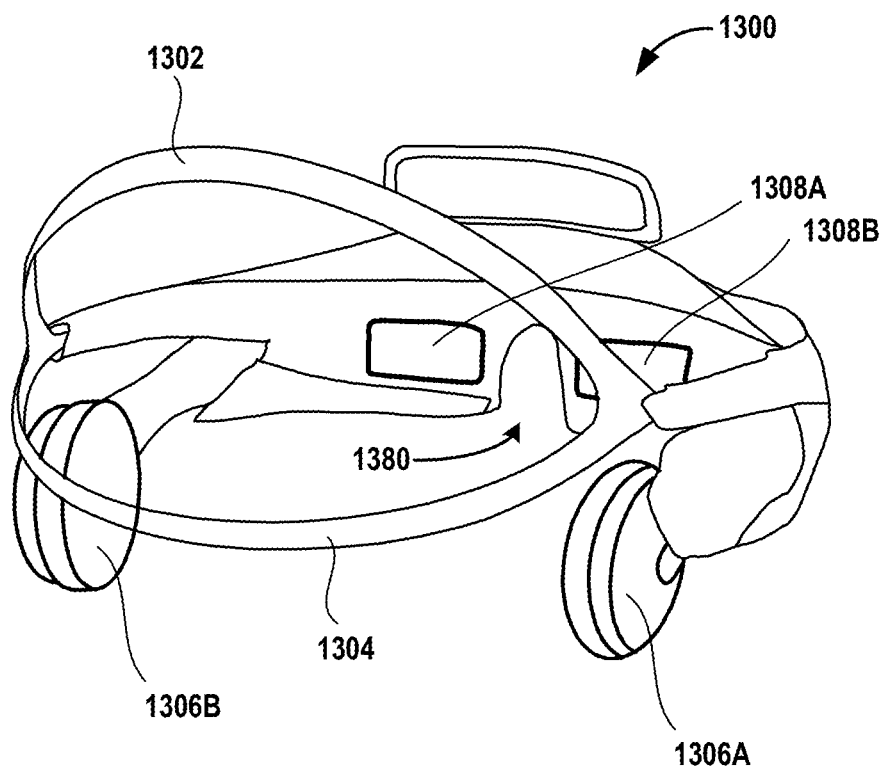
FIG. 13 an isometric view of an embodiment of the HMD.

FIG. 13 is an isometric view of an HMD 1300, which is an example of the HMD 102 (FIG. 1A). The HMD 1300 includes bands 1302 and 1304 that go to the back of the head of the user when worn by the user 106. Moreover, the HMD 1300 includes earphones 1306A and 1306B, e.g., speakers, etc., that emanate sound associated with a virtual environment, e.g., a game environment, a virtual tour environment, etc., that is generated by execution of a computer program, e.g., a game program, a virtual environment generation program, etc. The HMD 1300 includes lenses 1308A and 1308B that allows the user to view a virtual environment that is displayed on a display screen of the HMD 1300. A groove 1380 rests on a nose of the user 106 to support the HMD 1300 on the nose.

In some embodiments, an HMD 1300 is worn by the user 106 in a manner similar to which sunglasses, glasses, or reading glasses are worn by the user 106.

Figure 14:
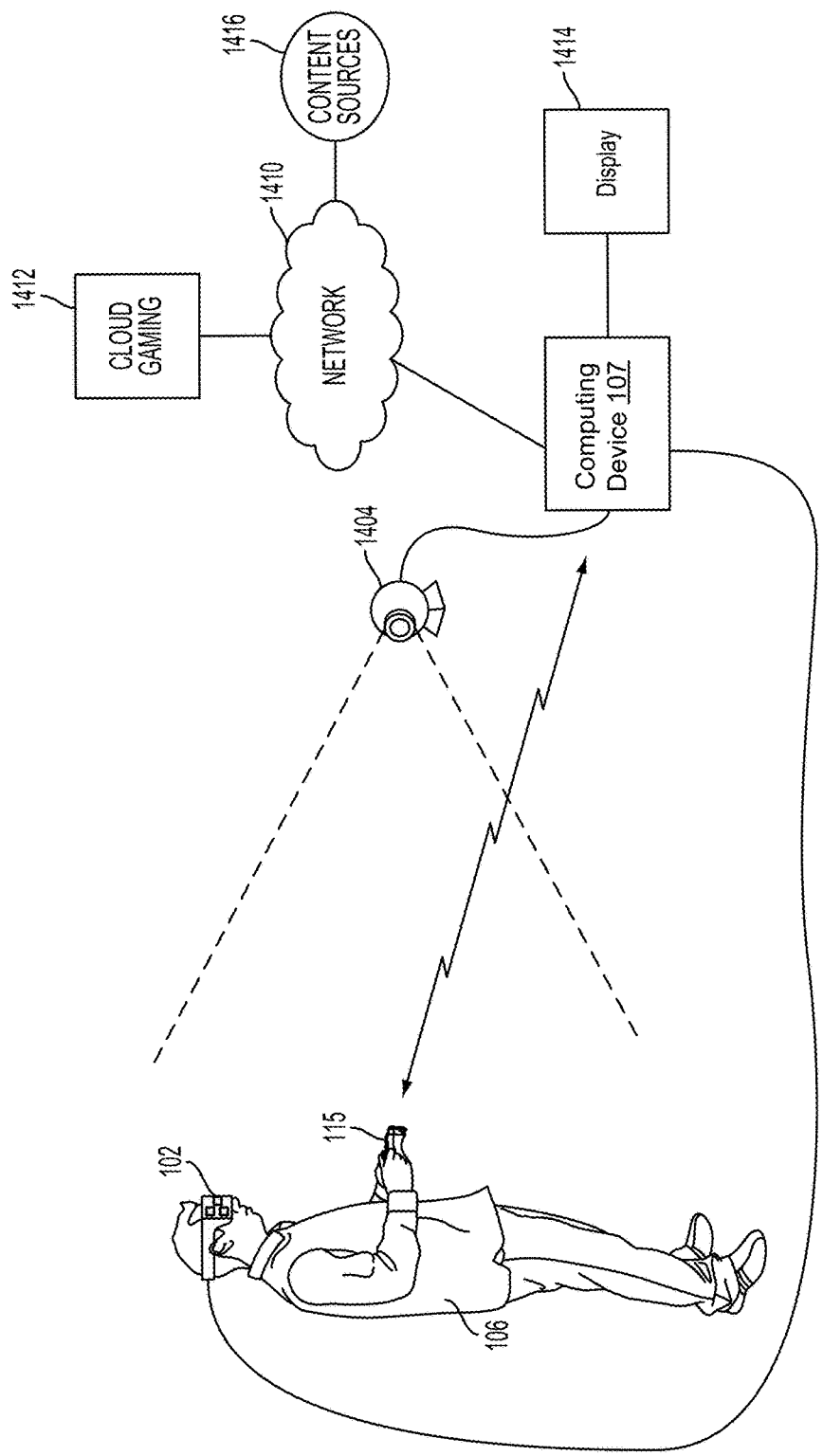
FIG. 14 is a diagram of an embodiment of a system to illustrate an interaction of a user with a virtual environment by using the HMD and the hand-held controller.

FIG. 14 illustrates a system for interactive game play of a video game, in accordance with an embodiment described in the present disclosure. The user 106 is shown wearing the HMD 102. The HMD 102 is worn in a manner similar to glasses, goggles, or a helmet, and is configured to display a video game or other content to the user 106. The HMD 102 provides an immersive experience to the user 106 by virtue of its provision of display mechanisms (e.g., optics and display screens) in close proximity to eyes of the user 106 and the format of content that is delivered to the HMD 102. In one example, the HMD 102 provides display regions to each eye of the user 106 and the display regions occupy large portions or even the entirety of a field-of-view of the user 106.

In one embodiment, the HMD 102 is connected to the computing device 107. The connection to computing device 107 is wired or wireless. The computing device 107, in one embodiment, is any general or special purpose computer, including but not limited to, a game console, a personal computer, a laptop, a tablet, a mobile device, a smart phone, a tablet, a thin client, a set-top box, a media streaming device, a smart television, etc. In some embodiments, the HMD 102 connects directly to a computer network 1410, e.g., the Internet, an Intranet, a local area network, a wide area network, etc., which allows for cloud gaming without the need for a separate local computer. In one embodiment, the computing device 107 executes a video game (and other digital content), and output the video and audio from the video game for rendering by the HMD 102. The computing device 107 is also sometimes referred to herein as a client system, which in one example is a video game console.

The computing device 107, in some embodiments, is a local or remote computer, and the computer runs emulation software. In a cloud gaming embodiment, the computing device 107 is remote and is represented by a plurality of computing services that are virtualized in data centers, where game systems/logic is virtualized and distributed to the user 106 over the computer network 1410.

The user 106 operates the hand-held controller 115 to provide input for a virtual environment. In one example, the hand-held controller 115 captures image of the environment, e.g., a real-world environment, etc., in which the user 106 is located. These captured images are analyzed to determine a location and movements of the user 106, the HMD 102, and the controller 115. In one embodiment, the controller 115 includes a light (or lights) which are tracked to determine its location and orientation. Additionally, as described in further detail below, in one embodiment, the HMD 102 includes one or more lights, which are tracked as markers to determine the location and orientation of the HMD 102 in substantial real-time during a display of a virtual environment.

The hand-held controller 115, in one embodiment, includes one or more microphones to capture sound from the real-world environment. Sound captured by a microphone array is processed to identify a location of a sound source. Sound from an identified location is selectively utilized or processed to exclusion of other sounds not from the identified location. Furthermore, in one embodiment, the hand-held controller 115 or the HMD 102 includes multiple image capture devices (e.g. stereoscopic pair of cameras), an infrared (IR) camera, a depth camera, and combinations thereof.

In some embodiments, the computing device 107 executes games locally on processing hardware of the computing device 107. The games or content is obtained in any form, such as physical media form (e.g., digital discs, tapes, cards, thumb drives, solid state chips or cards, etc.) or by way of download from the computer network 1410.

In an embodiment, the computing device 107 functions as a client in communication over the computer network 1410 with a cloud gaming provider 1412. The cloud gaming provider 1412 maintains and executes the video game being played by the user 106. The computing device 107 transmits inputs from the HMD 102 and the controller 1404 to the cloud gaming provider 1412, which processes the inputs to affect the game state of the video game being executed. The output from the executing video game, such as video data, audio data, and haptic feedback data, is transmitted to the computing device 107. The computing device 107 further processes the data before transmission or directly transmits the data to the relevant devices. For example, video and audio streams are provided to the HMD 102, whereas a vibration feedback command is provided to the hand-held controller 115.

In one embodiment, the HMD 102 and the hand-held controller 115 are networked devices that connect to the computer network 1410 to communicate with the cloud gaming provider 1412. For example, the computing device 107 is a local network device, such as a router, that does not otherwise perform video game processing, but facilitates passage of network traffic. The connections to the computer network 1410 by the HMD 102 and the hand-held controller 115 are wired or wireless.

In some embodiments, content executed on the HMD 102 or displayable on a display device 1414, is obtained from any of content sources 1416. Example content sources can include, for instance, internet websites that provide downloadable content and/or streaming content. In some examples, the content can include any type of multimedia content, such as movies, games, static/dynamic content, pictures, social media content, social media websites, virtual tour content, cartoon content, etc.

In one embodiment, the user 106 is playing a game on the HMD 102, where such content is immersive three-dimensional (3D) interactive content. The content on the HMD 102, while the user 106 is playing, is shared to the display device 1414. In one embodiment, the content shared to the display device 1414 allows other users proximate to the user 106 or remote to watch along with game play of the user 106. In still further embodiments, another player viewing the game play of the user 106 on the display device 1414 participates interactively with user 106. For example, another user viewing the game play on the display device 1414 controls characters in the game scene, provides feedback, provides social interaction, and/or provides comments (via text, via voice, via actions, via gestures, etc.,) which enables the other user who is not wearing the HMD 102 to socially interact with the user 106.

In one embodiment, instead of or in addition to the hand-held controller 115, a position and/or orientation of the HMD 102 with respect to the projector 104 is determined by using the methods described herein.

Figure 15:
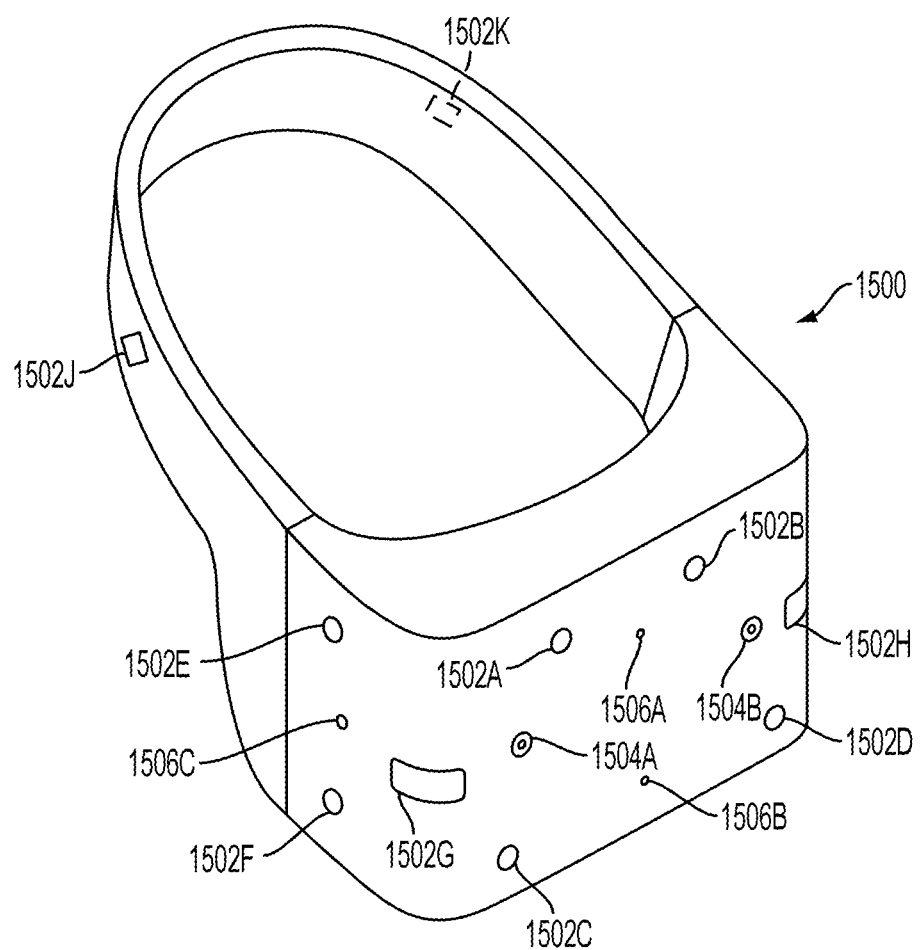
FIG. 15 is an isometric view of an embodiment of the HMD.

FIG. 15 illustrates a head-mounted display (HMD) 1500, in accordance with an embodiment described in the present disclosure. The HMD 1500 is an example of the HMD 102 (FIG. 1A). As shown, the HMD 1500 includes a plurality of photosensors 1502A-H, J and K (e.g., where 1502K and 1502J are located toward the rear or backside of the HMD headband). Each of these photosensors are configured to have specific shapes and/or positions. The photosensors 1502A, 1502B, 1502C, and 1502D are arranged on the front surface, e.g., front face, etc., of the HMD 1500. The photosensors 1502E and 1502F are arranged on a side surface of the HMD 1500. And the photosensors 1502G and 1502H are arranged at corners of the HMD 1500, so as to span the front surface and a side surface of the HMD 1500.

Based on one or more of the beams 110 and 704 detected by one or more of the photosensors 1502A-H, J and K, a location of the HMD 1500 in the environment is determined. It will further be appreciated that some of the photosensors cannot see a beam depending upon the particular orientation of the HMD 1500 relative to one of the projectors 104 and 702. In some embodiments, inertial sensors are disposed in the HMD 1500, which provide feedback regarding positioning instead of the photosensors 1502A-H, J and K. In some embodiments, the photosensors 1502A-H, J and K and inertial sensors work together, to enable mixing and selection of position/motion data.

The HMD 1500, in one embodiment, additionally includes one or more microphones. In the illustrated embodiment, the HMD 1500 includes microphones 1504A and 1504B located on the front surface of the HMD 1500, and a microphone located on a side surface of the HMD 1500. By utilizing an array of microphones, sound from each of the microphones is processed to determine a location of the sound's source. This information is utilized in various ways, including exclusion of unwanted sound sources, association of a sound source with a visual identification, etc.

In an embodiment, the HMD 1500 includes one or more image capture devices. In the illustrated embodiment, the HMD 1500 is shown to include image capturing devices 1506A and 1506B. In an embodiment, by utilizing a stereoscopic pair of image capture devices, 3D images and video of the real-world environment is captured from the perspective of the HMD 1500. Such video is presented to the user 106 to provide the user 106 with a "video see-through" ability while wearing the HMD 1500. That is, though the user 106 cannot see through the HMD 1500 in a strict sense, the video captured by the image capture devices 1506A and 1506B nonetheless provides a functional equivalent of being able to see the real-world environment external to the HMD 1500 as if looking through the HMD 1500.

Such video, in one embodiment, is augmented with virtual elements to provide an augmented reality experience, or is combined or blended with virtual elements in other ways. Though in the illustrated embodiment, two cameras are shown on the front surface of the HMD 1500, it will be appreciated that there may be any number of externally facing cameras or a single camera can be installed on the HMD 1500, and oriented in any direction. For example, in another embodiment, there may be cameras mounted on the sides of the HMD 1500 to provide additional panoramic image capture of the environment.

Figure 16:
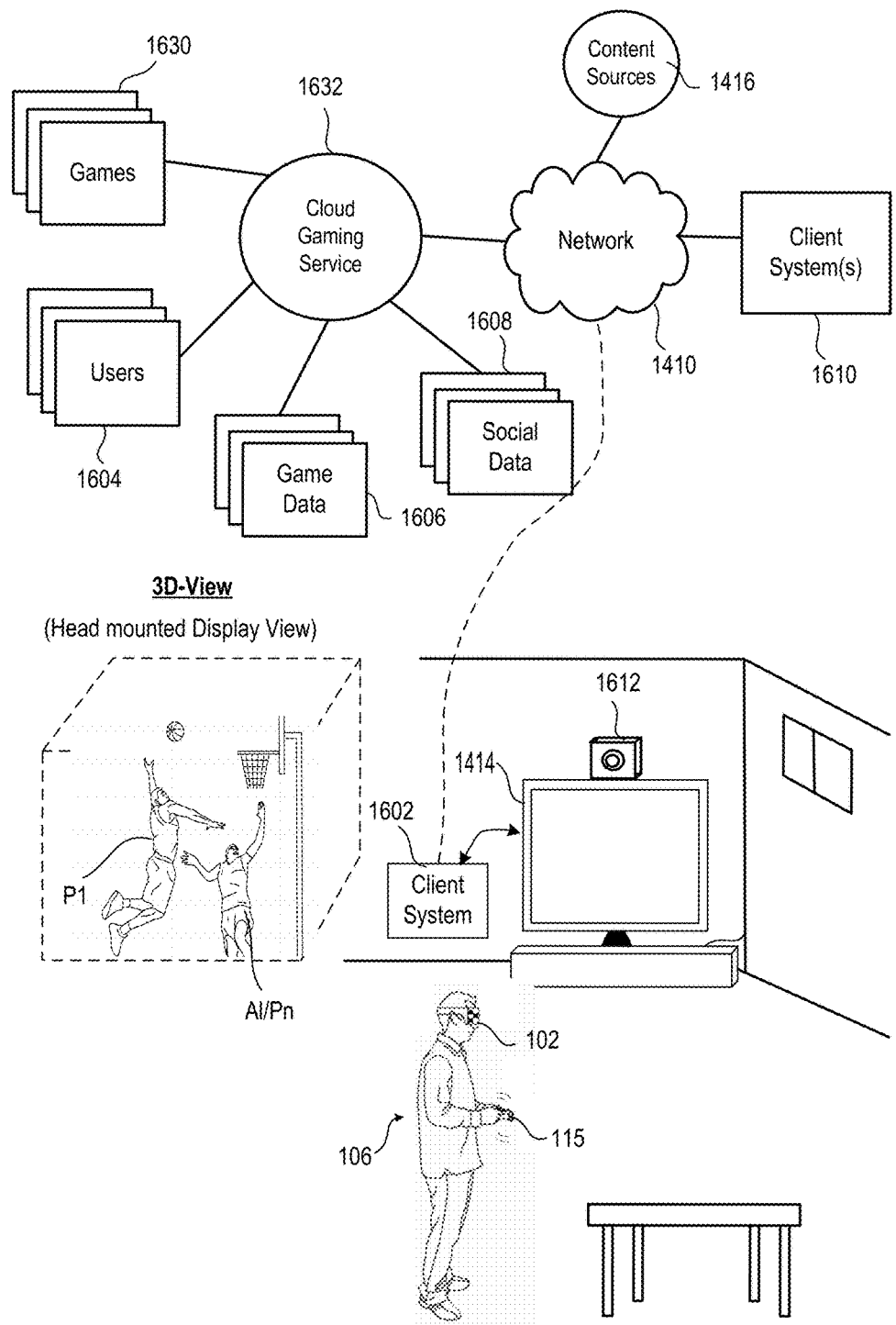
FIG. 16 is a diagram used to illustrate access of a virtual environment via a computer network.

FIG. 16 illustrates one example of game play using a client system 1602 that is capable of rendering the video game content to the HMD 1500 operated by the user 106. In this illustration, a state of a virtual object, e.g., game content, etc., provided to the HMD 1500 is in a rich interactive 3D space. As discussed above, a state of a virtual object is downloaded to the client system 1602 or is executed in one embodiment by a cloud processing system. A cloud gaming service 1632 includes a database of users 1604, who are allowed to access particular games 1630, share experiences with other friends, post comments, and manage their account information.

The cloud gaming service 1632 stores game data 1606 for specific users, which may be usable during game play, future game play, sharing to a social media network, or used for storing trophies, awards, status, ranking, etc. Social data 1608 is managed by the cloud gaming service 1632. In one embodiment, the social data 1608 is managed by a separate social media network, which is interfaced with cloud gaming service 1632 over the computer network 1410. Over the computer network 1410, any number of client systems 1610 are connected for access to the content and interaction with other users.

Continuing with the example of FIG. 16, the 3D interactive scene viewed in the HMD 102 includes game play, such as the characters illustrated in the 3D view, or another virtual environment. One character, e.g. P1, etc., is controlled by the user 106, who is wearing the HMD 102. This example shows a basketball scene between two players, wherein the user 106 is dunking a ball on another character in the 3-D view. The other character can be an AI (artificial intelligence) character of the game, or can be controlled by another player or players (Pn). The user 106, who is wearing the HMD 102, is shown moving about in a space of use, where the HMD 102 moves around based on head movements and body positions of the user 106. A camera 1612 is shown positioned over the display device 1414 in the room, however, for use of the HMD 102, the camera 1612 is placed in any location that can capture images of the HMD 102. As such, the user 106 is shown turned at about 90 degrees from the camera 1612 and the display device 1414, as content rendered in the HMD 102 is dependent on the direction that the HMD 102 is positioned, from the perspective of the camera 1612. Of course, during use of the HMD 102, the user 106 will be moving about, turning his/her head, looking in various directions, as is needed to take advantage of the dynamic virtual scenes rendered by the HMD 102.

In one embodiment, instead of or in addition to the camera 1612, a position and/or orientation of the HMD 102 with respect to the projector 104 is determined by using the methods described herein.

Figure 17:
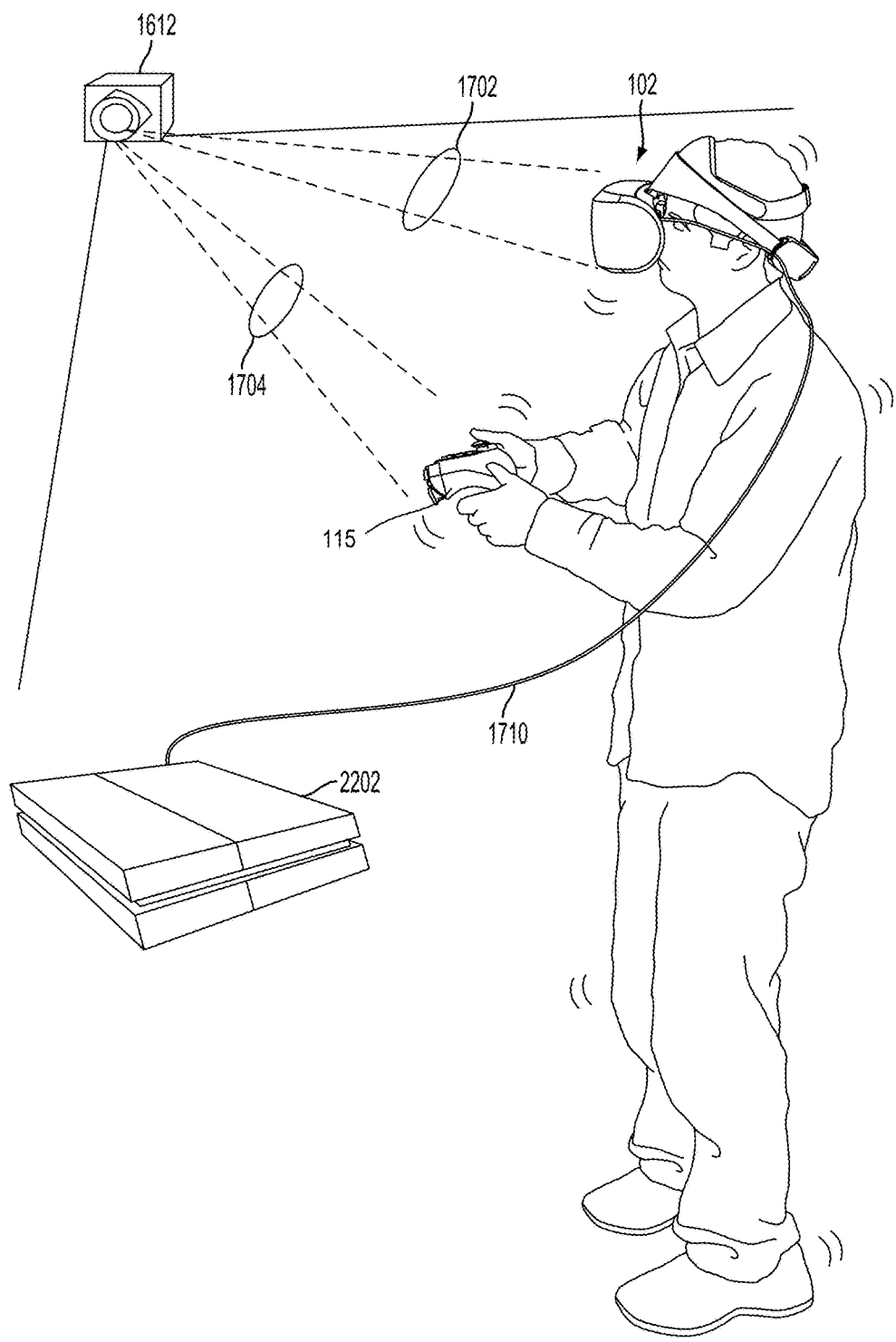
FIG. 17 illustrates the user wearing the HMD to access the virtual environment.

FIG. 17 illustrates a user wearing the HMD 102, during use, in accordance with one embodiment. In this example, it is shown that the HMD 102 is tracked 1702 using image data obtained from captured video frames by the camera 1612. Additionally, it is shown that the hand-held controller 115 is also tracked 1704 using image data obtained from captured video frames by the camera 1612. Also shown is the configuration where the HMD 102 is connected to a computing system 2202 via a cable 1710. The computing system 2202 is an example of the computing system 107. In one embodiment, the HMD 102 obtains power from the same cable or can connect to another cable. In still another embodiment, the HMD 102 has a battery that is rechargeable, so as to avoid extra power cords.

Figure 18:
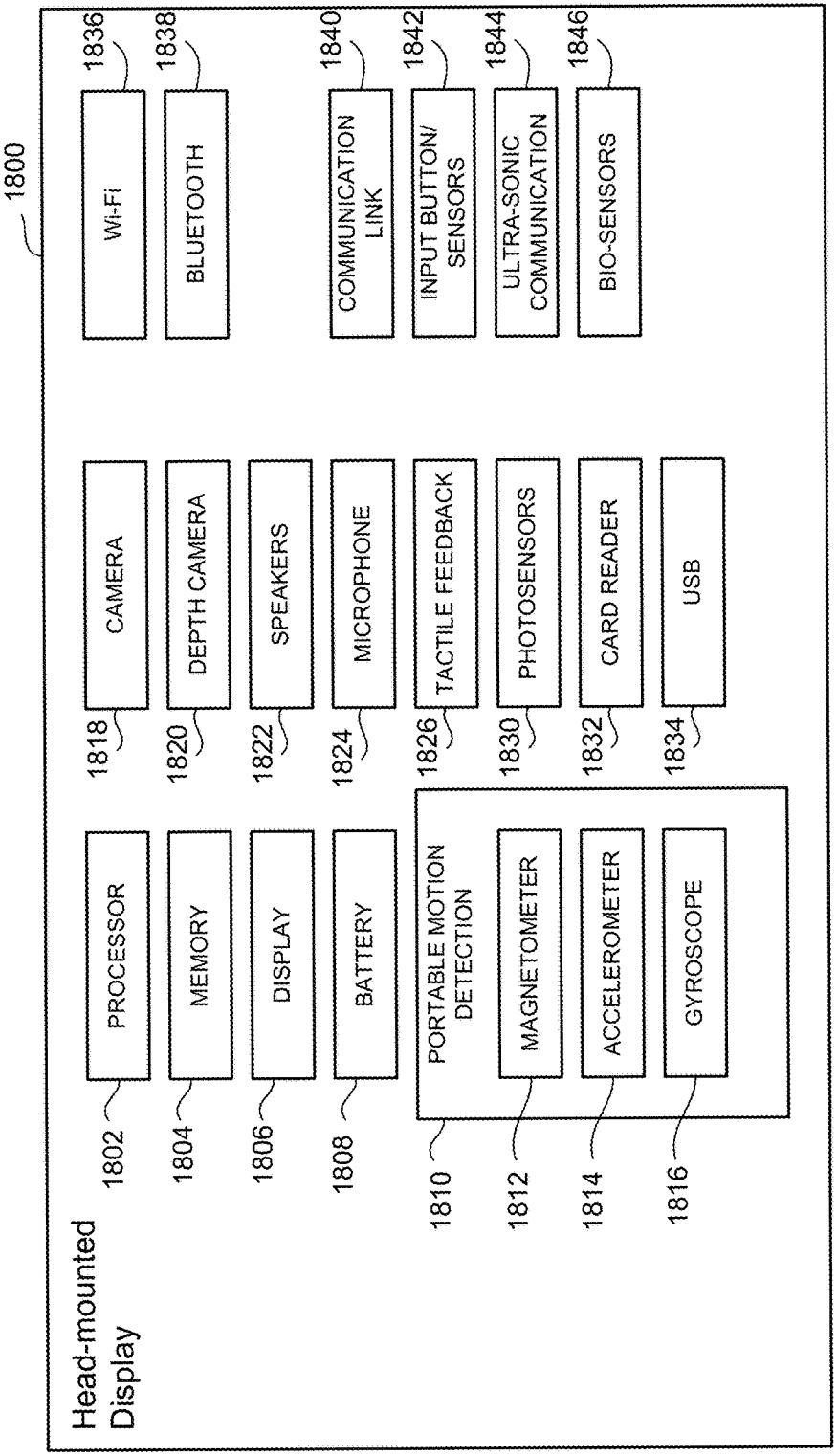
FIG. 18 is a diagram to illustrate example components of the HMD.

With reference to FIG. 18, a diagram is shown illustrating example components of an HMD 1800, in accordance with an embodiment described in the present disclosure. The HMD 1800 is an example of the HMD 102 shown in FIG. 1A. When the HMD 1800 excludes any cameras, the HMD 1800 is an example of the HMD 102 (FIG. 1A). It should be understood that more or less components can be included or excluded from the HMD 1800, depending on the configuration and functions enabled. The HMD 1800 includes a processor 1802 for executing program instructions. A memory device 1804 is provided for storage purposes, and in one embodiment, includes both volatile and non-volatile memory. A display 1806 is included which provides a visual interface that the user views.

The display 1806 is defined by one single display screen, or in the form of a separate display screen for each eye of the user 106. When two display screens are provided, it is possible to provide left-eye and right-eye video content separately. Separate presentation of video content to each eye, for example, provides for better immersive control of 3D content. As described herein, in one embodiment, the second screen is provided with second screen content of the HMD 1800 by using the output for one eye, and then formatting the content for display in a two-dimensional (2D) format. The one eye, in one embodiment, is the left-eye video feed, but in other embodiments is the right-eye video feed.

A battery 1808 is provided as a power source for the HMD 1800. In other embodiments, the power source includes an outlet connection to power. In other embodiments, an outlet connection to power and the battery 1808 are provided. A motion detection module 1810 includes any of various kinds of motion sensitive hardware, such as a magnetometer 1812, an accelerometer 1814, and a gyroscope 1816.

An accelerometer 1814 is a device for measuring acceleration and gravity induced reaction forces. Single and multiple axis (e.g., six-axis) models are able to detect magnitude and direction of the acceleration in different directions. The accelerometer 1814 is used to sense inclination, vibration, and shock. In one embodiment, three accelerometers are used to provide the direction of gravity, which gives an absolute reference for two angles (world-space pitch and world-space roll).

A magnetometer 1812 measures the strength and direction of the magnetic field in the vicinity of the HMD 1800. In one embodiment, three magnetometers are used within the HMD 1800, ensuring an absolute reference for the world-space yaw angle. In one embodiment, the magnetometer 1812 is designed to span the earth magnetic field, which is ±80 microtesla. Magnetometers are affected by metal, and provide a yaw measurement that is monotonic with actual yaw. The magnetic field is warped due to metal in the environment, which causes a warp in the yaw measurement. If necessary, this warp is calibrated using information from other sensors such as the gyroscope or the camera. In one embodiment, the accelerometer 1814 is used together with magnetometer 1812 to obtain the inclination and azimuth of the HMD 1800.

A gyroscope 1816 is a device for measuring or maintaining orientation, based on the principles of angular momentum. In one embodiment, three gyroscopes provide information about movement across the respective axis (x, y and z) based on inertial sensing. The gyroscopes help in detecting fast rotations. However, the gyroscopes drift overtime without the existence of an absolute reference. To reduce the drift, the gyroscopes are reset periodically, which can be done using other available information, such as positional/orientation determination based on visual tracking of an object, accelerometer, magnetometer, etc.

A camera 1818 is provided for capturing images and image streams of the real-world environment. In one embodiment, more than one camera (optionally) is included in the HMD 1800, including a camera that is rear-facing (directed away from the user when the user is viewing the display of the HMD 1800), and a camera that is front-facing (directed towards the user when the user is viewing the display of the HMD 1800). Additionally, in an embodiment, a depth camera 1820 is included in the HMD 1800 for sensing depth information of objects in the real-world environment.

The HMD 1800 includes speakers 1822 for providing audio output. Also, in one embodiment, a microphone 1824 is included for capturing audio from the real-world environment, including sounds from the ambient environment, speech made by the user, etc. In an embodiment, the HMD 1800 includes tactile feedback module 1826 for providing tactile feedback to the user. In one embodiment, the tactile feedback module 1826 is capable of causing movement and/or vibration of the HMD 1800 so as to provide tactile feedback to the user.

Photosensors 1830 are provided to detect one or more of the beams. A card reader 1832 is provided to enable the HMD 1800 to read and write information to and from a memory card. A USB interface 1834 is included as one example of an interface for enabling connection of peripheral devices, or connection to other devices, such as other portable devices, computers, etc. In various embodiments of the HMD 1800, any of various kinds of interfaces may be included to enable greater connectivity of the HMD 1800.

In an embodiment, a Wi-Fi module 1836 is included for enabling connection to the computer network via wireless networking technologies. Also, in one embodiment, the HMD 1800 includes a Bluetooth module 1838 for enabling wireless connection to other devices. A communications link 1840 is included for connection to other devices. In one embodiment, the communications link 1840 utilizes infrared transmission for wireless communication. In other embodiments, the communications link 1840 utilizes any of various wireless or wired transmission protocols for communication with other devices.

Input buttons/sensors 1842 are included to provide an input interface for the user. Any of various kinds of input interfaces may be included, such as buttons, gestures, touchpad, joystick, trackball, etc. In one embodiment, an ultrasonic communication module 1844 is included in HMD 1800 for facilitating communication with other devices via ultra-sonic technologies.

In an embodiment, bio-sensors 1846 are included to enable detection of physiological data from the user. In one embodiment, the bio-sensors 1846 include one or more dry electrodes for detecting bio-electric signals of the user through the user's skin, voice detection, eye retina detection to identify users/profiles, etc.

The foregoing components of HMD 1800 have been described as merely exemplary components that may be included in HMD 1800. In various embodiments described in the present disclosure, the HMD 1800 may or may not include some of the various aforementioned components. Embodiments of the HMD 1800 may additionally include other components not presently described, but known in the art, for purposes of facilitating aspects of the present invention as herein described.

In one embodiment, the HMD 1800 includes light emitting diodes, which are used in addition to the photosensors 1830 to determine a position and/or orientation of the HMD 1800. For example, the LEDs and a camera located within the environment in which the HMD 1800 is located are used to confirm or deny a position and/or orientation that is determined using the photosensors 1830 and the methods described herein.

It will be appreciated by those skilled in the art that in various embodiments described in the present disclosure, the aforementioned handheld device is utilized in conjunction with an interactive application displayed on a display to provide various interactive functions. The exemplary embodiments described herein are provided by way of example only, and not by way of limitation.

In one embodiment, clients and/or client devices, as referred to herein, may include HMDs, terminals, personal computers, game consoles, tablet computers, telephones, set-top boxes, kiosks, wireless devices, digital pads, stand-alone devices, handheld game playing devices, and/or the like. Typically, clients are configured to receive encoded video streams, decode the video streams, and present the resulting video to a user, e.g., a player of a game. The processes of receiving encoded video streams and/or decoding the video streams typically includes storing individual video frames in a receive buffer of the client. The video streams may be presented to the user on a display integral to client or on a separate device such as a monitor or television.

Clients are optionally configured to support more than one game player. For example, a game console may be configured to support two, three, four or more simultaneous players (e.g., P1, P2, . . . Pn). Each of these players receives or shares a video stream, or a single video stream may include regions of a frame generated specifically for each player, e.g., generated based on each player's point of view. Any number of clients are local (e.g., co-located) or are geographically dispersed. The number of clients included in a game system vary widely from one or two to thousands, tens of thousands, or more. As used herein, the term "game player" is used to refer to a person that plays a game and the term "game playing device" is used to refer to a device used to play a game. In some embodiments, the game playing device may refer to a plurality of computing devices that cooperate to deliver a game experience to the user.

For example, a game console and an HMD cooperate with a video server system to deliver a game viewed through the HMD. In one embodiment, the game console receives the video stream from the video server system and the game console forwards the video stream, or updates to the video stream, to the HMD and/or television for rendering.

Still further, an HMD is used for viewing and/or interacting with any type of content produced or used, such video game content, movie content, video clip content, web content, advertisement content, contest content, gamboling game content, conference call/meeting content, social media content (e.g., posting, messages, media streams, friend events and/or game play), video portions and/or audio content, and content made for consumption from sources over the internet via browsers and applications and any type of streaming content. Of course, the foregoing listing of content is not limiting, as any type of content can be rendered so long as it can be viewed in the HMD or rendered to a screen or screen of the HMD.

In one embodiment, clients further include systems for modifying received video. For example, a client performs further rendering, to overlay one video image on another video image, to crop a video image, and/or the like. As another example, clients receive various types of video frames, such as I-frames, P-frames and B-frames, and to process these frames into images for display to a user. In some embodiments, a member of clients is configured to perform further rendering, shading, conversion to 3-D, conversion to 2D, distortion removal, sizing, or like operations on the video stream. A member of clients is optionally configured to receive more than one audio or video stream.

Input devices of clients includes, for example, a one-hand game controller, a two-hand game controller, a gesture recognition system, a gaze recognition system, a voice recognition system, a keyboard, a joystick, a pointing device, a force feedback device, a motion and/or location sensing device, a mouse, a touch screen, a neural interface, a camera, input devices yet to be developed, and/or the like.

A video source includes rendering logic, e.g., hardware, firmware, and/or software stored on a computer readable medium such as storage. This rendering logic is configured to create video frames of the video stream based on the game state. All or part of the rendering logic is optionally disposed within one or more graphics processing unit (GPU). Rendering logic typically includes processing stages configured for determining the three-dimensional spatial relationships between objects and/or for applying appropriate textures, etc., based on the game state and viewpoint. The rendering logic produces raw video that is encoded. For example, the raw video is encoded according to an Adobe Flash® standard, HTML-5, .wav, H.264, H.263, On2, VP6, VC-1, WMA, Huffyuv, Lagarith, MPG-x, Xvid, FFmpeg, x264, VP6-8, real video, mp3, or the like. The encoding process produces a video stream that is optionally packaged for delivery to a decoder on a device. The video stream is characterized by a frame size and a frame rate. Typical frame sizes include 800×600, 1280×720 (e.g., 720p), 1024×768, 1080p, although any other frame sizes may be used. The frame rate is the number of video frames per second. In one embodiment, a video stream includes different types of video frames. For example, the H.264 standard includes a "P" frame and a "I" frame. I-frames include information to refresh all macro blocks/pixels on a display device, while P-frames include information to refresh a subset thereof. P-frames are typically smaller in data size than are I-frames.

As used herein the term "frame size" is meant to refer to a number of pixels within a frame. The term "frame data size" is used to refer to a number of bytes required to store the frame.

In some embodiments, the client is a general purpose computer, a special purpose computer, a game console, a personal computer, a laptop computer, a tablet computer, a mobile computing device, a portable gaming device, a cellular phone, a set-top box, a streaming media interface/device, a smart television or networked display, or any other computing device capable of being configured to fulfill the functionality of a client as defined herein. In one embodiment, a cloud gaming server is configured to detect the type of client device which is being utilized by the user, and provide a cloud-gaming experience appropriate to the user's client device. For example, image settings, audio settings and other types of settings may be optimized for the user's client device.

Figure 19:
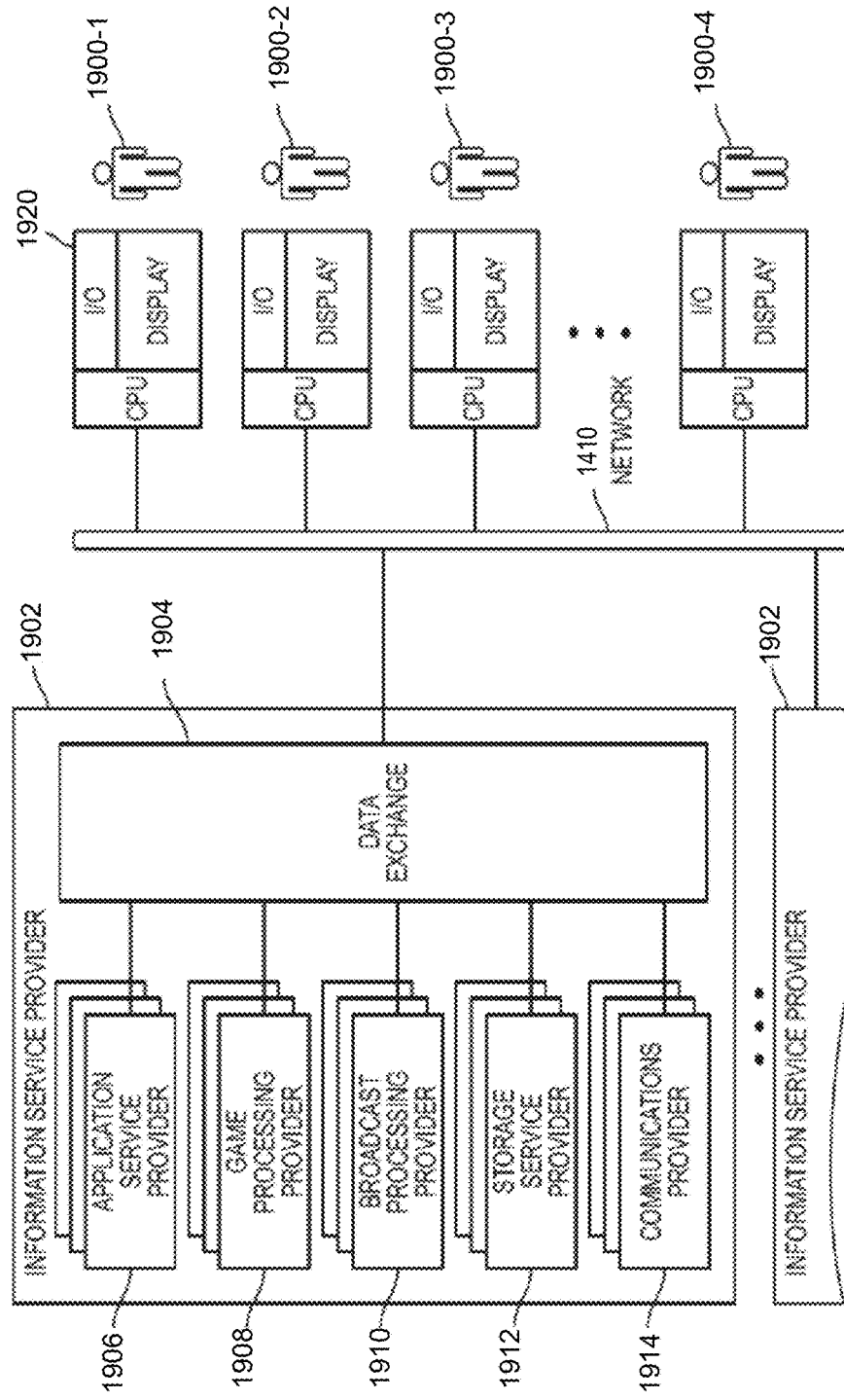
FIG. 19 illustrates an embodiment of an Information Service Provider architecture.

FIG. 19 illustrates an embodiment of an Information Service Provider architecture. Information Service Providers (ISP) 1902 delivers a multitude of information services to users 1900-1, 1900-2, 1900-3, 1900-4, etc., geographically dispersed and connected via the computer network 1410. In one embodiment, an ISP delivers one type of service, such as stock price updates, or a variety of services such as broadcast media, news, sports, gaming, etc. Additionally, the services offered by each ISP are dynamic, that is, services can be added or taken away at any point in time. Thus, the ISP providing a particular type of service to a particular individual can change over time. For example, a user is served by an ISP in near proximity to the user while the user is in her home town, and the user is served by a different ISP when the user travels to a different city. The home-town ISP will transfer the required information and data to the new ISP, such that the user information "follows" the user to the new city making the data closer to the user and easier to access. In another embodiment, a master-server relationship is established between a master ISP, which manages the information for the user, and a server ISP that interfaces directly with the user under control from the master ISP. In another embodiment, the data is transferred from one ISP to another ISP as the client moves around the world to make the ISP in better position to service the user be the one that delivers these services.

ISP 1902 includes Application Service Provider (ASP) 1906, which provides computer-based services to customers over the computer network 1410. Software offered using an ASP model is also sometimes called on-demand software or software as a service (SaaS). A simple form of providing access to a particular application program (such as customer relationship management) is by using a standard protocol such as HTTP. The application software resides on the vendor's system and is accessed by users through a web browser using HTML, by special purpose client software provided by the vendor, or other remote interface such as a thin client.

Services delivered over a wide geographical area often use cloud computing. Cloud computing is a style of computing in which dynamically scalable and often virtualized resources are provided as a service over the computer network 1410. Users do not need to be an expert in the technology infrastructure in the "cloud" that supports them. In one embodiment, cloud computing are divided in different services, such as Infrastructure as a Service (IaaS), Platform as a Service (PaaS), and Software as a Service (SaaS). Cloud computing services often provide common business applications online that are accessed from a web browser, while the software and data are stored on the servers. The term cloud is used as a metaphor for the Internet (e.g., using servers, storage and logic), based on how the Internet is depicted in computer network diagrams and is an abstraction for the complex infrastructure it conceals.

Further, ISP 1902 includes a Game Processing Server (GPS) 1908 which is used by game clients to play single and multiplayer video games. Most video games played over the Internet operate via a connection to a game server. Typically, games use a dedicated server application that collects data from players and distributes it to other players. This is more efficient and effective than a peer-to-peer arrangement, but it requires a separate server to host the server application. In another embodiment, the GPS establishes communication between the players and their respective game-playing devices exchange information without relying on the centralized GPS.

Dedicated GPSs are servers which run independently of the client. Such servers are usually run on dedicated hardware located in data centers, providing more bandwidth and dedicated processing power. Dedicated servers are the preferred method of hosting game servers for most PC-based multiplayer games. Massively multiplayer online games run on dedicated servers usually hosted by the software company that owns the game title, allowing them to control and update content.

Broadcast Processing Server (BPS) 1910 distributes audio or video signals to an audience. Broadcasting to a very narrow range of audience is sometimes called narrowcasting. The final leg of broadcast distribution is how the signal gets to the listener or viewer, and it may come over the air as with a radio station or TV station to an antenna and receiver, or may come through cable TV or cable radio (or "wireless cable") via the station or directly from a network. The Internet may also bring either radio or TV to the recipient, especially with multicasting allowing the signal and bandwidth to be shared. Historically, broadcasts have been delimited by a geographic region, such as national broadcasts or regional broadcast. However, with the proliferation of fast internet, broadcasts are not defined by geographies as the content can reach almost any country in the world.

Storage Service Provider (SSP) 1912 provides computer storage space and related management services. SSPs also offer periodic backup and archiving. By offering storage as a service, users can order more storage as required. Another major advantage is that SSPs include backup services and users will not lose all their data if their computers' hard drives fail. Further, in an embodiment, a plurality of SSPs have total or partial copies of the user data, allowing users to access data in an efficient way independently of where the user is located or the device being used to access the data. For example, a user can access personal files in the home computer, as well as in a mobile phone while the user is on the move.

Communications Provider 1914 provides connectivity to the users. One kind of Communications Provider is an Internet Service Provider (ISP) which offers access to the Internet. The ISP connects its customers using a data transmission technology appropriate for delivering Internet Protocol datagrams, such as dial-up, DSL, cable modem, fiber, wireless or dedicated high-speed interconnects. The Communications Provider can also provide messaging services, such as e-mail, instant messaging, and SMS texting. Another type of Communications Provider is the Network Service provider (NSP) which sells bandwidth or network access by providing direct backbone access to the Internet. Network service providers, in one embodiment, include telecommunications companies, data carriers, wireless communications providers, Internet service providers, cable television operators offering high-speed Internet access, etc.

Data Exchange 1904 interconnects the several modules inside ISP 1902 and connects these modules to users 1900 via the computer network 1410. Data Exchange 1904 covers a small area where all the modules of ISP 1902 are in close proximity, or covers a large geographic area when the different modules are geographically dispersed. For example, Data Exchange 1988 includes a fast Gigabit Ethernet (or faster) within a cabinet of a data center, or an intercontinental virtual area network (VLAN).

Users 1900 access the remote services with client device 1920, which includes at least a CPU, a display and an input/output (I/O) device. The client device can be a personal computer (PC), a mobile phone, a netbook, tablet, gaming system, a personal digital assistant (PDA), etc. In one embodiment, ISP 1902 recognizes the type of device used by the client and adjusts the communication method employed. In other cases, client devices use a standard communications method, such as html, to access ISP 1902.

Figure 20:
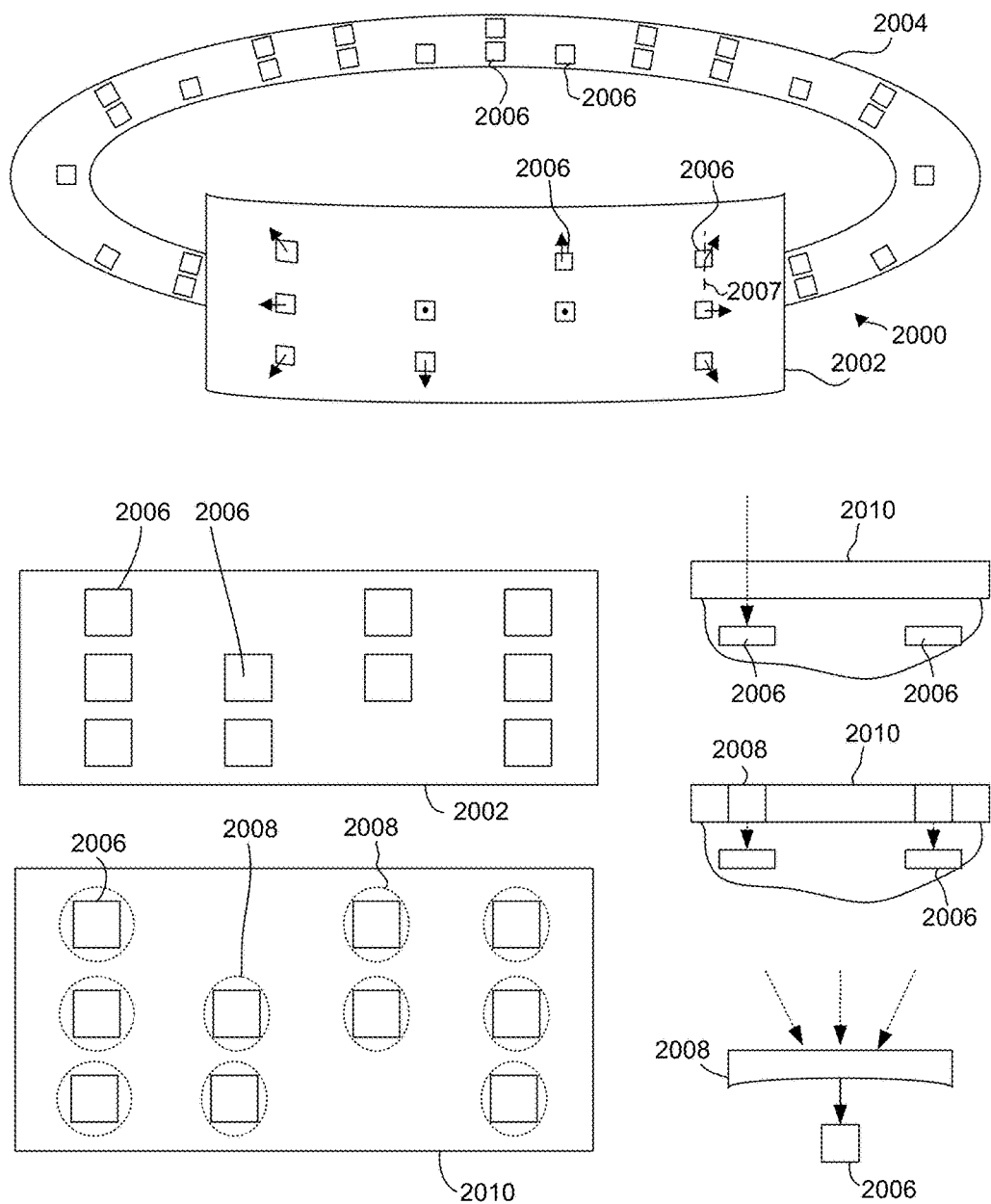
FIG. 20 is a diagram of an embodiment of the HMD having multiple photosensors.

FIG. 20 is a diagram of an embodiment of an HMD 2000. The HMD 2000 is an example of the HMD 102 (FIG. 1A). The HMD 2000 includes an array of photosensors. Some of the photosensors are labeled as 2006. Not all photosensors of the HMD 2000 are labeled to avoid cluttering. The photosensor 2006 is an example of the photosensor 105*a*. The photosensors of the HMD 2000 are distributed vertically along a width of a front face 2002 of the HMD 2000 and also distributed horizontally across a height of the front face 2002 of the HMD 2000. Also, in an embodiment, some of the photosensors of the HMD 2000 are located on a headband 2004 of the HMD 2000. When orientations of two or more of the photosensors are known with respect to the projector 104, the orientation of the HMD 2000 with respect to the projector 104 is determined by the processor 302 of the computing device 107. In one embodiment, each photo sensor 2006 of the HMD 2000 is identified by the processor 302 of the computing device 107 by a unique identification code.

Arrows are provided to show directions in which photosensors 2006 are pointing. For example, a lens of the photosensor 2006 at a top left corner of the HMD 2000 is facing up but is angled with respect to a vertical 2007. As another example, a lens of the photosensor 2006 in a middle left corner of the HMD 2000 is facing at an angle of 90 degrees with respect to the vertical 2007. As yet another example, a lens of the photosensor 2006 in a middle top corner of the HMD 2000 is facing vertically up to form an angle of zero degrees with respect to the vertical 2007. As still another example, a lens of the photosensor 2006 in a middle bottom corner of the HMD 2000 is facing vertically down to form an angle of 180 degrees with respect to the vertical 2007. As still another example, a lens of the photosensor 2006 in a middle portion of the HMD 2000 is facing out of the paper of FIG. 20 to form an angle of 90 degrees with respect to the vertical 2007.

In some embodiments, examples of a pattern in which the photosensors 2006 are placed on the surface of the front face 2002 include a random nonplanar pattern, a zig-zag pattern, a curved pattern, a straight pattern, a combination of a curved and a straight pattern, etc. In various embodiments, the photosensors 2006 are placed at different angles with respect to the front face 2002 and/or the vertical 2007 than that illustrated in FIG. 20.

In one embodiment, the HMD 2000 has a front cover 2010, e.g., a glass cover, a plastic cover, a shaded cover, a tinted cover, etc., and the front cover has embedded lenses 2008 that go over the front face 2002. Each lens 2008 is located on top of a corresponding photosensor 2006 of the HMD 2000. The lens 2008 directs, e.g., refracts, etc., stray light from the beam 110 to facilitate incidence of the beam 110 on the corresponding photosensor 2006 that is located below the lens.

In an embodiment, one of the photosensors form a different angle with respect to the front face front face 2002 of the HMD 2000 compared to another one of the photosensors.

In one embodiment, all of the photosensors of the HMD 2000 have the same angle with respect to the front face, e.g., the front surface, etc., of the HMD 2000.

In an embodiment, each photosensor 2006 has a curvature. In one embodiment, the curvature is exposed to light or not.

Embodiments described in the present disclosure may be practiced with various computer system configurations including hand-held devices, microprocessor systems, microprocessor-based or programmable consumer electronics, minicomputers, mainframe computers and the like. The embodiments described in the present disclosure can also be practiced in distributed computing environments where tasks are performed by remote processing devices that are linked through a wire-based or wireless network.

With the above embodiments in mind, it should be understood that the embodiments described in the present disclosure can employ various computer-implemented operations involving data stored in computer systems. These operations are those requiring physical manipulation of physical quantities. Any of the operations described herein that form part of the embodiments described in the present disclosure are useful machine operations. Some embodiments described in the present disclosure also relate to a device or an apparatus for performing these operations. The apparatus can be specially constructed for the required purpose, or the apparatus can be a general-purpose computer selectively activated or configured by a computer program stored in the computer. In particular, various general-purpose machines can be used with computer programs written in accordance with the teachings herein, or it may be more convenient to construct a more specialized apparatus to perform the required operations.

Some embodiments described in the present disclosure can also be embodied as computer readable code on a computer readable medium. The computer readable medium is any data storage device that can store data, which can be thereafter be read by a computer system. Examples of the computer readable medium include a hard drive, a NAS, a ROM, a RAM, a CD-ROM, a CD-R, a CD-RW, a magnetic tape, an optical data storage device, a non-optical data storage device, etc. The computer readable medium can include computer readable tangible medium distributed over a network-coupled computer system so that the computer readable code is stored and executed in a distributed fashion.

It should be noted that in some embodiments, any of the embodiments described herein are combined with any of the remaining embodiments.

Moreover, although some of the above-described embodiments are described with respect to a gaming environment, in some embodiments, instead of a game, other environments, e.g., a video conferencing environment, etc., is used.

Although the method operations were described in a specific order, it should be understood that other housekeeping operations may be performed in between operations, or operations may be adjusted so that they occur at slightly different times, or may be distributed in a system which allows the occurrence of the processing operations at various intervals associated with the processing, as long as the processing of the overlay operations are performed in the desired way.

Although the foregoing embodiments described in the present disclosure have been described in some detail for purposes of clarity of understanding, it will be apparent that certain changes and modifications can be practiced within the scope of the appended claims. Accordingly, the present embodiments are to be considered as illustrative and not restrictive, and the embodiments are not to be limited to the details given herein, but may be modified within the scope and equivalents of the appended claims.

The invention claimed is:

1. A method for determining a position of a photosensor with respect to multiple projectors, comprising:
    generating, by a beam generator of a projector, a beam;
    modifying a direction of travel of the beam using a micro-electro-mechanical systems (MEMS) mirror that moves in a pattern;
    detecting, by a photosensor, the beam;
    calculating a time of hit at which the beam is detected;
    determining based on the pattern and the time of hit an orientation of the photosensor with respect to the projector;
    generating, by a beam generator of an additional projector, an additional beam;
    modifying a direction of travel of the additional beam using an additional MEMS mirror that moves in an additional pattern;
    calculating an additional time at which the additional beam is detected;
    determining based on the additional pattern and the additional time an orientation of the additional beam; and
    determining a position of the photosensor with respect to the projector based on the orientation of the beam and the orientation of the additional beam.

2. The method of claim 1, wherein the pattern of the MEMS mirror is a Lissajous pattern or a raster scan pattern, wherein the pattern of the additional MEMS mirror is the Lissajous pattern or the raster scan pattern.

3. The method of claim 1, wherein the beam is a laser beam and the additional beam is a laser beam.

4. The method of claim 1, further comprising:
    modulating the beam with a first bit pattern; and
    modulating the additional beam with a second bit pattern.

5. The method of claim 4, further comprising:
    determining, based on the first bit pattern, that the beam is generated by the projector; and
    determining, based on the second bit pattern, that the additional beam is generated by the additional projector.

6. The method of claim 1, further comprising synchronizing a clock signal generated by a controller that detects the beam with a clock signal generated by the projector.

7. The method of claim 1, wherein the beam and the additional beam are time division multiplexed with respect to each other.

8. A system determining a position of a photosensor with respect to multiple projectors, comprising:
    a projector including a beam generator configured to generate a beam, wherein the projector includes a micro-electro-mechanical systems (MEMS) mirror configured to move in a pattern to modify a direction of travel of the beam;

a controller is in communication with the projector, wherein the controller has a photosensor, wherein the photosensor is configured to detect the beam, wherein the controller is configured to calculate a time of hit at which the beam is detected; and a computing device in communication with the projector and the controller, wherein the computing device is configured to determine based on the pattern and the time of hit an orientation of the photosensor with respect to the projector;

an additional projector in communication with the computing device, wherein the additional projector includes a beam generator configured to generate an additional beam, wherein the additional projector includes an additional MEMS mirror configured to move in the pattern to modify a direction of travel of the additional beam, wherein the controller is configured to calculate an additional time at which the additional beam is detected, wherein the computing device is configured to determine based on the additional pattern and the additional time an orientation of the additional beam; and wherein the computing device is configured to determine a position of the photosensor with respect to the projector based on the orientation of the beam and the orientation of the additional beam.

9. The system of claim 8, wherein the pattern of the MEMS mirror is a Lissajous pattern or a raster scan pattern, wherein the pattern of the additional MEMS mirror is the Lissajous pattern or the raster scan pattern.

10. The system of claim 8, wherein the beam is a laser beam and the additional beam is a laser beam.

11. The system of claim 8,
wherein the projector is configured to modulate the beam with a first bit pattern, and
wherein the projector is configured to modulate the additional beam with a second bit pattern.

12. The system of claim 11:
wherein the computing device is configured to determine, based on the first bit pattern, that the beam is generated by the projector; and wherein the computing device is configured to determine, based on the second bit pattern, that the additional beam is generated by the additional projector.

13. The system of claim 8, wherein the computing device is configured to synchronize a clock signal generated by the controller that detects the beam with a clock signal generated by the projector.

14. The method of claim 8, wherein the beam and the additional beam are time division multiplexed with respect to each other.

15. A system comprising:
a controller having a photosensor configured to detect a beam, wherein the controller is configured to calculate a time of hit at which the beam is detected; and a computing device in communication with the controller, wherein the computing device is configured to determine based on a pattern of motion of a micro-electro-mechanical systems (MEMS) mirror and the time of hit an orientation of the beam, wherein the controller is configured to detect an additional beam to generate an additional beam hit signal, wherein the controller is configured to calculate an additional time of hit at which the additional beam is detected, wherein the computing device is configured to determine based on a pattern of motion of an additional micro-electro-mechanical systems (MEMS) mirror and the additional time of hit an additional orientation of the additional beam, wherein the computing device is configured to determine a position of the photosensor based on the orientation of the beam and the orientation of the additional beam.

16. The system of claim 15, wherein the pattern of the MEMS mirror is a Lissajous pattern or a raster scan pattern, wherein the pattern of the additional MEMS mirror is the Lissajous pattern or the raster scan pattern.

17. The system of claim 15, wherein the beam is a laser beam and the additional beam is a laser beam.

18. The system of claim 15, wherein the beam is encoded with a first bit pattern, wherein the additional beam is encoded with a second bit pattern.

19. The system of claim 15, wherein the beam and the additional beam are time division multiplexed with respect to each other.

20. The system of claim 15, wherein the controller is a head-mounted display.

* * * * *